(12) United States Patent
Tao et al.

(10) Patent No.: US 7,569,084 B2
(45) Date of Patent: Aug. 4, 2009

(54) VEGETABLE LIPID-BASED COMPOSITION AND CANDLE

(76) Inventors: Bernard Tao, 1513 Tanglewood Dr., Lafayette, IN (US) 47905; Amy Hutchison, 393A Mason Rd., Milford, NH (US) 03055

(*) Notice: Subject to any disclaimer, the term of this patent is extended or adjusted under 35 U.S.C. 154(b) by 505 days.

(21) Appl. No.: 10/831,458

(22) Filed: Apr. 23, 2004

(65) Prior Publication Data

US 2004/0200136 A1 Oct. 14, 2004

Related U.S. Application Data

(63) Continuation of application No. 09/964,967, filed on Sep. 27, 2001, now abandoned, which is a continuation-in-part of application No. 09/802,137, filed on Mar. 8, 2001, now Pat. No. 6,497,735, which is a continuation of application No. 09/132,991, filed on Aug. 12, 1998, now Pat. No. 6,284,007.

(51) Int. Cl.
*C10L 5/00* (2006.01)
*C11C 5/00* (2006.01)

(52) U.S. Cl. .......................................... 44/275; 431/288

(58) Field of Classification Search ................... 44/275; 431/288
See application file for complete search history.

(56) References Cited

U.S. PATENT DOCUMENTS

| | | | |
|---|---|---|---|
| 1,954,659 A | 4/1934 | Will | |
| 1,958,462 A | 5/1934 | Baumer | |
| 2,377,106 A | 5/1945 | Reswick | |
| 2,638,411 A | 5/1953 | Thompson et al. | |
| 3,429,815 A | 2/1969 | Drake | |
| 3,613,658 A | 10/1971 | Knowles et al. | |
| 3,630,697 A | 12/1971 | Dulling et al. | |
| 3,645,705 A | 2/1972 | Miller et al. | |
| 3,843,312 A | 10/1974 | Easterday | |
| 3,844,706 A * | 10/1974 | Tsaras | 431/288 |
| 3,871,815 A | 3/1975 | Cangardel | |
| 4,002,706 A | 1/1977 | Pretorius | |
| 4,118,203 A | 10/1978 | Beardmore et al. | |
| 4,134,718 A | 1/1979 | Kayfetz et al. | |
| 4,390,590 A | 6/1983 | Saunders et al. | |
| 4,507,077 A | 3/1985 | Sapper | |
| 4,608,011 A | 8/1986 | Comstock | |
| 4,614,625 A | 9/1986 | Wilson | |
| 4,693,890 A | 9/1987 | Wilson et al. | |
| 4,759,709 A | 7/1988 | Luken, Jr. et al. | |
| 4,813,975 A * | 3/1989 | Poulina et al. | 44/275 |
| 4,842,648 A | 6/1989 | Phadoemchit et al. | |
| 4,855,098 A | 8/1989 | Taylor | |
| 5,171,329 A | 12/1992 | Lin | |
| 5,578,089 A | 11/1996 | Elsamaloty | |
| 5,879,694 A | 3/1999 | Morrison et al. | |
| 5,919,423 A | 7/1999 | Requejo et al. | |
| 6,063,144 A | 5/2000 | Calzada et al. | |
| 6,214,918 B1 | 4/2001 | Johnson et al. | |
| 6,284,007 B1 | 9/2001 | Tao | |
| 6,503,285 B1 * | 1/2003 | Murphy | 44/275 |
| 6,544,302 B2 | 4/2003 | Berger et al. | |
| 2001/0013195 A1 | 8/2001 | Tao | |
| 2002/0144455 A1 | 10/2002 | Bertrand et al. | |
| 2002/0157303 A1 | 10/2002 | Murphy et al. | |
| 2003/0017431 A1 | 1/2003 | Murphy | |
| 2003/0022121 A1 | 1/2003 | Biggs | |
| 2003/0046860 A1 | 3/2003 | Tiffany et al. | |
| 2003/0057599 A1 | 3/2003 | Murphy et al. | |
| 2003/0064336 A1 | 4/2003 | Welch et al. | |

FOREIGN PATENT DOCUMENTS

| | | |
|---|---|---|
| EP | 685554 | 12/1995 |
| GB | 1015354 | 12/1965 |
| GB | 2 197 337 | 5/1988 |
| IL | 109814 | 6/1996 |
| JP | 72030760 | 4/1968 |
| JP | 47-30760 | 8/1972 |
| JP | 60-51765 | 3/1985 |
| WO | WO 02/48295 | 6/2002 |

OTHER PUBLICATIONS

Kirk-Other, Encylopedia of Chemical Technology, 3rd Edition, vol. 24, pp. 466-481.
AG Innovation News, "Soy lights", vol. 9, No. 2, pp. 1-4, http://www.auri.org/news/ainapr00/soylite.htm.
Author Unknown, Refinery Processes, vol. 18, pp. 458-461.
*The Department of Agricultural Engineering. Annual Research Summary 1994*, p. 75.

* cited by examiner

*Primary Examiner*—Cephia D Toomer
(74) *Attorney, Agent, or Firm*—Bose McKinney & Evans LLP

(57) ABSTRACT

The present invention is a candle composition containing a vegetable lipid base component and a candle formed from the composition. The candle composition may contain up to 100 percent by weight of a vegetable lipid base component. The candle composition may further contain a plant derived crystal modifier.

52 Claims, No Drawings

VEGETABLE LIPID-BASED COMPOSITION AND CANDLE

REFERENCE TO PRIORITY APPLICATIONS

This application is a continuation of U.S. application Ser. No. 09/964,967, entitled "Vegetable Lipid-Based Composition and Candle", filed Sep. 27, 2001, and published on Apr. 3, 2003, Publication No. 20030061760A1 now abandoned; U.S. application Ser. No. 09/964,967 is a continuation-in-part of U.S. application Ser. No. 09/802,137, filed Mar. 8, 2001 now U.S. Pat. No. 6,497,735; U.S. Pat. No. 6,497,735 is a continuation of U.S. application Ser. No. 09/132,991, now U.S. Pat. No. 6,284,007, entitled "Vegetable Lipid-Based Composition and Candle", filed 12 Aug. 1998, the disclosures of the above patents and patent application are hereby incorporated by reference.

FIELD OF THE INVENTION

This invention relates to candles and candle compositions.

BACKGROUND OF THE INVENTION

Candles generally include a wick embedded in a solid combustible material. The basic principle involved is the melting of the combustible material to produce a liquid, which is transported up the wick by capillary action and vaporizes/combusts in the flame of the candle. Wicks are usually made of woven cellulosic materials, such as cotton or paper. Moreover, candles are multiple use devices, i.e. they can be lit and extinguished over many cycles during the useful lifetime of the device.

Historically, candles have been produced from compositions containing predominately animal fats, such as tallow or natural waxes such as beeswax. Additional suitable waxes include petroleum waxes such as medium paraffin wax and microcrystalline paraffin wax that are derived from petroleum refining processes. The main advantages of petroleum products over tallow in candle compositions is that petroleum products have better control over the melting temperature range of the solid material as well as cost. This control is created by the blending of different molecular weight fractions of linear and non-linear alkane/alkene hydrocarbons. By appropriate blending, the candle material is a solid at ambient temperatures, but readily melts to form a liquid at elevated temperatures. In some cases, candles may contain lower molecular weight hydrocarbons which would be liquids at ambient temperatures, but the composite appears as a solid, due to molecular distribution among larger, higher melting temperature components. As such, predominately petroleum based candles exhibit an amorphous solid structure as opposed to a crystalline structure.

The solid structure of candles is important for both performance and aesthetics. The solid structure of a candle composition effects the burning characteristics of the candle and the appearance of the candle. Different types of candles have different requirements. For example, it is desirable for standalone candles (tapers, pillars, etc.) to be solid with a smooth, glossy appearance, without residual sticky/greasy feeling on the exterior.

Large candles produced predominately from petroleum products exhibit poor aesthetic properties. Petroleum waxes decrease in volume upon solidifying from a liquid melt (i.e. density of the solid is greater than the liquid). Most candles produced from petroleum products, such as 3-6 inch diameter pillar candles, tend to exhibit the formation of a concave surface or the formation of gaps or holes on the interior of the candle.

Candles produced from petroleum waxes additionally produce a black smoke upon burning and generally exhibit an unpleasant odor. Depending on the molecular weight distribution of paraffin, large molecular weight or more complex molecules do not combust as readily as smaller, simpler molecules, and therefore have the tendency to form significant amounts of soot. The black smoke of petroleum-based candles contains polycyclic aromatic hydrocarbons, metals, and sulfur compounds that may be carcinogenic and/or toxic. Burning these candles in an enclosed environment increases the concentrations of these compounds and could therefore increase the detrimental effects associated with these compounds.

The cost of using petroleum products in candles will likely increase due to the low supply and increasing demand. The production of petroleum waxes is being reduced because petroleum refining processes are constantly being improved to maximize quantities of short chain hydrocarbons and aromatic chemicals.

As a result, there is a need for a candle composition that minimizes the risk to human health upon burning, utilizes renewable resources while minimizing or eliminating use of petrochemical-derived products, and has a naturally pleasing odor. This invention addresses that need.

SUMMARY OF THE INVENTION

The present invention is a candle composition containing a vegetable lipid base component and a candle formed from the composition.

In one embodiment, a candle composition comprises greater than 90 percent by weight of a plant derived base component comprising 25 percent by weight stearic acid; 68.75 percent by weight plant oil; and 6.25 percent by weight of a plant derived crystal modifier. The plant derived crystal modifier, in one variation is a surfactant.

In another embodiment, a candle composition comprises 60 to 99 percent by weight of a plant derived base component comprising a free fatty acid/triglyceride mixture; and 1 to 40 percent by weight of a plant derived crystal modifier. The composition also may be comprised of 75 to 99 percent by weight of the plant derived base component and 1 to 25 percent by weight of the plant derived crystal modifier. The plant derived base component being comprised of 1 to 99 percent by weight free fatty acids and 1 to 99 percent by weight triglycerides. The plant derived crystal modifier, in one variation, is a surfactant.

In a further embodiment, a candle composition comprises at least 70 percent by weight of plant derived triglycerides. The plant derived triglycerides including 0 to 100 percent saturated fatty acid components and 0 to 100 percent unsaturated fatty acid components. The unsaturated fatty acid components including 0 to 74 percent of monounsaturated fatty acids and 0 to 39 percent polyunsaturated fatty acids. The candle composition being solid at ambient temperatures up to 55 degrees Celsius. In one variation the triglycerides include fatty acid components selected from the group consisting of lauric, myristic, palmitic, stearic, arachidic, behenic, palmitoleic, oleic, linoleic, linolenic, and arachidonic. In a further variation, the fatty acid components of the triglycerides comprise between 0 and 39 percent of palmitic acid, between 0 and 74 percent of stearic acid, and between 0 and 73 percent oleic acid.

DESCRIPTION OF EXEMPLARY EMBODIMENTS

For the purpose of promoting an understanding of the principles of the invention, reference will now be made to certain embodiments thereof and specific language will be used to describe the same. It will nevertheless be understood that no limitation of the scope of the invention is thereby intended, such alterations, modifications and further applications of the principles of the invention illustrated herein being contemplated as would normally occur to one skilled in the art to which the invention relates.

The present invention provides a vegetable lipid-based composition and a candle formed therefrom. As shown in the following exemplary embodiments A, B, and C a candle is produced from a 100% vegetable lipid composition, a combination of a vegetable lipid component and a petroleum wax component, a combination of a vegetable lipid component and a natural wax component, and a combination of a vegetable lipid component and a crystal modifier.

A candle is formed from the vegetable lipid-based composition of the following exemplary embodiments. The candle can be of any size and shape desired. The candle preferably includes a wick which typically extends longitudinally from one end of the candle to the other end. The wick is preferably made from woven cotton or any other suitable material as known in the art. The candle, in one embodiment, is preferably placed in a candle holder which is preferably composed of glass or any heat resistant material.

Exemplary Embodiment A

In exemplary embodiment A, the composition includes a vegetable lipid component, including a triglyceride or a free fatty acid/triglyceride mixture, and a petroleum wax. The vegetable lipid component of the composition is preferably present in the composition in a greater concentration by weight than the petroleum wax component.

As known in the art, triglycerides are fatty acid esters of glycerol. As used throughout this application, the term "free fatty acid" will refer to a fatty acid that is not covalently bound through an ester linkage to glycerol. Additionally, as used herein, the term "fatty acid component" will be used to describe a fatty acid that is covalently bound through an ester linkage to glycerol.

The triglycerides and free fatty acids described throughout this application are obtained preferably from plant sources, including soybean, cottonseed, corn, sunflower, canola, peanut, olive, palm kernel and palm oils. The triglycerides are used after normal refining processing by methods known in the art. For example, plant triglycerides may be obtained by solvent extraction of plant biomass using aliphatic solvents. Subsequent additional purification may involve distillation, fractional crystallization, degumming, bleaching and steam stripping. The triglycerides are also partially or fully hydrogenated. Furthermore, free fatty acids may be obtained by hydrolysis of natural triglycerides (e.g., alkaline hydrolysis followed by purification methods known in the art, including distillation and steam stripping) or by synthesis from petrochemical fatty alcohols. The free fatty acids and triglycerides may further be obtained from commercial sources, including Cargill located at P.O. Box 9300, Minneapolis, Minn. 55440-9300; Archer Daniels Midlands (ADM) located at 4666 Faries Parkway, Box 1470, Decatur, Ill. 62525; and Central Soya located at P.O. Box 1400, Fort Wayne, Ind. 46801-1400.

The free fatty acids and fatty acid components of the triglycerides are preferably saturated and their chains exhibit varying length. However, the free fatty acids and fatty acid components of the triglycerides may be unsaturated as long as the final candle composition will be a solid at the temperature at which the candle is used. The properties of the free fatty acid/triglyceride mixture, such as melting point, will vary as a function of the chain length and degree of saturation of the free fatty acids and the fatty acid components of the triglycerides. For example, as the degree of saturation decreases, the melting point decreases. Similarly, as the chain length of the fatty acids decreases, the melting point decreases. Preferred free fatty acids are the saturated free fatty acids such as palmitic acid and include saturated free fatty acids of longer carbon chain length, such as arachidic acid and behenic acid. Stearic acid is further preferred.

Table 1 depicts the preferred fatty acid components of the triglycerides in exemplary embodiment A along with their preferred maximum percentages by weight.

TABLE 1A

Ranges of Fatty Acid Components of Triglycerides for Exemplary Embodiment A

| Fatty Acid Chain Length* | Preferred Maximum Percent by weight |
| --- | --- |
| 12:0 | 0.21 |
| 14:0 | 0.77 |
| 16:0 | 39.28 |
| 18:0 | 74.22 |
| 20:0 | 0.19 |
| 22:0 | 0.064 |
| 16:1 | 0.28 |
| 18:1 | 72.82 |
| 20:1 | 1.035 |
| 18:2 | 33.91 |
| 18.3 | 4.97 |

*number of carbon atoms:number of double bonds (e.g., 18:2 refers to linoleic acid)

As seen in Table 1, when unsaturated, the fatty acid components preferably contain about 1 to about 3 double bonds. The preferred chain length of the fatty acid components ranges from about 12 to about 22 carbon atoms. The preferred fatty acid components of the triglycerides include palmitic acid (16:0), stearic acid (18:0), oleic acid (18:1), arachidic acid (20:0) and behenic acid (22:0). For example, as seen in Table 1, in a composition of exemplary embodiment A the triglyceride component of the composition preferably contains up to about 74% by weight of the 18 carbon, saturated fatty acid component stearic acid. In another composition of exemplary embodiment A, the triglyceride preferably contains up to about 73% of the monounsaturated 18 carbon fatty acid component oleic acid. In yet a further composition of exemplary embodiment A, the triglyceride contains up to about 39% of the fatty acid component palmitic acid.

Over three hundred candle compositions were tested with triglycerides having various fatty acid components. Table 1B lists the fatty acid components of the triglycerides in each candle composition tested. The fatty acid compositions of the triglycerides were determined by analyzing the triglycerides with a gas chromatograph.

Additionally, Table 1B lists the percent by weight of the triglyceride composition in the resultant candle. As seen in Table 1B, in one composition of exemplary embodiment A, the candle composition is comprised of 100 percent by weight of triglycerides. For candle compositions listed in Table 1B which are not 100 percent by weight triglycerides, the non-triglyceride percent by weight of the candle is comprised of free fatty acids, petroleum waxes, natural waxes, odorants, colorants, antioxidants, or combinations thereof. Further, for candle compositions listed in Table 1B which are not 100 percent by weight triglycerides, the non-triglyceride percent by weight is comprised of natural waxes, as discussed in connection with exemplary embodiment B and/or of plant derived crystal modifier as discussed in connection with exemplary embodiment C.

TABLE 1B

Tested Triglyceride Compositions

| Run | 12:0 | 14:0 | 16:0 | 18:0 | 20:0 | 22:0 | 16:1 | 18:1 | 20:1 | 18:2 | 18:3 | Percent by weight of Total Candle |
|---|---|---|---|---|---|---|---|---|---|---|---|---|
| 1 | 0.000 | 0.000 | 13.726 | 74.223 | 0.000 | 0.000 | 0.000 | 12.051 | 0.000 | 0.000 | 0.000 | 100.000 |
| 2 | 0.000 | 0.000 | 13.298 | 62.497 | 0.000 | 0.000 | 0.000 | 24.205 | 0.000 | 0.000 | 0.000 | 100.000 |
| 3 | 0.000 | 0.000 | 13.084 | 56.634 | 0.000 | 0.000 | 0.000 | 30.282 | 0.000 | 0.000 | 0.000 | 100.000 |
| 4 | 0.000 | 0.000 | 12.870 | 50.771 | 0.000 | 0.000 | 0.000 | 36.356 | 0.000 | 0.000 | 0.000 | 100.000 |
| 5 | 0.000 | 0.000 | 12.656 | 44.908 | 0.000 | 0.000 | 0.000 | 42.436 | 0.000 | 0.000 | 0.000 | 100.000 |
| 6 | 0.000 | 0.000 | 13.726 | 74.223 | 0.000 | 0.000 | 0.000 | 12.051 | 0.000 | 0.000 | 0.000 | 100.000 |
| 7 | 0.000 | 0.000 | 13.512 | 68.360 | 0.000 | 0.000 | 0.000 | 18.128 | 0.000 | 0.000 | 0.000 | 100.000 |
| 8 | 0.000 | 0.000 | 13.298 | 62.497 | 0.000 | 0.000 | 0.000 | 24.205 | 0.000 | 0.000 | 0.000 | 100.000 |
| 9 | 0.000 | 0.000 | 13.084 | 56.634 | 0.000 | 0.000 | 0.000 | 30.282 | 0.000 | 0.000 | 0.000 | 100.000 |
| 10 | 0.000 | 0.000 | 12.870 | 50.771 | 0.000 | 0.000 | 0.000 | 36.359 | 0.000 | 0.000 | 0.000 | 100.000 |
| 11 | 0.000 | 0.000 | 12.656 | 44.908 | 0.000 | 0.000 | 0.000 | 42.436 | 0.000 | 0.000 | 0.000 | 100.000 |
| 12 | 0.000 | 0.000 | 13.488 | 67.709 | 0.000 | 0.000 | 0.000 | 18.803 | 0.000 | 0.000 | 0.000 | 90.000 |
| 13 | 0.000 | 0.000 | 13.250 | 61.194 | 0.000 | 0.000 | 0.000 | 25.555 | 0.000 | 0.000 | 0.000 | 90.000 |
| 14 | 0.000 | 0.000 | 13.013 | 54.680 | 0.000 | 0.000 | 0.000 | 32.308 | 0.000 | 0.000 | 0.000 | 90.000 |
| 15 | 0.000 | 0.000 | 12.775 | 48.165 | 0.000 | 0.000 | 0.000 | 39.060 | 0.000 | 0.000 | 0.000 | 90.000 |
| 16 | 0.000 | 0.000 | 12.537 | 41.651 | 0.000 | 0.000 | 0.000 | 45.812 | 0.000 | 0.000 | 0.000 | 90.000 |
| 17 | 0.000 | 0.000 | 13.726 | 74.223 | 0.000 | 0.000 | 0.000 | 12.051 | 0.000 | 0.000 | 0.000 | 99.000 |
| 18 | 0.000 | 0.000 | 13.510 | 68.301 | 0.000 | 0.000 | 0.000 | 18.189 | 0.000 | 0.000 | 0.000 | 99.000 |
| 19 | 0.000 | 0.000 | 13.294 | 62.379 | 0.000 | 0.000 | 0.000 | 24.328 | 0.000 | 0.000 | 0.000 | 99.000 |
| 20 | 0.000 | 0.000 | 13.078 | 56.456 | 0.000 | 0.000 | 0.000 | 30.466 | 0.000 | 0.000 | 0.000 | 99.000 |
| 21 | 0.000 | 0.000 | 12.861 | 50.534 | 0.000 | 0.000 | 0.000 | 36.605 | 0.000 | 0.000 | 0.000 | 99.000 |
| 22 | 0.000 | 0.000 | 12.645 | 44.612 | 0.000 | 0.000 | 0.000 | 42.743 | 0.000 | 0.000 | 0.000 | 99.000 |
| 23 | 0.000 | 0.000 | 12.442 | 39.045 | 0.000 | 0.000 | 0.000 | 48.513 | 0.000 | 0.000 | 0.000 | 100.000 |
| 24 | 0.000 | 0.000 | 12.228 | 33.182 | 0.000 | 0.000 | 0.000 | 54.590 | 0.000 | 0.000 | 0.000 | 100.000 |
| 25 | 0.000 | 0.000 | 12.014 | 27.319 | 0.000 | 0.000 | 0.000 | 60.667 | 0.000 | 0.000 | 0.000 | 100.000 |
| 26 | 0.000 | 0.000 | 11.800 | 21.456 | 0.000 | 0.000 | 0.000 | 66.744 | 0.000 | 0.000 | 0.000 | 100.000 |
| 27 | 0.000 | 0.000 | 11.586 | 15.593 | 0.000 | 0.000 | 0.000 | 72.821 | 0.000 | 0.000 | 0.000 | 100.000 |
| 28 | 0.000 | 0.000 | 0.000 | 0.000 | 0.000 | 0.000 | 0.000 | 0.000 | 0.000 | 0.000 | 0.000 | 100.000 |
| 29 | 0.000 | 0.000 | 11.477 | 19.033 | 0.000 | 0.000 | 0.000 | 60.963 | 0.000 | 8.526 | 0.000 | 100.000 |
| 30 | 0.000 | 0.000 | 13.726 | 74.223 | 0.000 | 0.000 | 0.000 | 12.051 | 0.000 | 0.000 | 0.000 | 100.000 |
| 31 | 0.000 | 0.000 | 12.353 | 66.801 | 0.000 | 0.000 | 0.000 | 10.846 | 0.000 | 0.000 | 0.000 | 100.000 |
| 32 | 0.000 | 0.000 | 10.981 | 59.378 | 0.000 | 0.000 | 0.000 | 9.641 | 0.000 | 0.000 | 0.000 | 100.000 |
| 33 | 0.000 | 0.000 | 9.608 | 51.956 | 0.000 | 0.000 | 0.000 | 8.436 | 0.000 | 0.000 | 0.000 | 100.000 |
| 34 | 0.000 | 0.000 | 8.236 | 44.534 | 0.000 | 0.000 | 0.000 | 7.231 | 0.000 | 0.000 | 0.000 | 100.000 |
| 35 | 0.000 | 0.000 | 6.863 | 37.111 | 0.000 | 0.000 | 0.000 | 6.025 | 0.000 | 0.000 | 0.000 | 100.000 |
| 36 | 0.000 | 0.000 | 12.442 | 39.045 | 0.000 | 0.000 | 0.000 | 48.513 | 0.000 | 0.000 | 0.000 | 100.000 |
| 37 | 0.000 | 0.000 | 12.228 | 33.182 | 0.000 | 0.000 | 0.000 | 54.590 | 0.000 | 0.000 | 0.000 | 100.000 |
| 38 | 0.000 | 0.000 | 12.014 | 27.319 | 0.000 | 0.000 | 0.000 | 60.667 | 0.000 | 0.000 | 0.000 | 100.000 |
| 39 | 0.000 | 0.000 | 11.800 | 21.456 | 0.000 | 0.000 | 0.000 | 66.744 | 0.000 | 0.000 | 0.000 | 100.000 |
| 40 | 0.000 | 0.000 | 11.586 | 15.593 | 0.000 | 0.000 | 0.000 | 72.821 | 0.000 | 0.000 | 0.000 | 100.000 |
| 41 | 0.000 | 0.000 | 0.275 | 1.484 | 0.000 | 0.000 | 0.000 | 0.241 | 0.000 | 0.000 | 0.000 | 100.000 |
| 42 | 0.000 | 0.000 | 12.014 | 27.319 | 0.000 | 0.000 | 0.000 | 60.667 | 0.000 | 0.000 | 0.000 | 99.500 |
| 43 | 0.000 | 0.000 | 11.800 | 21.456 | 0.000 | 0.000 | 0.000 | 66.744 | 0.000 | 0.000 | 0.000 | 99.500 |
| 44 | 0.000 | 0.000 | 11.586 | 15.593 | 0.000 | 0.000 | 0.000 | 72.821 | 0.000 | 0.000 | 0.000 | 99.500 |
| 45 | 0.000 | 0.000 | 12.014 | 27.319 | 0.000 | 0.000 | 0.000 | 60.667 | 0.000 | 0.000 | 0.000 | 90.000 |
| 46 | 0.000 | 0.000 | 12.228 | 33.182 | 0.000 | 0.000 | 0.000 | 54.590 | 0.000 | 0.000 | 0.000 | 90.000 |
| 47 | 0.000 | 0.000 | 12.442 | 39.045 | 0.000 | 0.000 | 0.000 | 48.513 | 0.000 | 0.000 | 0.000 | 90.000 |
| 48 | 0.000 | 0.000 | 11.758 | 25.932 | 0.000 | 0.000 | 0.000 | 54.849 | 0.000 | 7.461 | 0.000 | 100.000 |
| 49 | 0.000 | 0.000 | 12.039 | 32.831 | 0.000 | 0.000 | 0.000 | 48.735 | 0.000 | 6.395 | 0.000 | 100.000 |
| 50 | 0.000 | 0.000 | 12.321 | 39.730 | 0.000 | 0.000 | 0.000 | 42.621 | 0.000 | 5.329 | 0.000 | 100.000 |
| 51 | 0.000 | 0.000 | 5.490 | 29.689 | 0.000 | 0.000 | 0.000 | 4.820 | 0.000 | 0.000 | 0.000 | 100.000 |
| 52 | 0.000 | 0.000 | 4.118 | 22.267 | 0.000 | 0.000 | 0.000 | 3.615 | 0.000 | 0.000 | 0.000 | 100.000 |
| 53 | 0.000 | 0.000 | 2.745 | 14.845 | 0.000 | 0.000 | 0.000 | 2.410 | 0.000 | 0.000 | 0.000 | 100.000 |
| 54 | 0.000 | 0.000 | 5.490 | 29.689 | 0.000 | 0.000 | 0.000 | 4.820 | 0.000 | 0.000 | 0.000 | 90.000 |
| 55 | 0.000 | 0.000 | 4.118 | 22.267 | 0.000 | 0.000 | 0.000 | 3.615 | 0.000 | 0.000 | 0.000 | 90.000 |
| 56 | 0.000 | 0.000 | 2.745 | 14.845 | 0.000 | 0.000 | 0.000 | 2.410 | 0.000 | 0.000 | 0.000 | 90.000 |
| 57 | 0.000 | 0.000 | 6.284 | 9.779 | 0.000 | 0.000 | 0.000 | 34.141 | 0.000 | 4.796 | 0.000 | 100.000 |
| 58 | 0.000 | 0.000 | 11.758 | 25.932 | 0.000 | 0.000 | 0.000 | 54.849 | 0.000 | 7.461 | 0.000 | 100.000 |
| 59 | 0.000 | 0.000 | 2.745 | 14.845 | 0.000 | 0.000 | 0.000 | 2.410 | 0.000 | 0.000 | 0.000 | 100.000 |
| 60 | 0.000 | 0.000 | 1.373 | 7.422 | 0.000 | 0.000 | 0.000 | 1.205 | 0.000 | 0.000 | 0.000 | 100.000 |
| 61 | 0.000 | 0.000 | 11.800 | 21.456 | 0.000 | 0.000 | 0.000 | 66.744 | 0.000 | 0.000 | 0.000 | 90.000 |
| 62 | 0.000 | 0.000 | 11.800 | 21.456 | 0.000 | 0.000 | 0.000 | 66.744 | 0.000 | 0.000 | 0.000 | 90.000 |
| 63 | 0.000 | 0.000 | 11.800 | 21.456 | 0.000 | 0.000 | 0.000 | 66.744 | 0.000 | 0.000 | 0.000 | 95.000 |
| 64 | 0.000 | 0.000 | 11.800 | 21.456 | 0.000 | 0.000 | 0.000 | 66.744 | 0.000 | 0.000 | 0.000 | 99.000 |
| 65 | 0.000 | 0.000 | 11.799 | 21.427 | 0.000 | 0.000 | 0.000 | 66.775 | 0.000 | 0.000 | 0.000 | 99.500 |
| 66 | 0.000 | 0.000 | 11.800 | 21.456 | 0.000 | 0.000 | 0.000 | 66.744 | 0.000 | 0.000 | 0.000 | 100.000 |

TABLE 1B-continued

Tested Triglyceride Compositions

| Run | 12:0 | 14:0 | 16:0 | 18:0 | 20:0 | 22:0 | 16:1 | 18:1 | 20:1 | 18:2 | 18:3 | Percent by weight of Total Candle |
|---|---|---|---|---|---|---|---|---|---|---|---|---|
| 67 | 0.000 | 0.000 | 11.800 | 21.456 | 0.000 | 0.000 | 0.000 | 66.744 | 0.000 | 0.000 | 0.000 | 100.000 |
| 68 | 0.000 | 0.000 | 11.800 | 21.456 | 0.000 | 0.000 | 0.000 | 66.744 | 0.000 | 0.000 | 0.000 | 95.000 |
| 69 | 0.000 | 0.000 | 11.800 | 21.456 | 0.000 | 0.000 | 0.000 | 66.744 | 0.000 | 0.000 | 0.000 | 99.000 |
| 70 | 0.000 | 0.000 | 11.800 | 21.456 | 0.000 | 0.000 | 0.000 | 66.744 | 0.000 | 0.000 | 0.000 | 95.000 |
| 71 | 0.000 | 0.000 | 11.800 | 21.456 | 0.000 | 0.000 | 0.000 | 66.744 | 0.000 | 0.000 | 0.000 | 90.000 |
| 72 | 0.000 | 0.000 | 11.800 | 21.456 | 0.000 | 0.000 | 0.000 | 66.744 | 0.000 | 0.000 | 0.000 | 99.000 |
| 73 | 0.000 | 0.000 | 11.800 | 21.456 | 0.000 | 0.000 | 0.000 | 66.744 | 0.000 | 0.000 | 0.000 | 98.000 |
| 74 | 0.000 | 0.000 | 11.800 | 21.456 | 0.000 | 0.000 | 0.000 | 66.744 | 0.000 | 0.000 | 0.000 | 97.000 |
| 75 | 0.000 | 0.000 | 11.800 | 21.456 | 0.000 | 0.000 | 0.000 | 66.744 | 0.000 | 0.000 | 0.000 | 96.000 |
| 76 | 0.000 | 0.000 | 11.800 | 21.456 | 0.000 | 0.000 | 0.000 | 66.744 | 0.000 | 0.000 | 0.000 | 94.000 |
| 77 | 0.000 | 0.000 | 11.800 | 21.456 | 0.000 | 0.000 | 0.000 | 66.744 | 0.000 | 0.000 | 0.000 | 93.000 |
| 78 | 0.000 | 0.000 | 11.800 | 21.456 | 0.000 | 0.000 | 0.000 | 66.744 | 0.000 | 0.000 | 0.000 | 92.000 |
| 79 | 0.000 | 0.000 | 11.800 | 21.456 | 0.000 | 0.000 | 0.000 | 66.744 | 0.000 | 0.000 | 0.000 | 91.000 |
| 80 | 0.000 | 0.000 | 11.800 | 21.456 | 0.000 | 0.000 | 0.000 | 66.744 | 0.000 | 0.000 | 0.000 | 95.000 |
| 81 | 0.000 | 0.000 | 11.800 | 21.456 | 0.000 | 0.000 | 0.000 | 66.744 | 0.000 | 0.000 | 0.000 | 95.000 |
| 82 | 0.000 | 0.000 | 11.800 | 21.456 | 0.000 | 0.000 | 0.000 | 66.744 | 0.000 | 0.000 | 0.000 | 95.000 |
| 83 | 0.000 | 0.000 | 11.800 | 21.458 | 0.000 | 0.000 | 0.000 | 66.741 | 0.000 | 0.000 | 0.000 | 96.760 |
| 84 | 0.000 | 0.000 | 11.800 | 21.456 | 0.000 | 0.000 | 0.000 | 66.744 | 0.000 | 0.000 | 0.000 | 96.000 |
| 85 | 0.000 | 0.000 | 11.800 | 21.456 | 0.000 | 0.000 | 0.000 | 66.744 | 0.000 | 0.000 | 0.000 | 95.000 |
| 86 | 0.000 | 0.000 | 11.800 | 21.456 | 0.000 | 0.000 | 0.000 | 66.744 | 0.000 | 0.000 | 0.000 | 96.000 |
| 87 | 0.000 | 0.000 | 11.586 | 15.593 | 0.000 | 0.000 | 0.000 | 72.821 | 0.000 | 0.000 | 0.000 | 90.000 |
| 88 | 0.000 | 0.000 | 11.586 | 15.593 | 0.000 | 0.000 | 0.000 | 72.821 | 0.000 | 0.000 | 0.000 | 80.000 |
| 89 | 0.000 | 0.000 | 11.586 | 15.593 | 0.000 | 0.000 | 0.000 | 72.821 | 0.000 | 0.000 | 0.000 | 70.000 |
| 90 | 0.000 | 0.000 | 11.586 | 15.593 | 0.000 | 0.000 | 0.000 | 72.821 | 0.000 | 0.000 | 0.000 | 60.000 |
| 91 | 0.000 | 0.000 | 11.586 | 15.593 | 0.000 | 0.000 | 0.000 | 72.821 | 0.000 | 0.000 | 0.000 | 50.000 |
| 92 | 0.000 | 0.000 | 11.800 | 21.456 | 0.000 | 0.000 | 0.000 | 66.744 | 0.000 | 0.000 | 0.000 | 94.000 |
| 93 | 0.000 | 0.000 | 11.800 | 21.456 | 0.000 | 0.000 | 0.000 | 66.744 | 0.000 | 0.000 | 0.000 | 96.000 |
| 94 | 0.000 | 0.000 | 11.800 | 21.456 | 0.000 | 0.000 | 0.000 | 66.744 | 0.000 | 0.000 | 0.000 | 98.000 |
| 95 | 0.000 | 0.000 | 11.800 | 21.456 | 0.000 | 0.000 | 0.000 | 66.744 | 0.000 | 0.000 | 0.000 | 100.000 |
| 96 | 0.000 | 0.000 | 11.800 | 21.456 | 0.000 | 0.000 | 0.000 | 66.744 | 0.000 | 0.000 | 0.000 | 95.000 |
| 97 | 0.000 | 0.000 | 11.586 | 15.593 | 0.000 | 0.000 | 0.000 | 72.821 | 0.000 | 0.000 | 0.000 | 100.000 |
| 98 | 0.000 | 0.000 | 11.586 | 15.593 | 0.000 | 0.000 | 0.000 | 72.821 | 0.000 | 0.000 | 0.000 | 80.000 |
| 99 | 0.000 | 0.000 | 11.586 | 15.593 | 0.000 | 0.000 | 0.000 | 72.821 | 0.000 | 0.000 | 0.000 | 60.000 |
| 100 | 0.000 | 0.000 | 11.586 | 15.593 | 0.000 | 0.000 | 0.000 | 72.821 | 0.000 | 0.000 | 0.000 | 90.000 |
| 101 | 0.000 | 0.000 | 11.586 | 15.593 | 0.000 | 0.000 | 0.000 | 72.821 | 0.000 | 0.000 | 0.000 | 95.000 |
| 102 | 0.000 | 0.000 | 11.586 | 15.593 | 0.000 | 0.000 | 0.000 | 72.821 | 0.000 | 0.000 | 0.000 | 95.000 |
| 103 | 0.000 | 0.000 | 11.586 | 15.593 | 0.000 | 0.000 | 0.000 | 72.821 | 0.000 | 0.000 | 0.000 | 90.000 |
| 104 | 0.000 | 0.000 | 11.586 | 15.593 | 0.000 | 0.000 | 0.000 | 72.821 | 0.000 | 0.000 | 0.000 | 80.000 |
| 105 | 0.000 | 0.000 | 11.586 | 15.593 | 0.000 | 0.000 | 0.000 | 72.821 | 0.000 | 0.000 | 0.000 | 95.000 |
| 106 | 0.000 | 0.000 | 11.586 | 15.593 | 0.000 | 0.000 | 0.000 | 72.821 | 0.000 | 0.000 | 0.000 | 90.000 |
| 107 | 0.000 | 0.000 | 11.586 | 15.593 | 0.000 | 0.000 | 0.000 | 72.821 | 0.000 | 0.000 | 0.000 | 80.000 |
| 108 | 0.000 | 0.000 | 11.586 | 15.593 | 0.000 | 0.000 | 0.000 | 72.821 | 0.000 | 0.000 | 0.000 | 95.000 |
| 109 | 0.000 | 0.000 | 11.586 | 15.593 | 0.000 | 0.000 | 0.000 | 72.821 | 0.000 | 0.000 | 0.000 | 95.000 |
| 110 | 0.000 | 0.000 | 11.586 | 15.593 | 0.000 | 0.000 | 0.000 | 72.821 | 0.000 | 0.000 | 0.000 | 95.000 |
| 111 | 0.000 | 0.000 | 11.586 | 15.593 | 0.000 | 0.000 | 0.000 | 72.821 | 0.000 | 0.000 | 0.000 | 98.000 |
| 112 | 0.000 | 0.000 | 11.586 | 15.593 | 0.000 | 0.000 | 0.000 | 72.821 | 0.000 | 0.000 | 0.000 | 97.000 |
| 113 | 0.000 | 0.000 | 11.586 | 15.593 | 0.000 | 0.000 | 0.000 | 72.821 | 0.000 | 0.000 | 0.000 | 96.000 |
| 114 | 0.000 | 0.000 | 11.586 | 15.593 | 0.000 | 0.000 | 0.000 | 72.821 | 0.000 | 0.000 | 0.000 | 95.000 |
| 115 | 0.000 | 0.000 | 11.586 | 15.593 | 0.000 | 0.000 | 0.000 | 72.821 | 0.000 | 0.000 | 0.000 | 99.000 |
| 116 | 0.000 | 0.000 | 11.586 | 15.593 | 0.000 | 0.000 | 0.000 | 72.821 | 0.000 | 0.000 | 0.000 | 99.500 |
| 117 | 0.000 | 0.000 | 11.586 | 15.593 | 0.000 | 0.000 | 0.000 | 72.821 | 0.000 | 0.000 | 0.000 | 99.750 |
| 118 | 0.000 | 0.000 | 11.586 | 15.593 | 0.000 | 0.000 | 0.000 | 72.821 | 0.000 | 0.000 | 0.000 | 90.250 |
| 119 | 0.000 | 0.000 | 11.586 | 15.593 | 0.000 | 0.000 | 0.000 | 72.821 | 0.000 | 0.000 | 0.000 | 96.000 |
| 120 | 0.000 | 0.000 | 11.586 | 15.593 | 0.000 | 0.000 | 0.000 | 72.821 | 0.000 | 0.000 | 0.000 | 91.200 |
| 121 | 0.000 | 0.000 | 11.586 | 15.593 | 0.000 | 0.000 | 0.000 | 72.821 | 0.000 | 0.000 | 0.000 | 96.000 |
| 122 | 0.000 | 0.000 | 11.586 | 15.593 | 0.000 | 0.000 | 0.000 | 72.821 | 0.000 | 0.000 | 0.000 | 96.000 |
| 123 | 0.000 | 0.000 | 11.586 | 15.593 | 0.000 | 0.000 | 0.000 | 72.821 | 0.000 | 0.000 | 0.000 | 91.000 |
| 124 | 0.000 | 0.000 | 11.586 | 15.593 | 0.000 | 0.000 | 0.000 | 72.821 | 0.000 | 0.000 | 0.000 | 96.000 |
| 125 | 0.000 | 0.000 | 11.586 | 15.593 | 0.000 | 0.000 | 0.000 | 72.821 | 0.000 | 0.000 | 0.000 | 92.000 |
| 126 | 0.000 | 0.000 | 11.586 | 15.593 | 0.000 | 0.000 | 0.000 | 72.821 | 0.000 | 0.000 | 0.000 | 96.000 |
| 127 | 0.000 | 0.000 | 11.586 | 15.593 | 0.000 | 0.000 | 0.000 | 72.821 | 0.000 | 0.000 | 0.000 | 92.000 |
| 128 | 0.000 | 0.000 | 11.699 | 18.679 | 0.000 | 0.000 | 0.000 | 69.623 | 0.000 | 0.000 | 0.000 | 90.250 |
| 129 | 0.000 | 0.000 | 10.427 | 14.034 | 0.000 | 0.000 | 0.000 | 65.539 | 0.000 | 0.000 | 0.000 | 100.000 |
| 130 | 0.000 | 0.000 | 8.690 | 11.695 | 0.000 | 0.000 | 0.000 | 54.616 | 0.000 | 0.000 | 0.000 | 100.000 |
| 131 | 0.000 | 0.000 | 11.586 | 15.593 | 0.000 | 0.000 | 0.000 | 72.821 | 0.000 | 0.000 | 0.000 | 85.000 |
| 132 | 0.000 | 0.000 | 11.617 | 27.526 | 0.000 | 0.000 | 0.000 | 0.857 | 0.000 | 0.000 | 0.000 | 100.000 |
| 133 | 0.000 | 0.000 | 2.904 | 6.881 | 0.000 | 0.000 | 0.000 | 0.214 | 0.000 | 0.000 | 0.000 | 100.000 |
| 134 | 0.000 | 0.000 | 18.569 | 36.882 | 0.000 | 0.000 | 0.000 | 44.549 | 0.000 | 0.000 | 0.000 | 100.000 |
| 135 | 0.000 | 0.000 | 15.950 | 28.898 | 0.000 | 0.000 | 0.000 | 55.151 | 0.000 | 0.000 | 0.000 | 100.000 |
| 136 | 0.000 | 0.000 | 13.332 | 20.915 | 0.000 | 0.000 | 0.000 | 65.753 | 0.000 | 0.000 | 0.000 | 100.000 |
| 137 | 0.000 | 0.000 | 0.000 | 0.000 | 0.000 | 0.000 | 0.000 | 0.000 | 0.000 | 0.000 | 0.000 | 100.000 |

TABLE 1B-continued

Tested Triglyceride Compositions

| Run | 12:0 | 14:0 | 16:0 | 18:0 | 20:0 | 22:0 | 16:1 | 18:1 | 20:1 | 18:2 | 18:3 | Percent by weight of Total Candle |
|---|---|---|---|---|---|---|---|---|---|---|---|---|
| 138 | 0.000 | 0.000 | 11.586 | 15.593 | 0.000 | 0.000 | 0.000 | 72.821 | 0.000 | 0.000 | 0.000 | 99.500 |
| 139 | 0.000 | 0.000 | 11.586 | 15.593 | 0.000 | 0.000 | 0.000 | 72.821 | 0.000 | 0.000 | 0.000 | 99.800 |
| 140 | 0.210 | 0.770 | 35.688 | 25.557 | 0.140 | 0.000 | 0.070 | 30.775 | 0.000 | 6.580 | 0.210 | 100.000 |
| 141 | 0.000 | 0.000 | 11.586 | 15.593 | 0.000 | 0.000 | 0.000 | 72.821 | 0.000 | 0.000 | 0.000 | 95.000 |
| 142 | 0.000 | 0.000 | 11.586 | 15.593 | 0.000 | 0.000 | 0.000 | 72.821 | 0.000 | 0.000 | 0.000 | 70.000 |
| 143 | 0.000 | 0.000 | 19.979 | 37.026 | 0.000 | 0.000 | 0.000 | 37.666 | 0.000 | 5.329 | 0.000 | 100.000 |
| 144 | 0.000 | 0.000 | 9.171 | 21.731 | 0.000 | 0.000 | 0.000 | 0.676 | 0.000 | 0.000 | 0.000 | 95.000 |
| 145 | 0.000 | 0.000 | 11.586 | 15.593 | 0.000 | 0.000 | 0.000 | 72.821 | 0.000 | 0.000 | 0.000 | 99.800 |
| 146 | 0.000 | 0.000 | 11.586 | 15.593 | 0.000 | 0.000 | 0.000 | 72.821 | 0.000 | 0.000 | 0.000 | 99.500 |
| 147 | 0.000 | 0.000 | 11.586 | 15.593 | 0.000 | 0.000 | 0.000 | 72.821 | 0.000 | 0.000 | 0.000 | 92.000 |
| 148 | 0.000 | 0.000 | 11.705 | 18.850 | 0.000 | 0.000 | 0.000 | 69.445 | 0.000 | 0.000 | 0.000 | 90.000 |
| 149 | 0.000 | 0.000 | 13.726 | 74.223 | 0.000 | 0.000 | 0.000 | 12.051 | 0.000 | 0.000 | 0.000 | 100.000 |
| 150 | 0.000 | 0.000 | 29.043 | 68.815 | 0.000 | 0.000 | 0.000 | 2.142 | 0.000 | 0.000 | 0.000 | 100.000 |
| 151 | 0.000 | 0.000 | 11.758 | 25.932 | 0.000 | 0.000 | 0.000 | 54.849 | 0.000 | 7.461 | 0.000 | 100.000 |
| 152 | 0.000 | 0.000 | 11.705 | 18.850 | 0.000 | 0.000 | 0.000 | 69.445 | 0.000 | 0.000 | 0.000 | 90.000 |
| 153 | 0.000 | 0.000 | 11.824 | 22.107 | 0.000 | 0.000 | 0.000 | 66.069 | 0.000 | 0.000 | 0.000 | 90.000 |
| 154 | 0.000 | 0.000 | 11.943 | 25.365 | 0.000 | 0.000 | 0.000 | 62.693 | 0.000 | 0.000 | 0.000 | 90.000 |
| 155 | 0.000 | 0.000 | 12.062 | 28.622 | 0.000 | 0.000 | 0.000 | 59.317 | 0.000 | 0.000 | 0.000 | 90.000 |
| 156 | 0.000 | 0.000 | 11.586 | 15.593 | 0.000 | 0.000 | 0.000 | 72.821 | 0.000 | 0.000 | 0.000 | 86.600 |
| 157 | 0.000 | 0.000 | 11.586 | 15.593 | 0.000 | 0.000 | 0.000 | 72.821 | 0.000 | 0.000 | 0.000 | 85.800 |
| 158 | 0.000 | 0.000 | 11.586 | 15.593 | 0.000 | 0.000 | 0.000 | 72.821 | 0.000 | 0.000 | 0.000 | 84.600 |
| 159 | 0.000 | 0.000 | 12.180 | 31.876 | 0.000 | 0.000 | 0.000 | 55.940 | 0.000 | 0.000 | 0.000 | 90.000 |
| 160 | 0.000 | 0.000 | 12.299 | 35.136 | 0.000 | 0.000 | 0.000 | 52.564 | 0.000 | 0.000 | 0.000 | 90.000 |
| 161 | 0.000 | 0.000 | 12.418 | 38.394 | 0.000 | 0.000 | 0.000 | 49.188 | 0.000 | 0.000 | 0.000 | 90.000 |
| 162 | 0.000 | 0.000 | 11.586 | 15.593 | 0.000 | 0.000 | 0.000 | 72.821 | 0.000 | 0.000 | 0.000 | 90.000 |
| 163 | 0.000 | 0.000 | 11.699 | 18.679 | 0.000 | 0.000 | 0.000 | 69.623 | 0.000 | 0.000 | 0.000 | 95.000 |
| 164 | 0.000 | 0.000 | 11.586 | 15.593 | 0.000 | 0.000 | 0.000 | 72.821 | 0.000 | 0.000 | 0.000 | 95.000 |
| 165 | 0.000 | 0.000 | 11.699 | 18.679 | 0.000 | 0.000 | 0.000 | 69.623 | 0.000 | 0.000 | 0.000 | 95.000 |
| 166 | 0.000 | 0.000 | 11.586 | 15.593 | 0.000 | 0.000 | 0.000 | 72.821 | 0.000 | 0.000 | 0.000 | 95.000 |
| 167 | 0.000 | 0.000 | 19.502 | 35.352 | 0.000 | 0.000 | 0.000 | 39.536 | 0.000 | 5.609 | 0.000 | 95.000 |
| 168 | 0.000 | 0.000 | 13.424 | 21.195 | 0.000 | 0.000 | 0.000 | 65.381 | 0.000 | 0.000 | 0.000 | 95.000 |
| 169 | 0.000 | 0.000 | 11.699 | 18.679 | 0.000 | 0.000 | 0.000 | 69.623 | 0.000 | 0.000 | 0.000 | 95.000 |
| 170 | 0.000 | 0.000 | 18.548 | 32.006 | 0.000 | 0.000 | 0.000 | 43.276 | 0.000 | 6.170 | 0.000 | 95.000 |
| 171 | 0.000 | 0.000 | 17.594 | 28.660 | 0.000 | 0.000 | 0.000 | 47.015 | 0.000 | 6.731 | 0.000 | 95.000 |
| 172 | 0.000 | 0.000 | 11.699 | 18.679 | 0.000 | 0.000 | 0.000 | 69.623 | 0.000 | 0.000 | 0.000 | 95.000 |
| 173 | 0.000 | 0.000 | 12.229 | 28.975 | 0.000 | 0.000 | 0.000 | 0.902 | 0.000 | 0.000 | 0.000 | 95.000 |
| 174 | 0.000 | 0.000 | 11.699 | 18.679 | 0.000 | 0.000 | 0.000 | 69.623 | 0.000 | 0.000 | 0.000 | 95.000 |
| 175 | 0.000 | 0.000 | 18.368 | 31.374 | 0.000 | 0.000 | 0.000 | 43.982 | 0.000 | 6.276 | 0.000 | 90.000 |
| 176 | 0.000 | 0.000 | 5.057 | 27.345 | 0.000 | 0.000 | 0.000 | 4.440 | 0.000 | 0.000 | 0.000 | 95.000 |
| 177 | 0.000 | 0.000 | 3.612 | 19.532 | 0.000 | 0.000 | 0.000 | 3.171 | 0.000 | 0.000 | 0.000 | 95.000 |
| 178 | 0.000 | 0.000 | 10.700 | 25.353 | 0.000 | 0.000 | 0.000 | 0.789 | 0.000 | 0.000 | 0.000 | 95.000 |
| 179 | 0.000 | 0.000 | 11.811 | 21.765 | 0.000 | 0.000 | 0.000 | 66.424 | 0.000 | 0.000 | 0.000 | 95.000 |
| 180 | 0.000 | 0.000 | 11.924 | 24.850 | 0.000 | 0.000 | 0.000 | 63.226 | 0.000 | 0.000 | 0.000 | 95.000 |
| 181 | 0.000 | 0.000 | 11.943 | 25.365 | 0.000 | 0.000 | 0.000 | 62.693 | 0.000 | 0.000 | 0.000 | 90.000 |
| 182 | 0.000 | 0.000 | 18.711 | 37.316 | 0.000 | 0.000 | 0.000 | 43.972 | 0.000 | 0.000 | 0.000 | 98.000 |
| 183 | 0.000 | 0.000 | 19.794 | 36.377 | 0.000 | 0.000 | 0.000 | 38.391 | 0.000 | 5.438 | 0.000 | 98.000 |
| 184 | 0.000 | 0.000 | 19.979 | 37.026 | 0.000 | 0.000 | 0.000 | 37.666 | 0.000 | 5.329 | 0.000 | 100.000 |
| 185 | 0.000 | 0.000 | 11.824 | 22.107 | 0.000 | 0.000 | 0.000 | 66.069 | 0.000 | 0.000 | 0.000 | 90.000 |
| 186 | 0.000 | 0.000 | 11.943 | 25.365 | 0.000 | 0.000 | 0.000 | 62.693 | 0.000 | 0.000 | 0.000 | 90.000 |
| 187 | 0.000 | 0.000 | 11.699 | 18.679 | 0.000 | 0.000 | 0.000 | 69.623 | 0.000 | 0.000 | 0.000 | 95.000 |
| 188 | 0.000 | 0.000 | 11.859 | 23.085 | 0.000 | 0.000 | 0.000 | 65.056 | 0.000 | 0.000 | 0.000 | 90.000 |
| 189 | 0.000 | 0.000 | 11.907 | 24.387 | 0.000 | 0.000 | 0.000 | 63.706 | 0.000 | 0.000 | 0.000 | 90.000 |
| 190 | 0.000 | 0.000 | 11.699 | 18.679 | 0.000 | 0.000 | 0.000 | 69.623 | 0.000 | 0.000 | 0.000 | 47.500 |
| 191 | 0.000 | 0.000 | 18.127 | 30.531 | 0.000 | 0.000 | 0.000 | 44.924 | 0.000 | 6.418 | 0.000 | 93.000 |
| 192 | 0.000 | 0.000 | 11.871 | 23.410 | 0.000 | 0.000 | 0.000 | 64.718 | 0.000 | 0.000 | 0.000 | 90.000 |
| 193 | 0.000 | 0.000 | 11.586 | 15.593 | 0.000 | 0.000 | 0.000 | 72.821 | 0.000 | 0.000 | 0.000 | 67.500 |
| 194 | 0.000 | 0.000 | 18.639 | 37.097 | 0.000 | 0.000 | 0.000 | 44.264 | 0.000 | 0.000 | 0.000 | 99.000 |
| 195 | 0.000 | 0.000 | 13.349 | 20.969 | 0.000 | 0.000 | 0.000 | 65.682 | 0.000 | 0.000 | 0.000 | 99.000 |
| 196 | 0.000 | 0.000 | 11.871 | 23.410 | 0.000 | 0.000 | 0.000 | 64.718 | 0.000 | 0.000 | 0.000 | 90.000 |
| 197 | 0.000 | 0.000 | 11.856 | 22.999 | 0.000 | 0.000 | 0.000 | 65.145 | 0.000 | 0.000 | 0.000 | 95.000 |
| 198 | 0.000 | 0.000 | 11.699 | 18.679 | 0.000 | 0.000 | 0.000 | 69.623 | 0.000 | 0.000 | 0.000 | 83.600 |
| 199 | 0.000 | 0.000 | 15.950 | 28.898 | 0.000 | 0.000 | 0.000 | 55.151 | 0.000 | 0.000 | 0.000 | 100.000 |
| 200 | 0.000 | 0.000 | 19.979 | 37.026 | 0.000 | 0.000 | 0.000 | 37.666 | 0.000 | 5.329 | 0.000 | 100.000 |
| 201 | 0.000 | 0.000 | 13.424 | 21.195 | 0.000 | 0.000 | 0.000 | 65.381 | 0.000 | 0.000 | 0.000 | 95.000 |
| 202 | 0.000 | 0.000 | 11.752 | 20.153 | 0.000 | 0.000 | 0.000 | 68.094 | 0.000 | 0.000 | 0.000 | 90.000 |
| 203 | 0.000 | 0.000 | 11.699 | 18.679 | 0.000 | 0.000 | 0.000 | 69.623 | 0.000 | 0.000 | 0.000 | 77.900 |
| 204 | 0.000 | 0.000 | 11.586 | 15.593 | 0.000 | 0.000 | 0.000 | 72.821 | 0.000 | 0.000 | 0.000 | 45.100 |
| 205 | 0.000 | 0.000 | 11.586 | 15.593 | 0.000 | 0.000 | 0.000 | 72.821 | 0.000 | 0.000 | 0.000 | 74.000 |
| 206 | 0.000 | 0.000 | 11.752 | 20.153 | 0.000 | 0.000 | 0.000 | 68.094 | 0.000 | 0.000 | 0.000 | 90.000 |
| 207 | 0.000 | 0.000 | 11.744 | 19.913 | 0.000 | 0.000 | 0.000 | 68.343 | 0.000 | 0.000 | 0.000 | 95.000 |
| 208 | 0.000 | 0.000 | 18.569 | 36.882 | 0.000 | 0.000 | 0.000 | 44.549 | 0.000 | 0.000 | 0.000 | 100.000 |

TABLE 1B-continued

Tested Triglyceride Compositions

| Run | 12:0 | 14:0 | 16:0 | 18:0 | 20:0 | 22:0 | 16:1 | 18:1 | 20:1 | 18:2 | 18:3 | Percent by weight of Total Candle |
|---|---|---|---|---|---|---|---|---|---|---|---|---|
| 209 | 0.000 | 0.000 | 29.043 | 68.815 | 0.000 | 0.000 | 0.000 | 2.142 | 0.000 | 0.000 | 0.000 | 100.000 |
| 210 | 0.000 | 0.000 | 15.950 | 28.898 | 0.000 | 0.000 | 0.000 | 55.151 | 0.000 | 0.000 | 0.000 | 100.000 |
| 211 | 0.000 | 0.000 | 18.639 | 37.097 | 0.000 | 0.000 | 0.000 | 44.264 | 0.000 | 0.000 | 0.000 | 99.000 |
| 212 | 0.000 | 0.000 | 18.711 | 37.316 | 0.000 | 0.000 | 0.000 | 43.972 | 0.000 | 0.000 | 0.000 | 98.000 |
| 213 | 0.000 | 0.000 | 15.994 | 29.033 | 0.000 | 0.000 | 0.000 | 54.973 | 0.000 | 0.000 | 0.000 | 99.000 |
| 214 | 0.000 | 0.000 | 16.039 | 29.170 | 0.000 | 0.000 | 0.000 | 54.791 | 0.000 | 0.000 | 0.000 | 98.000 |
| 215 | 0.000 | 0.000 | 16.180 | 29.599 | 0.000 | 0.000 | 0.000 | 54.221 | 0.000 | 0.000 | 0.000 | 95.000 |
| 216 | 0.000 | 0.000 | 15.686 | 21.967 | 0.000 | 0.000 | 0.000 | 54.494 | 0.000 | 7.853 | 0.000 | 95.000 |
| 217 | 0.000 | 0.000 | 16.640 | 25.314 | 0.000 | 0.000 | 0.000 | 50.754 | 0.000 | 7.292 | 0.000 | 95.000 |
| 218 | 0.000 | 0.000 | 17.594 | 28.660 | 0.000 | 0.000 | 0.000 | 47.015 | 0.000 | 6.731 | 0.000 | 95.000 |
| 219 | 0.000 | 0.000 | 16.132 | 29.453 | 0.000 | 0.000 | 0.000 | 54.415 | 0.000 | 0.000 | 0.000 | 96.000 |
| 220 | 0.000 | 0.000 | 16.085 | 29.310 | 0.000 | 0.000 | 0.000 | 54.605 | 0.000 | 0.000 | 0.000 | 97.000 |
| 221 | 0.000 | 0.000 | 16.067 | 23.306 | 0.000 | 0.000 | 0.000 | 52.998 | 0.000 | 7.629 | 0.000 | 95.000 |
| 222 | 0.000 | 0.000 | 16.580 | 25.104 | 0.000 | 0.000 | 0.000 | 50.998 | 0.000 | 7.327 | 0.000 | 96.000 |
| 223 | 0.000 | 0.000 | 16.522 | 24.900 | 0.000 | 0.000 | 0.000 | 51.217 | 0.000 | 7.362 | 0.000 | 97.000 |
| 224 | 0.000 | 0.000 | 15.721 | 22.512 | 0.000 | 0.000 | 0.000 | 54.474 | 0.000 | 7.292 | 0.000 | 95.000 |
| 225 | 0.000 | 0.000 | 16.522 | 24.900 | 0.000 | 0.000 | 0.000 | 51.217 | 0.000 | 7.362 | 0.000 | 97.000 |
| 226 | 0.000 | 0.000 | 17.665 | 28.909 | 0.000 | 0.000 | 0.000 | 46.737 | 0.000 | 6.690 | 0.000 | 94.000 |
| 227 | 0.000 | 0.000 | 17.665 | 28.909 | 0.000 | 0.000 | 0.000 | 46.737 | 0.000 | 6.690 | 0.000 | 94.000 |
| 228 | 0.000 | 0.000 | 17.324 | 27.713 | 0.000 | 0.000 | 0.000 | 48.073 | 0.000 | 6.890 | 0.000 | 99.000 |
| 229 | 0.000 | 0.000 | 17.594 | 28.660 | 0.000 | 0.000 | 0.000 | 47.015 | 0.000 | 6.731 | 0.000 | 95.000 |
| 230 | 0.000 | 0.000 | 16.464 | 24.699 | 0.000 | 0.000 | 0.000 | 51.441 | 0.000 | 7.395 | 0.000 | 98.000 |
| 231 | 0.000 | 0.000 | 16.408 | 24.502 | 0.000 | 0.000 | 0.000 | 51.661 | 0.000 | 7.428 | 0.000 | 99.000 |
| 232 | 0.000 | 0.000 | 17.665 | 28.909 | 0.000 | 0.000 | 0.000 | 46.737 | 0.000 | 6.690 | 0.000 | 94.000 |
| 233 | 0.000 | 0.000 | 17.629 | 28.784 | 0.000 | 0.000 | 0.000 | 46.877 | 0.000 | 6.711 | 0.000 | 94.500 |
| 234 | 0.000 | 0.000 | 17.611 | 28.722 | 0.000 | 0.000 | 0.000 | 46.946 | 0.000 | 6.721 | 0.000 | 94.750 |
| 235 | 0.000 | 0.000 | 17.594 | 28.660 | 0.000 | 0.000 | 0.000 | 47.015 | 0.000 | 6.731 | 0.000 | 95.000 |
| 236 | 0.000 | 0.000 | 17.524 | 28.416 | 0.000 | 0.000 | 0.000 | 47.288 | 0.000 | 6.772 | 0.000 | 96.000 |
| 237 | 0.000 | 0.000 | 17.737 | 29.164 | 0.000 | 0.000 | 0.000 | 46.452 | 0.000 | 6.647 | 0.000 | 93.000 |
| 238 | 0.000 | 0.000 | 17.965 | 29.961 | 0.000 | 0.000 | 0.000 | 45.561 | 0.000 | 6.513 | 0.000 | 90.000 |
| 239 | 0.000 | 0.000 | 18.379 | 31.416 | 0.000 | 0.000 | 0.000 | 43.936 | 0.000 | 6.269 | 0.000 | 85.000 |
| 240 | 0.000 | 0.000 | 17.456 | 28.177 | 0.000 | 0.000 | 0.000 | 47.555 | 0.000 | 6.812 | 0.000 | 97.000 |
| 241 | 0.000 | 0.000 | 17.389 | 27.943 | 0.000 | 0.000 | 0.000 | 47.816 | 0.000 | 6.852 | 0.000 | 98.000 |
| 242 | 0.000 | 0.000 | 17.737 | 29.164 | 0.000 | 0.000 | 0.000 | 46.452 | 0.000 | 6.647 | 0.000 | 93.000 |
| 243 | 0.000 | 0.000 | 17.629 | 28.784 | 0.000 | 0.000 | 0.000 | 46.877 | 0.000 | 6.711 | 0.000 | 94.500 |
| 244 | 0.000 | 0.000 | 17.389 | 27.943 | 0.000 | 0.000 | 0.000 | 47.816 | 0.000 | 6.852 | 0.000 | 98.000 |
| 245 | 0.000 | 0.000 | 10.700 | 25.353 | 0.000 | 0.000 | 0.000 | 0.789 | 0.000 | 0.000 | 0.000 | 95.000 |
| 246 | 0.000 | 0.000 | 29.043 | 68.815 | 0.000 | 0.000 | 0.000 | 2.142 | 0.000 | 0.000 | 0.000 | 17.000 |
| 247 | 0.000 | 0.000 | 16.640 | 25.314 | 0.000 | 0.000 | 0.000 | 50.754 | 0.000 | 7.292 | 0.000 | 95.000 |
| 248 | 0.000 | 0.000 | 16.580 | 25.104 | 0.000 | 0.000 | 0.000 | 50.988 | 0.000 | 7.327 | 0.000 | 96.000 |
| 249 | 0.000 | 0.000 | 16.522 | 24.900 | 0.000 | 0.000 | 0.000 | 51.217 | 0.000 | 7.362 | 0.000 | 97.000 |
| 250 | 0.000 | 0.000 | 18.390 | 31.454 | 0.000 | 0.000 | 0.000 | 43.892 | 0.000 | 6.263 | 0.000 | 97.000 |
| 251 | 0.000 | 0.000 | 16.580 | 25.104 | 0.000 | 0.000 | 0.000 | 50.988 | 0.000 | 7.327 | 0.000 | 96.000 |
| 252 | 0.000 | 0.000 | 16.586 | 25.125 | 0.000 | 0.000 | 0.000 | 50.965 | 0.000 | 7.324 | 0.000 | 95.900 |
| 253 | 0.000 | 0.000 | 17.082 | 26.866 | 0.000 | 0.000 | 0.000 | 49.020 | 0.000 | 7.032 | 0.000 | 97.000 |
| 254 | 0.000 | 0.000 | 17.146 | 27.091 | 0.000 | 0.000 | 0.000 | 48.768 | 0.000 | 6.994 | 0.000 | 96.000 |
| 255 | 0.000 | 0.000 | 17.082 | 26.866 | 0.000 | 0.000 | 0.000 | 49.020 | 0.000 | 7.032 | 0.000 | 97.000 |
| 256 | 0.000 | 0.000 | 17.489 | 28.292 | 0.000 | 0.000 | 0.000 | 47.426 | 0.000 | 6.793 | 0.000 | 91.000 |
| 257 | 0.000 | 0.000 | 17.146 | 27.091 | 0.000 | 0.000 | 0.000 | 48.768 | 0.000 | 6.994 | 0.000 | 96.000 |
| 258 | 0.000 | 0.000 | 17.082 | 26.866 | 0.000 | 0.000 | 0.000 | 49.020 | 0.000 | 7.032 | 0.000 | 97.000 |
| 259 | 0.000 | 0.000 | 17.146 | 27.091 | 0.000 | 0.000 | 0.000 | 48.768 | 0.000 | 6.994 | 0.000 | 96.000 |
| 260 | 0.000 | 0.000 | 17.489 | 28.292 | 0.000 | 0.000 | 0.000 | 47.426 | 0.000 | 6.793 | 0.000 | 91.000 |
| 261 | 0.000 | 0.000 | 17.812 | 29.424 | 0.000 | 0.000 | 0.000 | 46.161 | 0.000 | 6.603 | 0.000 | 92.000 |
| 262 | 0.000 | 0.000 | 17.887 | 29.689 | 0.000 | 0.000 | 0.000 | 45.864 | 0.000 | 6.559 | 0.000 | 91.000 |
| 263 | 0.000 | 0.000 | 17.965 | 29.961 | 0.000 | 0.000 | 0.000 | 45.561 | 0.000 | 6.513 | 0.000 | 90.000 |
| 264 | 0.000 | 0.000 | 16.826 | 25.968 | 0.000 | 0.000 | 0.000 | 50.023 | 0.000 | 7.183 | 0.000 | 92.000 |
| 265 | 0.000 | 0.000 | 17.023 | 26.659 | 0.000 | 0.000 | 0.000 | 49.251 | 0.000 | 7.067 | 0.000 | 92.000 |
| 266 | 0.000 | 0.000 | 17.220 | 27.350 | 0.000 | 0.000 | 0.000 | 48.478 | 0.000 | 6.951 | 0.000 | 92.000 |
| 267 | 0.000 | 0.000 | 17.417 | 28.042 | 0.000 | 0.000 | 0.000 | 47.706 | 0.000 | 6.835 | 0.000 | 92.000 |
| 268 | 0.000 | 0.000 | 17.614 | 28.733 | 0.000 | 0.000 | 0.000 | 46.934 | 0.000 | 6.719 | 0.000 | 92.000 |
| 269 | 0.000 | 0.000 | 16.891 | 26.196 | 0.000 | 0.000 | 0.000 | 49.768 | 0.000 | 7.144 | 0.000 | 91.000 |
| 270 | 0.000 | 0.000 | 17.090 | 26.895 | 0.000 | 0.000 | 0.000 | 48.987 | 0.000 | 7.027 | 0.000 | 91.000 |
| 271 | 0.000 | 0.000 | 17.290 | 27.593 | 0.000 | 0.000 | 0.000 | 48.207 | 0.000 | 6.910 | 0.000 | 91.000 |
| 272 | 0.000 | 0.000 | 17.489 | 28.292 | 0.000 | 0.000 | 0.000 | 47.426 | 0.000 | 6.793 | 0.000 | 91.000 |
| 273 | 0.000 | 0.000 | 17.688 | 28.991 | 0.000 | 0.000 | 0.000 | 46.645 | 0.000 | 6.676 | 0.000 | 91.000 |
| 274 | 0.000 | 0.000 | 16.958 | 26.429 | 0.000 | 0.000 | 0.000 | 49.508 | 0.000 | 7.105 | 0.000 | 90.000 |
| 275 | 0.000 | 0.000 | 17.159 | 27.135 | 0.000 | 0.000 | 0.000 | 48.719 | 0.000 | 6.987 | 0.000 | 90.000 |
| 276 | 0.000 | 0.000 | 17.361 | 27.842 | 0.000 | 0.000 | 0.000 | 47.929 | 0.000 | 6.868 | 0.000 | 90.000 |
| 277 | 0.000 | 0.000 | 17.562 | 28.548 | 0.000 | 0.000 | 0.000 | 47.140 | 0.000 | 6.750 | 0.000 | 90.000 |
| 278 | 0.000 | 0.000 | 17.763 | 29.255 | 0.000 | 0.000 | 0.000 | 46.350 | 0.000 | 6.632 | 0.000 | 90.000 |
| 279 | 0.000 | 0.000 | 17.489 | 28.292 | 0.000 | 0.000 | 0.000 | 47.426 | 0.000 | 6.793 | 0.000 | 91.000 |

TABLE 1B-continued

Tested Triglyceride Compositions

| Run | 12:0 | 14:0 | 16:0 | 18:0 | 20:0 | 22:0 | 16:1 | 18:1 | 20:1 | 18:2 | 18:3 | Percent by weight of Total Candle |
|---|---|---|---|---|---|---|---|---|---|---|---|---|
| 280 | 0.000 | 0.000 | 17.489 | 28.292 | 0.000 | 0.000 | 0.000 | 47.426 | 0.000 | 6.793 | 0.000 | 91.000 |
| 281 | 0.000 | 0.000 | 17.279 | 27.556 | 0.000 | 0.000 | 0.000 | 48.246 | 0.000 | 6.916 | 0.000 | 94.000 |
| 282 | 0.000 | 0.000 | 17.348 | 27.796 | 0.000 | 0.000 | 0.000 | 47.980 | 0.000 | 6.876 | 0.000 | 93.000 |
| 283 | 0.000 | 0.438 | 24.700 | 26.906 | 0.000 | 0.000 | 0.276 | 28.699 | 1.035 | 16.649 | 1.297 | 91.000 |
| 284 | 0.000 | 0.000 | 17.489 | 28.292 | 0.000 | 0.000 | 0.000 | 47.426 | 0.000 | 6.793 | 0.000 | 91.000 |
| 285 | 0.000 | 0.000 | 17.212 | 27.321 | 0.000 | 0.000 | 0.000 | 48.511 | 0.000 | 6.956 | 0.000 | 95.000 |
| 286 | 0.000 | 0.000 | 17.279 | 27.556 | 0.000 | 0.000 | 0.000 | 48.248 | 0.000 | 6.916 | 0.000 | 94.000 |
| 287 | 0.000 | 0.000 | 17.348 | 27.796 | 0.000 | 0.000 | 0.000 | 47.980 | 0.000 | 6.876 | 0.000 | 93.000 |
| 288 | 0.000 | 0.000 | 17.565 | 29.788 | 0.000 | 0.000 | 0.000 | 50.145 | 0.000 | 2.502 | 0.000 | 91.000 |
| 289 | 0.000 | 0.000 | 17.646 | 32.146 | 0.000 | 0.000 | 0.000 | 48.281 | 0.000 | 1.927 | 0.000 | 91.000 |
| 290 | 0.000 | 0.000 | 17.489 | 28.292 | 0.000 | 0.000 | 0.000 | 47.426 | 0.000 | 6.793 | 0.000 | 91.000 |
| 291 | 0.000 | 0.000 | 17.489 | 28.292 | 0.000 | 0.000 | 0.000 | 47.426 | 0.000 | 6.793 | 0.000 | 91.000 |
| 292 | 0.000 | 0.000 | 17.489 | 28.292 | 0.000 | 0.000 | 0.000 | 47.426 | 0.000 | 6.793 | 0.000 | 91.000 |
| 293 | 0.000 | 0.000 | 13.726 | 74.223 | 0.000 | 0.000 | 0.000 | 12.051 | 0.000 | 0.000 | 0.000 | 5.000 |
| 294 | 0.000 | 0.000 | 13.726 | 74.223 | 0.000 | 0.000 | 0.000 | 12.051 | 0.000 | 0.000 | 0.000 | 10.000 |
| 295 | 0.000 | 0.000 | 13.726 | 74.223 | 0.000 | 0.000 | 0.000 | 12.051 | 0.000 | 0.000 | 0.000 | 20.000 |
| 296 | 0.000 | 0.000 | 17.489 | 28.292 | 0.000 | 0.000 | 0.000 | 47.426 | 0.000 | 6.793 | 0.000 | 91.000 |
| 297 | 0.191 | 0.701 | 39.277 | 27.950 | 0.127 | 0.000 | 0.064 | 25.506 | 0.000 | 5.991 | 0.191 | 91.000 |
| 298 | 0.000 | 0.064 | 17.543 | 27.504 | 0.191 | 0.064 | 0.064 | 15.691 | 0.000 | 33.908 | 4.971 | 91.000 |
| 299 | 0.000 | 0.000 | 17.489 | 28.292 | 0.000 | 0.000 | 0.000 | 47.426 | 0.000 | 6.793 | 0.000 | 91.000 |
| 300 | 0.000 | 0.000 | 17.441 | 28.124 | 0.000 | 0.000 | 0.000 | 47.613 | 0.000 | 6.821 | 0.000 | 100.000 |
| 301 | 0.000 | 0.000 | 9.471 | 22.440 | 0.000 | 0.000 | 0.000 | 0.698 | 0.000 | 0.000 | 0.000 | 92.000 |

Table 1C provides a summary of the fatty acid components provided in Table 1B which are included in candles having 5 to 100 percent by weight of a triglyceride component. As shown in Table 1C, the triglyceride components of the tested candles contained 0 to 0.2 percent lauric acid (12:0), 0 to 0.8 percent of myristic acid (14:0), 0 to 39.3 percent of palmitic acid (16:0), 0 to 74.2 percent of stearic acid (18:0), 0 to 0.2 percent of arachidic acid (20:0), 0 to 0.1 percent behenic acid (22:0), 0 to 0.3 percent of palmitoleic acid (16:1), 0 to 72.8 percent of oleic acid (18:1), 0 to 1.0 percent of arachidonic acid (20:1), 0 to 33.9 percent of linoleic acid, and 0 to 5.0 percent of linolenic acid (18:3).

TABLE 1C

C Percentage of Fatty Acid Components in Tested Candles

| Percent by weight of Triglycerides in Candle | Percentage of Fatty Acid Components | | | | | | | | | | |
|---|---|---|---|---|---|---|---|---|---|---|---|
| 5–100% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 39.3 | 74.2 | 0.2 | 0.1 | 0.3 | 72.8 | 1.0 | 33.9 | 5.0 |
| 100% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 99% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 98% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 97% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 96% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 95% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 94% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |
| 93% | 12:0 | 14:0 | 16:0 | 18:0 | 20:0 | 22:0 | 16:1 | 18:1 | 20:1 | 18:2 | 18:3 |
| Min | 0.0 | 0.0 | 0.0 | 0.0 | 0.0 | 0.0 | 0.0 | 0.0 | 0.0 | 0.0 | 0.0 |
| Max | 0.2 | 0.8 | 35.7 | 74.2 | 0.1 | 0.0 | 0.1 | 72.8 | 0.0 | 8.5 | 0.2 |

TABLE 1C-continued

C Percentage of Fatty Acid Components in Tested Candles

Percent by weight of Triglycerides in Candle | | | | | Percentage of Fatty Acid Components | | | | | | |
---|---|---|---|---|---|---|---|---|---|---|---
92% | 12:0 | 14:0 | 16:0 | 18:0 | 20:0 | 22:0 | 16:1 | 18:1 | 20:1 | 18:2 | 18:3
Min | 0.0 | 0.0 | 0.0 | 0.0 | 0.0 | 0.0 | 0.0 | 0.0 | 0.0 | 0.0 | 0.0
Max | 0.2 | 0.8 | 35.7 | 74.2 | 0.1 | 0.0 | 0.1 | 72.8 | 0.0 | 8.5 | 0.2
91% | 12:0 | 14:0 | 16:0 | 18:0 | 20:0 | 22:0 | 16:1 | 18:1 | 20:1 | 18:2 | 18:3
Min | 0.0 | 0.0 | 0.0 | 0.0 | 0.0 | 0.0 | 0.0 | 0.0 | 0.0 | 0.0 | 0.0
Max | 0.2 | 0.8 | 39.3 | 74.2 | 0.2 | 0.1 | 0.3 | 72.8 | 1.0 | 33.9 | 5.0
90% | 12:0 | 14:0 | 16:0 | 18:0 | 20:0 | 22:0 | 16:1 | 18:1 | 20:1 | 18:2 | 18:3
Min | 0.0 | 0.0 | 0.0 | 0.0 | 0.0 | 0.0 | 0.0 | 0.0 | 0.0 | 0.0 | 0.0
Max | 0.2 | 0.8 | 39.3 | 74.2 | 0.2 | 0.1 | 0.3 | 72.8 | 1.0 | 33.9 | 5.0
80% | 12:0 | 14:0 | 16:0 | 18:0 | 20:0 | 22:0 | 16:1 | 18:1 | 20:1 | 18:2 | 18:3
Min | 0.0 | 0.0 | 0.0 | 0.0 | 0.0 | 0.0 | 0.0 | 0.0 | 0.0 | 0.0 | 0.0
Max | 0.2 | 0.8 | 39.3 | 74.2 | 0.2 | 0.1 | 0.3 | 72.8 | 1.0 | 33.9 | 5.0
70% | 12:0 | 14:0 | 16:0 | 18:0 | 20:0 | 22:0 | 16:1 | 18:1 | 20:1 | 18:2 | 18:3
Min | 0.0 | 0.0 | 0.0 | 0.0 | 0.0 | 0.0 | 0.0 | 0.0 | 0.0 | 0.0 | 0.0
Max | 0.2 | 0.8 | 39.3 | 74.2 | 0.2 | 0.1 | 0.3 | 72.8 | 1.0 | 33.9 | 5.0

In a variation of exemplary embodiment A, the vegetable lipid-based composition may include about 51% by weight to about 100% by weight of the vegetable lipid component including a free fatty acid/triglyceride mixture with the remainder including petroleum wax.

Moreover, the vegetable lipid component may include only triglycerides, as seen in Table 1B. However, the vegetable lipid-based composition preferably includes about 55% to about 100%, about 65% to about 100%, about 75% to about 100% and, more preferably, about 83% by weight to about 100% by weight of the vegetable lipid component. The free fatty acid/triglyceride mixture includes, on a percent by weightage basis, about 1% to about 99% of the free fatty acid and about 1% to about 99% of the triglyceride but preferably includes about 1% to about 75% of the free fatty acid and about 25% to about 99% of the triglyceride, about 1% to about 50% of the free fatty acid and about 50% to about 99% of the triglyceride, and about 1% to about 25% of the free fatty acid and about 75% to about 99% of the triglyceride. Further preferred free fatty acid/triglyceride mixtures include about 5% to about 95% of the free fatty acid and about 5% to about 95% of the triglyceride, about 5% to about 75% of the free fatty acid and about 25% to about 95% of the triglyceride, about 5% to about 50% of the free fatty acid and about 50% to about 95% of the triglyceride, and about 5% to about 25% of the free fatty acid and about 75% to about 95% of the triglyceride. Even more specifically, superior candle quality may also be achieved when the free fatty acid/triglyceride mixture includes at least about 5% free fatty acids and about 95% triglycerides. For example, in one composition of exemplary embodiment A, the vegetable lipid composition includes about 5% by weight stearic acid and 95% by weight triglycerides having the following fatty acid components: about 17.2% palmitic acid, about 38.4% stearic acid and about 44.4% oleic acid, all on a weight-percent basis.

The petroleum wax used in exemplary embodiment A and throughout this application is a by-product of the petroleum refining process and may be obtained commercially from suppliers such as Witco located at Crompton Vinyl Additives GmBH, Chemiestrasse 22, 68623 Lampertheim, Germany. The quality and quantity of the wax obtained from the refining process is dependent upon the source of the crude oil and the extent of the refining. The petroleum wax component of exemplary embodiment A and throughout this application of the vegetable lipid-based candle composition includes, for example, a paraffin wax, including medium paraffin wax, microcrystalline paraffin wax or a combination thereof. However, petroleum wax obtained from crude oil refined to other degrees may also be used in exemplary embodiment A and throughout this application.

Although the exact chemical compositions of these waxes are not known as the nature of these by-products vary from one distillation process to the next, these waxes are composed of various types of hydrocarbons. For example, medium paraffin wax is composed primarily of straight chain hydrocarbons, having carbon chain lengths ranging from about 20 to about 40, with the remainder typically comprising isoalkanes and cycloalkanes. The melting point of medium paraffin wax is about 50° C. to about 65° C. Microcrystalline paraffin wax is composed of branched and cyclic hydrocarbons having carbon chain lengths of about 30 to about 100 and the melting point of the wax is about 75° C. to about 85° C. Further descriptions of the petroleum wax that may be used in exemplary embodiment A or throughout this application which may be found in Kirk-Othmer, *Encyclopedia of Chemical Technology* 3rd Edition, Volume 24, pages 473-76, which is hereby incorporated by reference.

In another variation of exemplary embodiment A, the vegetable lipid-based composition may contain up to about 49% by weight of the petroleum wax but preferably contains up to about 45%, up to about 35%, up to about 25% and more preferably up to about 17% by weight of the petroleum wax with the remainder being the vegetable lipid component. For example, another variation of the vegetable lipid-based composition of this exemplary embodiment may contain up to about 17% by weight medium paraffin wax. In general, superior candle quality is achieved when the vegetable lipid-based composition contains a greater concentration of the vegetable lipid component than the petroleum wax component. Moreover, even though a vegetable lipid-based composition including up to about 49% by weight of a petroleum wax will function as a suitable candle, superior candle quality may be achieved when the petroleum wax component is minimized. In a further variation of exemplary embodiment A, it is preferred that the vegetable lipid-based composition includes at least about 3% by weight of the petroleum wax component.

In exemplary embodiment A, it is preferred that the vegetable lipid-based composition only includes the vegetable lipid component and petroleum wax. However, various odorants or colorants may be added to the vegetable lipid-based composition of exemplary embodiment A or of other embodiments throughout this application as desired. U.S. Pat. No. 4,614,625 issued to Wilson on Sep. 30, 1986, lists several odorants and colorants which may preferably be added to the vegetable lipid-based composition and is hereby incorporated by reference in its entirety. Furthermore, color stabilizing additives, such as ultraviolet light absorbing materials, may be added to prevent colorant color fading.

The vegetable lipid-based composition of exemplary embodiment A and other embodiments throughout this application may also include a very low level of an antioxidant, such as about 1 ppm to about 10 ppm of t-butylhydroquinone (TBHQ) or butylated hydroxytoluene (BHT), to increase shelf life or life of the candle. Sodium ethylenediaminetetraacetic acid may be used in synergistic combination with the TBHQ and/or BHT for metal chelation.

The candles formed from the vegetable lipid-based compositions of exemplary embodiment A have superior solids content/mechanical stability as compared to commercial paraffin candles at elevated temperatures. For example, when paraffin candles and the vegetable lipid-based candles of this exemplary embodiment are stored overnight at 55° C., the paraffin candles liquify whereas the vegetable lipid-based candles remain solid (as determined by their ability to support a 4 gram marble on their surface). Although the vegetable lipid-based candles begin to soften when stored at 59° C., the candles remain solid. Furthermore, soot and smoke formation was subjectively judged to be lower when candles including a vegetable lipid-based composition were burned compared to paraffin wax-based candles under the same conditions. Additionally, combustion tests described in Example 6 show that candles including the vegetable lipid-based composition of exemplary embodiment A burn approximately 80% longer than paraffin wax-based candles under identical conditions. Therefore, a candle including a vegetable lipid-based composition will last significantly longer than a paraffin wax-based candle.

The crystallization/solidification behavior of exemplary embodiment A of the vegetable lipid-based composition is significantly different than the behavior of petrochemical products. It is therefore necessary to employ relatively slow process cooling rates in order to obtain smooth candles with no visible crystal formation.

Reference will now be made to specific examples of this exemplary embodiment using the compositions and processes above described. All percentages are by weight. It is to be understood that the examples are provided to more completely describe preferred embodiments of exemplary embodiment A and that no limitation to the scope of the invention is intended thereby. The following preparatory steps were employed in the Examples, 1-7.

PROTOCOL FOR EXAMPLES 1-7

The components of the candle were weighed and combined in a clean glass container. The composite material was obtained by heating to melt all solid components to a liquid state with sufficient stirring to uniformly mix all components. The temperature range for melting was normally between approximately 75° C. to about 110° C. Although they are not necessary for the mixing process, higher temperatures may be used. Temperatures in excess of 130° C. are to be avoided to minimize degradation of the materials.

After the components were mixed, the composite material was either directly poured into product containers or was allowed to cool at room temperature to approximately 85° C. before being poured into product containers. A wick was normally added at this point, while the material is still in the liquid state. The product was then cooled by standing at ambient temperature (room temperature), by the use of air convection (fan) or by the use of a temperature controlled water bath in a temperature range of about 5° C. to about 50° C. Colder temperatures may also be used if faster cooling is desired. Although several different cooling processes may be used, superior candles were made by minimizing the pouring temperature and cooling rapidly using air convection or a water bath.

Example 1

A 100% triglyceride lipid candle was prepared in accordance with the described protocol. The fatty acid components of the triglyceride were 13.7% palmitic acid, 74.2% stearic acid and 12.1% oleic acid.

Example 2

A candle having 96% triglycerides and 4% microcrystalline wax was prepared in accordance with the described protocol. The fatty acid components of the triglyceride were 22.4% palmitic acid, 45.7% stearic acid, 28.9% oleic acid and 3.9% by weight linoleic acid.

Example 3

A candle containing an 83% by weight free fatty acid/triglyceride mixture and 17% by weight microcrystalline paraffin wax was prepared in accordance with the described protocol. Microcrystalline paraffin wax with a melting point of 79° C. and containing branched and cyclic hydrocarbons of carbon chain length of about 30 to about 100 was added to a free fatty acid/triglyceride mixture having 6% free fatty acids and 94% triglyceride wherein the free fatty acid component was stearic acid. The fatty acid components of the triglyceride were 29.0% palmitic acid, 68.8% stearic acid and 2.1% by weight oleic acid.

Example 4

A candle containing 96% triglycerides and 4% medium paraffin wax was prepared in accordance with the described protocol. Medium paraffin wax with a melting point of about 65° C. and containing predominantly straight chain hydrocarbons of carbon chain length of about 22 to about 36 was added to a triglyceride having the following fatty acid components: 18.0% palmitic acid, 35.2% stearic acid and 46.8% by weight oleic acid.

Example 5

In another example, a vegetable lipid-based candle is made following the protocol described above wherein the vegetable lipid-based composition of the candle includes only a vegetable lipid and a petroleum wax. Specifically, the composition includes about 51% by weight to about 100% by weight of the free fatty acid/triglyceride mixture and up to about 49% by weight of the petroleum wax component. The petroleum wax component is optionally a medium paraffin wax, a microcrystalline paraffin wax or a petroleum wax obtained from crude oil refined to other degrees. The free fatty acid/triglyceride mixture can include about 1% by weight to about 99% by weight of the free fatty acid and about 1% by weight to about 99% by weight of the triglyceride. The fatty acid components of the triglyceride and the maximum respective percentages by weight that they may be found in the triglyceride may be those detailed in Table 1A. The free fatty acids present in the free fatty acid/triglyceride mixture can be, for example, palmitic, stearic, behenic, arachidic, oleic or linoleic acid or any combination thereof. Other saturated or unsaturated free fatty acids may be included as the sole free fatty acids or in combination with other free fatty acids as long as the candle will be a solid at the temperature at which it is used. In other examples, the composition may include other components, such as colorants or odorants.

Example 6

Combustion tests were performed to compare the vegetable lipid-based candles of the present invention with commercial paraffin candles. An electronic scale was placed on a table and a 4-wall baffle (10"×10"×10") (25.4 cm×25.4 cm×25.4 cm) with the top and bottom surface open was suspended 3.5 in (8.9 cm) above the table surface to allow free access for airflow below and above. The purpose of the baffle was to minimize uncontrolled drafts and air convection. The electronic scale was positioned in the baffle area at a distance from the base of the baffle of approximately one-third the baffle height. Candles of the following composition were placed on the scale: paraffin candles composed of 150 g of 100% medium paraffin wax and vegetable lipid-based candles containing 4% microcrystalline paraffin wax and 96% triglycerides having the following fatty acid components: 22.4% palmitic acid, 45.7% stearic acid, 28.9% oleic acid and 3.9% by weight linoleic acid. The experiment was run in duplicate for each candle composition. All candles had identical wicks and were present in identical containers.

The candles were burned for two hours and the mass loss rate was recorded. No significant variations in air composition or temperature occurred during the test period as the room was well-ventilated. The measured mass loss rates for the paraffin candles were 7.13 g/hour and 7.08 g/hour. The measured mass loss rates for the vegetable lipid-based candles were 3.72 g/hour and 4.10 g/hour. Therefore, the vegetable lipid-based candles will burn approximately 80% longer than commercial paraffin candles.

Example 7

A 100% free fatty acid/triglyceride lipid candle was prepared in accordance with the above described protocol. Free fatty acid is 5 percent by weight of the candle and the triglyceride is 95 percent by weight of the candle. The free fatty acid component is preferably stearic acid. The fatty acid components of the triglyceride is comprised of 17.2% percent of palmitic acid, 38.4% of stearic acid, and 44.4% of oleic acid.

Exemplary Embodiment B

In another exemplary embodiment, exemplary embodiment B, of the present invention, a natural wax, beeswax, was combined with a free fatty acid/triglyceride composition to produce a 100% natural candle. The beeswax functions similar to paraffin in disrupting triglyceride crystalline structure to produce an amorphous solid structure. Suitable ranges of free fatty acid/triglyceride mixtures to be combined with beeswax are similar to the ranges provided in conjunction with free fatty acid/triglyceride mixtures and petroleum products in exemplary embodiment A.

In one variation of exemplary embodiment B, a candle composition is composed of 0 to 20 percent by weight beeswax and 80 to 100 percent by weight free fatty acid/triglyceride mixture. In a preferred variation of exemplary embodiment B, a candle composition includes 88-100 percent by weight of a free fatty acid/triglyceride mixture and 0 to 12 percent by weight beeswax. The 88 to 100 percent by weight being composed of 66 to 100 percent by weight triglycerides and 22 to 100 percent by weight free fatty acids.

Reference will now be made to a specific example of exemplary embodiment B. All percentages are by weight. It is to be understood that the example is provided to more completely describe preferred embodiments of exemplary embodiment B and that no limitation to the scope of the invention is intended thereby. The following preparatory steps were employed in the Example 8.

PROTOCOL FOR EXAMPLE 8

The components of the candle were weighed and combined in a clean glass container. The composite material was obtained by heating to melt all solid components to a liquid state with sufficient stirring to uniformly mix all components. The temperature range for melting was normally between approximately 75° C. to about 110° C. Although they are not necessary for the mixing process, higher temperatures may be used. Temperatures in excess of 130° C. are to be avoided to minimize degradation of the materials.

After the components were mixed, the composite material was either directly poured into product containers or was allowed to cool at room temperature to approximately 85° C. before being poured into product containers. A wick was normally added at this point, while the material is still in the liquid state. The product was then cooled by standing at ambient temperature (room temperature), by the use of air convection (fan) or by the use of a temperature controlled water bath in a temperature range of about 5° C. to about 50° C. Colder temperatures may also be used if faster cooling is desired. Although several different cooling processes may be used, superior candles were made by minimizing the pouring temperature and cooling rapidly using air convection or a water bath.

Example 8

A candle having about 88% of a free fatty acid/triglyceride mixture and about 12% beeswax was prepared in accordance with the described protocol. Specifically, the candle includes about 66% triglycerides, about 22% free fatty acids, and 12% beeswax. The fatty acid composition of the triglycerides includes 8.2% palmitic acid, 28.9% stearic acid, 54.9% oleic acid, and 8.0% linoleic acid.

Exemplary Embodiment C

In yet another exemplary embodiment, exemplary embodiment C, of the present invention a candle is produced from a lipid based composition. In this exemplary embodiment, the lipid based composition includes plant derived triglycerides having fatty acid components, free fatty acids, and a plant based crystal modifier. The candle formed from the lipid based composition in this exemplary embodiment exhibits superior soot control, enhanced product life (slow burning), superior shape retention, superior aesthetic appearance and a more amorphous solid structure than 100% free fatty acid/triglyceride candle compositions. Additionally, the absence of or reduction of petrochemical-derived paraffins results in the absence or reduction of heavy metals or potentially carcinogenic compounds.

The plant lipid base component of this exemplary embodiment comprises a mixture of triglycerides, such as hydrogenated plant oils and/or partially hydrogenated plant oils, and/or plant derived free fatty acids. The hydrogenated plant oils, partially hydrogenated plant oils, and plant derived free fatty acids are generally obtained from plant sources such as soybean, cottonseed, corn, sunflower, canola, peanut, olive, palm kernel, rapeseed and palm oils and may be obtained with desired levels of saturation via refining processes known in the art, and briefly discuss in exemplary embodiment A. The plant oils and free fatty acids may further be obtained from commercial sources, including Cargill, Archer Daniels Midlands, and Central Soya.

In one composition of exemplary embodiment C, the plant lipid base component is preferably comprised of free fatty acids and triglycerides having fatty acid components. Alternative lipid base components are comprised of solely free fatty acids or triglycerides having fatty acid components.

The mixture of triglycerides and free fatty acids of the plant lipid base component have an overall saturation level sufficient to obtain a solid candle composition at room temperature. The properties of the candle composition (e.g. melting point) will vary as a function of the chain length and degree of saturation of the free fatty acids and the fatty acid components of the plant oil triglycerides. For example, as the degree of saturation decreases, the melting point decreases. Similarly, as the chain length of the free fatty acids or the fatty acid components decreases, the melting point decreases.

The type of crystal modifier should be selected based upon the percentage of the free fatty acid and the triglycerides in the candle composition. The crystalline structure of a substantially pure free fatty acid and triglyceride mixture varies depending upon the chain lengths of the fatty acid components and free fatty acids, the degree of saturation of each fatty acid component and free fatty acid, the arrangement of the fatty acid components within each triglyceride, and upon the relative percentages of free fatty acids and triglycerides. As such, a composition comprising a high percentage of free fatty acids would exhibit a different crystalline structure than a composition comprising a high percentage of triglycerides.

The inclusion of the plant based crystal modifier in exemplary embodiment C produces a candle having superior surface characteristics. In particular, the crystal modifier minimizes cracking, bubbling, and roughness in the candle composition.

Further, the crystal modifier of exemplary embodiment C generally causes the lipid based component of the candle composition to exhibit an amorphous solid structure as opposed to a crystalline structure. The amorphous structure of the candle composition increases the product life (slow burning) and reduces soot formation. In particular, the crystal modifier helps to disrupt the formation of crystalline structures as the candle composition transitions from liquid form to solid form during the manufacturing process and/or during the cooling process of the "wax pool" after burning. Herein the term "wax pool" is used to refer to the pool of liquified candle composition that forms as a result of burning the candle regardless of whether the liquified candle composition itself includes materials that are technically classified as a "wax".

An amorphous structure of the candle composition may also be controlled by utilizing low melting point lipid components to disrupt the higher melting lipid components from forming a crystalline structure. Additionally, a petroleum product such as paraffin waxes may be used to disrupt the formation of a crystalline structure.

However, the use of low melting point lipid components results in standalone candles having a greasy surface feel to the touch. The plant based crystal modifier of exemplary embodiment C, along with causing amorphous solid candle composition, reduces the greasy feel of the candle composition.

An example crystal modifier of exemplary embodiment C comprises a plant derived surfactant. Example surfactants include monoglycerides and diglycerides. In one embodiment of exemplary embodiment C, the plant derived surfactant consists essentially of Dimodan P VK. Dimodan P VK is marketed as a food stuff surfactant and is manufactured by Danisco Cultor USA, Inc., 201 New Century Parkway, P.O. Box 26, New Century, Kans. 66031, Telephone: 913-764-8100. Telefax: 913-764-5407. Information supplied by Danisco Cultor USA indicates that Dimodan P VK is a distilled monoglyceride obtained from a plant source. Alternative crystal modifiers include other surfactants, such as Triton available from Union Carbide a subsidiary of the Dow Chemical Company which is located in Midland, Mich., monoglyceride/diglyceride mixtures available from ADM, Danisco, Lysurf Chemical Co. located at Rm. #804, 13, Wu Chuan 1st Rd., Hsin Chung City, Taipei, R. O. C., Central Soya and Cargill, lecithin available from ADM, Central Soya and Cargill, Span and Tween available from Uniqema located at 30 Queen Anne's Gate, London SW1H 9AB, United Kingdom. Additionally, other brands of monoglycerides, such as Glycerol monostrearate/oleate available from Acme-Hardesty located at 1787 Sentry Parkway West, Suite 18-460, Blue Bell, Pa. 19422, and diglycerides, such as Glycerol distearate available from Lysurf Chemical Co., Grindsted available from Danisco Cultor USA, and Kirnol available from Cognis located at 5051 Estecreek Drive, Cincinnati, Ohio 45232-1446 may be used as alternative crystal modifiers.

In one variation of exemplary embodiment C, the crystal modifier may further include an optional wax component. The optional wax component may include petroleum waxes, beeswax, and/or plant waxes.

Reference will now be made to specific examples 9-28 using the compositions and processes of this exemplary embodiment. All parts are by weight. It is to be understood that the examples are provided to more completely describe preferred embodiments and that no limitation to the scope of the invention is intended thereby. The following preparatory steps were employed in Examples 9-12.

PROTOCOL FOR EXAMPLES 9-12

The ingredients in each blend composition are added to a vessel in no particular order. The ingredients are heated on a hot plate, while being stirred by a magnetic stir bar, to 70° Celsius. A container for receiving the blend composition is heated to 60° C. A wick and tab are inserted into the container before heating. The blend composition is poured to the desired height within the container. The container and composition are cooled until solid. The composition is reheated and a second layer is poured. The candle, blend composition, is allowed to cool completely.

Each blend composition was tested to determine the properties of each blend. The candles corresponding to each blend composition are burned 6 hours each day until the candles self-extinguish. Each day data is recorded throughout the candle's burn life.

Example 9

A series of experiments were performed to develop a candle composition to replace or reduce the use of petroleum products in a candle composition. The compositions tested were comprised of either all or a subset of the ingredients shown in Table 9A. An abbreviation is provided in Table 9A for each ingredient along with the supplier of each ingredient.

TABLE 9A

Ingredients

| Abbreviation | Ingredient Name | Supplier |
| --- | --- | --- |
| PHSO125 | Shurset 125 - Partially Hydrogenated Soybean Oil 125 | A.C. Humko located at 7171 Goodlett Farms Parkway, Memphis, TN 38018 |
| HSO | Dritex S-21V - Hydrogenated Soybean Oil | A.C. Humko |
| SA | Stearic Acid, FA-1655 or Emersol 132 | Peter Cremer North America (PCNA) located at Southside Terminal, 3117 Southside Avenue, Cincinnati, OH 45204 |
| BW | Beeswax | Strahl Pitsch located at 230 Great East Neck Road, West Babylon, NY 11704 |
| CO | Dritex R-CE - Canola Oil | A.C. Humko |
| CuW | Carnauba Wax | Strahl Pitsch |
| CdW | Candelilla Wax | Strahl Pitsch |
| VS | Dimodan P VK - Vegetable Surfactant | Danisco Culter USA |
| PA | Palmitic Acid, FA-1695 | PCNA |

Compositions containing various combinations of the ingredients listed in Table 9A were tested. The combinations tested are listed in Table 9B, each ingredient combination is denoted with a two to three letter ID, such as "AL". Further the percentage makeup of each ingredient was varied to produce blends of each combination. Each blend is denoted in Table 9B with a numeral ID which accompanies the letter ID for a given ingredient combination. For example, blend 7 of combination AL, denoted as AL-07, includes one-third PHSO125, one-third SA, and one-third CdW.

Compositions having the following ranges are tested: 0 to 100 percent by weight of partially hydrogenated soybean oil (PHSO125), 0 to 100 percent by weight fully hydrogenated soybean oil (HSO), 0 to 100 percent by weight stearic acid (SA), 0 to 100 percent by weight beeswax (BW), 0 to 100 percent by weight canola oil (CO), 0 to 100 percent by weight carnauba wax (CuW), 0 to 100 percent by weight candelilla wax (CdW), 0 to 100 percent by weight crystal modifier Dimodan (VS), and 0 to 50 percent by weight palmitic acid.

TABLE 9B

Composition Blends

| ID | PHSO125 | HSO | SA | BW | CO | CuW | CdW | VS | PA |
| --- | --- | --- | --- | --- | --- | --- | --- | --- | --- |
| AJ-03 | 0 | 0 | 0.0 | 0.0 | 0.0 | 0.0 | 0.0 | 100 | 0.0 |
| AJ-05 | 50 | 0 | 0.0 | 0.0 | 0.0 | 0.0 | 0.0 | 50 | 0.0 |
| AJ-06 | 0 | 50 | 0.0 | 0.0 | 0.0 | 0.0 | 0.0 | 50 | 0.0 |
| AJ-07 | 33.3 | 33.3 | 0.0 | 0.0 | 0.0 | 0.0 | 0.0 | 33.3 | 0.0 |
| AJ-08 | 66.6 | 16.6 | 0.0 | 0.0 | 0.0 | 0.0 | 0.0 | 16.6 | 0.0 |
| AJ-09 | 16.6 | 66.6 | 0.0 | 0.0 | 0.0 | 0.0 | 0.0 | 16.6 | 0.0 |
| AJ-10 | 16.6 | 16.6 | 0.0 | 0.0 | 0.0 | 0.0 | 0.0 | 66.6 | 0.0 |
| AL-07 | 33.3 | 0.0 | 33.3 | 0.0 | 0.0 | 0.0 | 33.3 | 0.0 | 0.0 |
| AL-08 | 66.6 | 0.0 | 16.6 | 0.0 | 0.0 | 0.0 | 16.6 | 0.0 | 0.0 |
| AL-09 | 16.6 | 0.0 | 66.6 | 0.0 | 0.0 | 0.0 | 16.6 | 0.0 | 0.0 |
| AL-10 | 16.6 | 0.0 | 16.6 | 0.0 | 0.0 | 0.0 | 66.6 | 0.0 | 0.0 |
| BC-07 | 33.3 | 0.0 | 33.3 | 0.0 | 0.0 | 33.3 | 0.0 | 0.0 | 0.0 |
| BC-08 | 66.6 | 0.0 | 16.6 | 0.0 | 0.0 | 16.6 | 0.0 | 0.0 | 0.0 |
| BC-09 | 16.6 | 0.0 | 66.6 | 0.0 | 0.0 | 16.6 | 0.0 | 0.0 | 0.0 |
| BC-10 | 16.6 | 0.0 | 16.6 | 0.0 | 0.0 | 66.6 | 0.0 | 0.0 | 0.0 |
| CA-07 | 33.3 | 0.0 | 0.0 | 0.0 | 0.0 | 33.3 | 0.0 | 33.3 | 0.0 |
| CA-08 | 66.6 | 0.0 | 0.0 | 0.0 | 0.0 | 16.6 | 0.0 | 16.6 | 0.0 |
| CA-09 | 16.6 | 0.0 | 0.0 | 0.0 | 0.0 | 66.6 | 0.0 | 16.6 | 0.0 |
| CA-10 | 16.6 | 0.0 | 0.0 | 0.0 | 0.0 | 16.6 | 0.0 | 66.6 | 0.0 |
| CC-08 | 0.0 | 0 | 0.0 | 0.0 | 50 | 50 | 0.0 | 0 | 0.0 |
| CC-10 | 0.0 | 0 | 0.0 | 0.0 | 0 | 50 | 0.0 | 50 | 0.0 |
| CC-11 | 0.0 | 25 | 0.0 | 0.0 | 25 | 25 | 0.0 | 25 | 0.0 |
| CC-12 | 0.0 | 62.5 | 0.0 | 0.0 | 12.5 | 12.5 | 0.0 | 12.5 | 0.0 |
| CC-13 | 0.0 | 12.5 | 0.0 | 0.0 | 62.5 | 12.5 | 0.0 | 12.5 | 0.0 |
| CC-14 | 0.0 | 12.5 | 0.0 | 0.0 | 12.5 | 62.5 | 0.0 | 12.5 | 0.0 |
| CC-15 | 0.0 | 12.5 | 0.0 | 0.0 | 12.5 | 12.5 | 0.0 | 62.5 | 0.0 |
| DE-11 | 25 | 25 | 0.0 | 25 | 0.0 | 0.0 | 0.0 | 25 | 0.0 |
| DE-12 | 62.5 | 12.5 | 0.0 | 12.5 | 0.0 | 0.0 | 0.0 | 12.5 | 0.0 |
| DE-13 | 12.5 | 62.5 | 0.0 | 12.5 | 0.0 | 0.0 | 0.0 | 12.5 | 0.0 |
| FDR-17 | 60 | 10 | 0.0 | 10 | 10 | 0.0 | 0.0 | 10 | 0.0 |
| FDR-18 | 10 | 60 | 0.0 | 10 | 10 | 0.0 | 0.0 | 10 | 0.0 |
| FP-07 | 50 | 0 | 0.0 | 0.0 | 0.0 | 0.0 | 0.0 | 0 | 50 |
| FP-09 | 0 | 50 | 0.0 | 0.0 | 0.0 | 0.0 | 0.0 | 0 | 50 |
| FP-11 | 25 | 25 | 0.0 | 0.0 | 0.0 | 0.0 | 0.0 | 25 | 25 |
| FP-12 | 62.5 | 12.5 | 0.0 | 0.0 | 0.0 | 0.0 | 0.0 | 12.5 | 12.5 |
| FP-13 | 12.5 | 62.5 | 0.0 | 0.0 | 0.0 | 0.0 | 0.0 | 12.5 | 12.5 |
| GB-17 | 60 | 10 | 0.0 | 10 | 0.0 | 10 | 10 | 0.0 | 0.0 |

TABLE 9B-continued

Composition Blends

| ID | PHSO125 | HSO | SA | BW | CO | CuW | CdW | VS | PA |
|---|---|---|---|---|---|---|---|---|---|
| GB-18 | 10 | 60 | 0.0 | 0.0 | 10 | 0.0 | 10 | 10 | 0.0 |
| GC-11 | 0.0 | 25 | 0.0 | 0.0 | 25 | 0.0 | 25 | 25 | 0.0 |
| GC-12 | 0.0 | 62.5 | 0.0 | 0.0 | 12.5 | 0.0 | 12.5 | 12.5 | 0.0 |
| GC-13 | 0.0 | 12.5 | 0.0 | 0.0 | 62.5 | 0.0 | 12.5 | 12.5 | 0.0 |
| GC-14 | 0.0 | 12.5 | 0.0 | 0.0 | 12.5 | 0.0 | 62.5 | 12.5 | 0.0 |
| GC-15 | 0.0 | 12.5 | 0.0 | 0.0 | 12.5 | 0.0 | 12.5 | 62.5 | 0.0 |
| GF-11 | 25 | 25 | 0.0 | 0.0 | 0.0 | 25 | 0.0 | 25 | 0.0 |
| GF-12 | 62.5 | 12.5 | 0.0 | 0.0 | 0.0 | 12.5 | 0.0 | 12.5 | 0.0 |
| GF-13 | 12.5 | 62.5 | 0.0 | 0.0 | 0.0 | 12.5 | 0.0 | 12.5 | 0.0 |
| GF-15 | 12.5 | 12.5 | 0.0 | 0.0 | 0.0 | 12.5 | 0.0 | 62.5 | 0.0 |
| GW-01 | 100 | 0 | 0 | 0 | 0.0 | 0.0 | 0.0 | 0.0 | 0.0 |
| GW-02 | 0 | 100 | 0 | 0 | 0.0 | 0.0 | 0.0 | 0.0 | 0.0 |
| GW-03 | 0 | 0 | 100 | 0 | 0.0 | 0.0 | 0.0 | 0.0 | 0.0 |
| GW-04 | 0 | 0 | 0 | 100 | 0.0 | 0.0 | 0.0 | 0.0 | 0.0 |
| GW-05 | 50 | 50 | 0 | 0 | 0.0 | 0.0 | 0.0 | 0.0 | 0.0 |
| GW-06 | 50 | 0 | 50 | 0 | 0.0 | 0.0 | 0.0 | 0.0 | 0.0 |
| GW-07 | 50 | 0 | 0 | 50 | 0.0 | 0.0 | 0.0 | 0.0 | 0.0 |
| GW-08 | 0 | 50 | 50 | 0 | 0.0 | 0.0 | 0.0 | 0.0 | 0.0 |
| GW-09 | 0 | 50 | 0 | 50 | 0.0 | 0.0 | 0.0 | 0.0 | 0.0 |
| GW-10 | 0 | 0 | 50 | 50 | 0.0 | 0.0 | 0.0 | 0.0 | 0.0 |
| GW-11 | 25 | 25 | 25 | 25 | 0.0 | 0.0 | 0.0 | 0.0 | 0.0 |
| GW-12 | 62.5 | 12.5 | 12.5 | 12.5 | 0.0 | 0.0 | 0.0 | 0.0 | 0.0 |
| GW-13 | 12.5 | 62.5 | 12.5 | 12.5 | 0.0 | 0.0 | 0.0 | 0.0 | 0.0 |
| GW-14 | 12.5 | 12.5 | 62.5 | 12.5 | 0.0 | 0.0 | 0.0 | 0.0 | 0.0 |
| GW-15 | 12.5 | 12.5 | 12.5 | 62.5 | 0.0 | 0.0 | 0.0 | 0.0 | 0.0 |
| HH-07 | 0.0 | 33.3 | 33.3 | 0.0 | 0.0 | 33.3 | 0.0 | 0.0 | 0.0 |
| HH-08 | 0.0 | 66.6 | 16.6 | 0.0 | 0.0 | 16.6 | 0.0 | 0.0 | 0.0 |
| HH-09 | 0.0 | 16.6 | 66.6 | 0.0 | 0.0 | 16.6 | 0.0 | 0.0 | 0.0 |
| HH-10 | 0.0 | 16.6 | 16.6 | 0.0 | 0.0 | 66.6 | 0.0 | 0.0 | 0.0 |
| HT-12 | 0.0 | 62.5 | 0.0 | 0.0 | 12.5 | 0.0 | 12.5 | 12.5 | 0.0 |
| JA-11 | 25 | 25 | 0.0 | 0.0 | 25 | 0.0 | 0.0 | 25 | 0.0 |
| JA-12 | 62.5 | 12.5 | 0.0 | 0.0 | 12.5 | 0.0 | 0.0 | 12.5 | 0.0 |
| JA-13 | 12.5 | 62.5 | 0.0 | 0.0 | 12.5 | 0.0 | 0.0 | 12.5 | 0.0 |
| JA-14 | 12.5 | 12.5 | 0.0 | 0.0 | 62.5 | 0.0 | 0.0 | 12.5 | 0.0 |
| JA-15 | 12.5 | 12.5 | 0.0 | 0.0 | 12.5 | 0.0 | 0.0 | 62.5 | 0.0 |
| JB-10 | 0 | 0 | 50 | 0.0 | 0.0 | 0.0 | 0.0 | 50 | 0.0 |
| JB-11 | 25 | 25 | 25 | 0.0 | 0.0 | 0.0 | 0.0 | 25 | 0.0 |
| JB-12 | 62.5 | 12.5 | 12.5 | 0.0 | 0.0 | 0.0 | 0.0 | 12.5 | 0.0 |
| JB-13 | 12.5 | 62.5 | 12.5 | 0.0 | 0.0 | 0.0 | 0.0 | 12.5 | 0.0 |
| JB-14 | 12.5 | 12.5 | 62.5 | 0.0 | 0.0 | 0.0 | 0.0 | 12.5 | 0.0 |
| JB-15 | 12.5 | 12.5 | 12.5 | 0.0 | 0.0 | 0.0 | 0.0 | 62.5 | 0.0 |
| JFK-17 | 60 | 10 | 0.0 | 0.0 | 10 | 10 | 0.0 | 10 | 0.0 |
| JFK-18 | 10 | 60 | 0.0 | 0.0 | 10 | 10 | 0.0 | 10 | 0.0 |
| JG-07* | 33.3 | 0.0 | 33.3 | 33.3 | 0.0 | 0.0 | 0.0 | 0.0 | 0.0 |
| JG-08* | 66.6 | 0.0 | 16.6 | 16.6 | 0.0 | 0.0 | 0.0 | 0.0 | 0.0 |
| JG-09* | 16.6 | 0.0 | 66.6 | 16.6 | 0.0 | 0.0 | 0.0 | 0.0 | 0.0 |
| JG-10 | 16.6 | 0.0 | 16.6 | 66.6 | 0.0 | 0.0 | 0.0 | 0.0 | 0.0 |
| JM-07* | 33.3 | 0.0 | 33.3 | 0.0 | 0.0 | 33.3 | 0.0 | 0.0 | 0.0 |
| JM-08* | 66.6 | 0.0 | 16.6 | 0.0 | 0.0 | 16.6 | 0.0 | 0.0 | 0.0 |
| JM-09* | 16.6 | 0.0 | 66.6 | 0.0 | 0.0 | 16.6 | 0.0 | 0.0 | 0.0 |
| JM-10 | 16.6 | 0.0 | 16.6 | 0.0 | 0.0 | 66.6 | 0.0 | 0.0 | 0.0 |
| JP-06 | 0.0 | 0 | 0.0 | 0.0 | 0.0 | 50 | 0.0 | 50 | 0.0 |
| JP-07 | 0.0 | 33.3 | 0.0 | 0.0 | 0.0 | 33.3 | 0.0 | 33.3 | 0.0 |
| JP-08 | 0.0 | 66.6 | 0.0 | 0.0 | 0.0 | 16.6 | 0.0 | 16.6 | 0.0 |
| JP-09 | 0.0 | 16.6 | 0.0 | 0.0 | 0.0 | 66.6 | 0.0 | 16.6 | 0.0 |
| JP-10 | 0.0 | 16.6 | 0.0 | 0.0 | 0.0 | 16.6 | 0.0 | 66.6 | 0.0 |
| LBJ-02 | 0.0 | 0 | 0.0 | 0.0 | 100 | 0.0 | 0.0 | 0 | 0.0 |
| LBJ-04 | 0.0 | 50 | 0.0 | 0.0 | 50 | 0.0 | 0.0 | 0 | 0.0 |
| LBJ-06 | 0.0 | 0 | 0.0 | 0.0 | 50 | 0.0 | 0.0 | 50 | 0.0 |
| LBJ-07 | 0.0 | 33.3 | 0.0 | 0.0 | 33.3 | 0.0 | 0.0 | 33.3 | 0.0 |
| LBJ-08 | 0.0 | 66.6 | 0.0 | 0.0 | 16.6 | 0.0 | 0.0 | 16.6 | 0.0 |
| LBJ-09 | 0.0 | 16.6 | 0.0 | 0.0 | 66.6 | 0.0 | 0.0 | 16.6 | 0.0 |
| LBJ-10 | 0.0 | 16.6 | 0.0 | 0.0 | 16.6 | 0.0 | 0.0 | 66.6 | 0.0 |
| MF-09 | 0.0 | 16.6 | 66.6 | 16.6 | 0.0 | 0.0 | 0.0 | 0.0 | 0.0 |
| MF-10 | 0.0 | 16.6 | 16.6 | 66.6 | 0.0 | 0.0 | 0.0 | 0.0 | 0.0 |
| MF-07 | 0.0 | 33.3 | 33.3 | 33.3 | 0.0 | 0.0 | 0.0 | 0.0 | 0.0 |
| MF-08 | 0.0 | 66.6 | 16.6 | 16.6 | 0.0 | 0.0 | 0.0 | 0.0 | 0.0 |
| MVB-12 | 62.5 | 0.0 | 0.0 | 0.0 | 12.5 | 12.5 | 0.0 | 12.5 | 0.0 |
| RBH-04 | 50 | 0.0 | 0.0 | 0.0 | 50 | 0.0 | 0.0 | 0 | 0.0 |
| RBH-07 | 33.3 | 0.0 | 0.0 | 0.0 | 33.3 | 0.0 | 0.0 | 33.3 | 0.0 |
| RBH-08 | 66.6 | 0.0 | 0.0 | 0.0 | 16.6 | 0.0 | 0.0 | 16.6 | 0.0 |
| RBH-09 | 16.6 | 0.0 | 0.0 | 0.0 | 66.6 | 0.0 | 0.0 | 16.6 | 0.0 |
| RBH-10 | 16.6 | 0.0 | 0.0 | 0.0 | 16.6 | 0.0 | 0.0 | 66.6 | 0.0 |
| RN-08 | 0.0 | 0 | 0.0 | 50 | 50 | 0.0 | 0.0 | 0 | 0.0 |
| RN-12 | 0.0 | 62.5 | 0.0 | 12.5 | 12.5 | 0.0 | 0.0 | 12.5 | 0.0 |

TABLE 9B-continued

Composition Blends

| ID | PHSO125 | HSO | SA | BW | CO | CuW | CdW | VS | PA |
|---|---|---|---|---|---|---|---|---|---|
| RN-13 | 0.0 | 12.5 | 0.0 | 62.5 | 12.5 | 0.0 | 0.0 | 12.5 | 0.0 |
| RN-14 | 0.0 | 12.5 | 0.0 | 12.5 | 62.5 | 0.0 | 0.0 | 12.5 | 0.0 |
| RR-06 | 0.0 | 0 | 0.0 | 0.0 | 0.0 | 0.0 | 50 | 50 | 0.0 |
| RR-07 | 0.0 | 33.3 | 0.0 | 0.0 | 0.0 | 0.0 | 33.3 | 33.3 | 0.0 |
| RR-08 | 0.0 | 66.6 | 0.0 | 0.0 | 0.0 | 0.0 | 16.6 | 16.6 | 0.0 |
| RR-09 | 0.0 | 16.6 | 0.0 | 0.0 | 0.0 | 0.0 | 66.6 | 16.6 | 0.0 |
| RR-10 | 0.0 | 16.6 | 0.0 | 0.0 | 0.0 | 0.0 | 16.6 | 66.6 | 0.0 |
| TJ-15 | 0 | 0 | 0 | 50 | 0.0 | 50 | 0.0 | 0.0 | 0.0 |
| TJ-16 | 20 | 20 | 20 | 20 | 0.0 | 20 | 0.0 | 0.0 | 0.0 |
| TJ-17 | 60 | 10 | 10 | 10 | 0.0 | 10 | 0.0 | 0.0 | 0.0 |
| TJ-18 | 10 | 60 | 10 | 10 | 0.0 | 10 | 0.0 | 0.0 | 0.0 |
| TJ-19 | 10 | 10 | 60 | 10 | 0.0 | 10 | 0.0 | 0.0 | 0.0 |
| TJ-20 | 10 | 10 | 10 | 60 | 0.0 | 10 | 0.0 | 0.0 | 0.0 |
| TJ-21 | 10 | 10 | 10 | 10 | 0.0 | 60 | 0.0 | 0.0 | 0.0 |
| TR-04 | 0 | 0 | 0 | 100 | 0.0 | 0.0 | 0 | 0.0 | 0.0 |
| TR-12 | 0 | 50 | 0 | 0 | 0.0 | 0.0 | 50 | 0.0 | 0.0 |
| TR-15 | 0 | 0 | 0 | 50 | 0.0 | 0.0 | 50 | 0.0 | 0.0 |
| TR-16 | 20 | 20 | 20 | 20 | 0.0 | 0.0 | 20 | 0.0 | 0.0 |
| TR-17 | 60 | 10 | 10 | 10 | 0.0 | 0.0 | 10 | 0.0 | 0.0 |
| TR-18 | 10 | 60 | 10 | 10 | 0.0 | 0.0 | 10 | 0.0 | 0.0 |
| TR-19 | 10 | 10 | 60 | 10 | 0.0 | 0.0 | 10 | 0.0 | 0.0 |
| TR-20 | 10 | 10 | 10 | 60 | 0.0 | 0.0 | 10 | 0.0 | 0.0 |
| TR-21 | 10 | 10 | 10 | 10 | 0.0 | 0.0 | 60 | 0.0 | 0.0 |
| USG-08 | 66.6 | 0.0 | 0.0 | 16.6 | 0.0 | 0.0 | 0.0 | 16.6 | 0.0 |
| WH-01 | 100 | 0 | 0 | 0.0 | 0 | 0.0 | 0.0 | 0.0 | 0.0 |
| WH-02 | 0 | 100 | 0 | 0.0 | 0 | 0.0 | 0.0 | 0.0 | 0.0 |
| WH-03 | 0 | 0 | 100 | 0.0 | 0 | 0.0 | 0.0 | 0.0 | 0.0 |
| WH-04 | 0 | 0 | 0 | 0.0 | 0.0 | 100 | 0.0 | 0.0 | 0.0 |
| WH-05 | 50 | 50 | 0 | 0.0 | 0 | 0.0 | 0.0 | 0.0 | 0.0 |
| WH-06 | 50 | 0 | 50 | 0.0 | 0 | 0.0 | 0.0 | 0.0 | 0.0 |
| WH-07 | 50 | 0 | 0 | 0.0 | 0.0 | 50 | 0.0 | 0.0 | 0.0 |
| WH-08 | 0 | 50 | 50 | 0.0 | 0 | 0.0 | 0.0 | 0.0 | 0.0 |
| WH-09 | 0 | 50 | 0 | 0.0 | 0.0 | 50 | 0.0 | 0.0 | 0.0 |
| WH-10 | 0 | 0 | 50 | 0.0 | 0.0 | 50 | 0.0 | 0.0 | 0.0 |
| WH-11 | 25 | 25 | 25 | 0.0 | 0.0 | 25 | 0.0 | 0.0 | 0.0 |
| WH-12 | 62.5 | 12.5 | 12.5 | 0.0 | 0.0 | 12.5 | 0.0 | 0.0 | 0.0 |
| WH-13 | 12.5 | 62.5 | 12.5 | 0.0 | 0.0 | 12.5 | 0.0 | 0.0 | 0.0 |
| WH-14 | 12.5 | 12.5 | 62.5 | 0.0 | 0.0 | 12.5 | 0.0 | 0.0 | 0.0 |
| WH-15 | 12.5 | 12.5 | 12.5 | 0.0 | 0.0 | 62.5 | 0.0 | 0.0 | 0.0 |
| WM-07 | 0.0 | 33.3 | 33.3 | 0.0 | 0.0 | 0.0 | 33.3 | 0.0 | 0.0 |
| WM-08 | 0.0 | 66.6 | 16.6 | 0.0 | 0.0 | 0.0 | 16.6 | 0.0 | 0.0 |
| WM-09 | 0.0 | 16.6 | 66.6 | 0.0 | 0.0 | 0.0 | 16.6 | 0.0 | 0.0 |
| WM-10 | 0.0 | 16.6 | 16.6 | 0.0 | 0.0 | 0.0 | 66.6 | 0.0 | 0.0 |
| WT-06 | 0.0 | 0 | 0.0 | 50 | 0.0 | 0.0 | 0.0 | 50 | 0.0 |
| WT-07 | 0.0 | 33.3 | 0.0 | 33.3 | 0.0 | 0.0 | 0.0 | 33.3 | 0.0 |
| WT-08 | 0.0 | 66.6 | 0.0 | 16.6 | 0.0 | 0.0 | 0.0 | 16.6 | 0.0 |
| WT-09 | 0.0 | 16.6 | 0.0 | 66.6 | 0.0 | 0.0 | 0.0 | 16.6 | 0.0 |
| WT-10 | 0.0 | 16.6 | 0.0 | 16.6 | 0.0 | 0.0 | 0.0 | 66.6 | 0.0 |
| WW-08 | 66.6 | 0.0 | 0.0 | 0.0 | 0.0 | 0.0 | 16.6 | 16.6 | 0.0 |
| ZT-11 | 25 | 25 | 0.0 | 0.0 | 0.0 | 0.0 | 25 | 25 | 0.0 |
| ZT-12 | 62.5 | 12.5 | 0.0 | 0.0 | 0.0 | 0.0 | 12.5 | 12.5 | 0.0 |
| ZT-13 | 12.5 | 62.5 | 0.0 | 0.0 | 0.0 | 0.0 | 12.5 | 12.5 | 0.0 |
| ZT-14 | 12.5 | 12.5 | 0.0 | 0.0 | 0.0 | 0.0 | 62.5 | 12.5 | 0.0 |
| ZT-15 | 12.5 | 12.5 | 0.0 | 0.0 | 0.0 | 0.0 | 12.5 | 62.5 | 0.0 |

For each blend the following data characteristics were tracked: (1) Cracking in finished candle, (2) Color of wax, (3) Adherence/shrinkage characteristics of wax, (4) Melt point of wax, (5) Surface characteristics of finished candle (i.e. pattern and bubbling of wax), (6) Cracking in wax pool, and (7) Wax pool temperatures. Table 9C provides a grading scale for several of the characteristics tracked.

TABLE 9C

Characteristic Scales

| Scale | Description |
|---|---|
| | Adherence/Shrinkage Characteristic (3) |
| 0 | No visible adherence to container or easy removal of wax from candle mold. |
| 1 | Some adherence to container or added work/force necessary to remove wax from mold |
| 2 | Almost complete adherence to container or excessive work/force necessary to remove wax from mold |
| 3 | Complete adherence to container or destruction of shape necessary to remove wax from mold |
| | Color Characteristic (2) |
| 0 | White |
| 1 | Pale Yellow (color of raw soybean oils) |
| 2 | Slight color change |
| 3 | Moderate color change |
| 4 | Extreme color change |
| | Cracking Intensity Characteristic (1) or (6) |
| 0 | No cracks visible |
| 1 | Surface cracks under 1 inch |
| 2 | Surface cracks over 1 inch |

TABLE 9C-continued

Characteristic Scales

| Scale | Description |
|---|---|
| 3 | Deep cracks under 1 inch |
| 4 | Deep cracks over 1 inch, radiating cracks, or cracks that make the surface uneven |
| | Surface Characteristic (5) |
| 0 | Smooth with no pattern |
| 1 | Smooth with pattern not covering entire surface |
| 2 | Smooth with pattern covering entire surface |
| 3 | Small bumps with or without pattern |
| 4 | Large bumps with or without pattern |

Table 9D contains a listing of the results observed for each blend composition. It was observed that Carnauba wax and Candelilla wax caused the composition to be too dark. Additionally, blends containing over 25 percent by weight of canola oil cause crystal formation in the composition, giving the composition a "bubbled" appearance. Based on these results, blend compositions having the following ranges are preferred: 0 to 100 percent by weight of partially hydrogenated soybean oil (PHSO125), 0 to 100 percent by weight fully hydrogenated soybean oil (HSO), 0 to 100 percent by weight stearic acid (SA), 0 to 100 percent by weight beeswax (BW), 0 to 25 percent by weight canola oil (CO), 0 to 100 percent by weight carnauba wax (CuW), 0 to 100 percent by weight candelillia wax (CdW), 0 to 100 percent by weight crystal modifier Dimodan (VS), and 0 to 50 percent by weight palmitic acid.

TABLE 9D

Data Collected on Blend Compositions

| ID | CRACKING (1), (6) | COLOR (2) | SURFACE (5) | ADH/SHR (3) | MELT POINT ° C. (4) | AVE WAX POOL TEMP ° C. (7) |
|---|---|---|---|---|---|---|
| AJ-03 | 1 | 2 | 0 | 2 | 71.53 | 83.55 |
| AJ-05 | 0 | 1 | 0 | 0 | 66.85 | 78.7 |
| AJ-06 | 1 | 2 | 0 | 2 | 67.83 | 79.6 |
| AJ-07 | 1 | 1 | 0 | 2 | 65.14 | 82.65 |
| AJ-08 | 1 | 1 | 0 | 0 | 56.17 | 74.2 |
| AJ-09 | 0 | 1 | 0 | 0 | 63.71 | 71.1 |
| AJ-10 | 0 | 1 | 0 | 0 | 68.53 | 79.15 |
| AL-07 | 0 | 3 | 0 | 2 | 51.5 | 70.3 |
| AL-08 | 2 | 2 | 0 | 2 | 53.52 | 0 |
| AL-09 | 2 | 2 | 0 | 2 | 52.82 | 68.4 |
| AL-10 | 0 | 4 | 0 | 0 | 63.95 | 0 |
| BC-07 | 1 | 3 | 0 | 0 | 51.87 | 84.95 |
| BC-08 | 1 | 1 | 0 | 2 | 50.41 | 79.15 |
| BC-09 | 2 | 1 | 0 | 0 | 54.78 | 82.57 |
| BC-10 | 3 | 3 | 0 | 0 | 83.05 | 89.35 |
| CA-07 | 3 | 3 | 0 | 2 | 80.36 | 91.4 |
| CA-08 | 1 | 2 | 0 | 0 | 75.77 | 80.47 |
| CA-09 | 2 | 3 | 0 | 0 | 82.6 | 104.07 |
| CA-10 | 1 | 2 | 0 | 0 | 70.46 | 92.85 |
| CC-08 | 3 | 3 | 0 | 0 | 80.51 | 92.1 |
| CC-10 | 4 | 4 | 0 | 1 | 83.04 | 97.1 |
| CC-11 | 0 | 2 | 0 | 0 | 60.32 | 86.15 |
| CC-12 | 0 | 2 | 0 | 0 | 53.86 | 78.8 |
| CC-13 | 1 | 2 | 0 | 2 | 56.89 | 88.3 |
| CC-14 | 2 | 3 | 0 | 0 | 83.56 | 88.63 |
| CC-15 | 1 | 2 | 0 | 2 | 68.03 | 99.67 |
| DE-11 | 0 | 1 | 0 | 1 | 61.9 | 61.9 |
| DE-12 | 0 | 1 | 0 | 4 | 56.04 | 72.83 |
| DE-13 | 4 | 1 | 0 | 4 | 62.86 | 77.47 |
| FDR-17 | 1 | 1 | 0 | 0 | 60.03 | 75.63 |
| FDR-18 | 2 | 2 | 0 | 1 | 60.82 | 75.1 |

TABLE 9D-continued

Data Collected on Blend Compositions

| ID | CRACKING (1), (6) | COLOR (2) | SURFACE (5) | ADH/SHR (3) | MELT POINT ° C. (4) | AVE WAX POOL TEMP ° C. (7) |
|---|---|---|---|---|---|---|
| FP-07 | 0 | 1 | 3 | 3 | 59.61 | 64.45 |
| FP-09 | 0 | 2 | 3 | 1 | 64.8 | 65.9 |
| FP-11 | 0 | 1 | 0 | 1 | 56.95 | 75.53 |
| FP-12 | 0 | 1 | 0 | 2 | 57.1 | 73.33 |
| FP-13 | 4 | 1 | 0 | 3 | 60.32 | 74.05 |
| GB-17 | 2 | 2 | 0 | 0 | 54.56 | 74.15 |
| GB-18 | 4 | 3 | 0 | 2 | 61.1 | 79.17 |
| GC-11 | 0 | 2 | 0 | 3 | 62.56 | 88.13 |
| GC-12 | 4 | 2 | 0 | 3 | 61.25 | 77.47 |
| GC-13 | 4 | 1 | 0 | 0 | 61.01 | 79.2 |
| GC-14 | 4 | 3 | 0 | 0 | 63.68 | 0 |
| GC-15 | 0 | 2 | 0 | 3 | 68.63 | 78.5 |
| GF-11 | 2 | 2 | 0 | 0 | 79.07 | 96.93 |
| GF-12 | 2 | 1 | 0 | 3 | 60.59 | 80.95 |
| GF-13 | 2 | 2 | 0 | 1 | 61.7 | 81.57 |
| GF-15 | 1 | 2 | 0 | 0 | 70.3 | 91.2 |
| GW-01 | 0 | 1 | 3 | 1 | 52.64 | 57.3 |
| GW-02 | 0 | 1 | 3 | 1 | 45.11 | 57.33 |
| GW-03 | 0 | 0 | 2 | 3 | 58.88 | 57.96 |
| GW-04 | 4 | 4 | 0 | 1 | 63.34 | 64.03 |
| GW-05 | 0 | 1 | 0 | 2 | 47.54 | 57.13 |
| GW-06 | 0 | 0 | 3 | 2 | 54.48 | 56.54 |
| GW-07 | 0 | 1 | 0 | 3 | 58.73 | 63.55 |
| GW-08 | 0 | 1 | 3 | 1 | 51.65 | 59.74 |
| GW-09 | 0 | 2 | 0 | 2 | 61.42 | 62.52 |
| GW-10 | 4 | 3 | 0 | 1 | 55.29 | 62.87 |
| GW-11 | 1 | 1 | 0 | 2 | 51.93 | 58.76 |
| GW-12 | 1 | 1 | 0 | 2 | 48.52 | 60.65 |
| GW-13 | 3 | 1 | 0 | 1 | 48.27 | 58.73 |
| GW-14 | 0 | 3 | 3 | 2 | 52.21 | 57.43 |
| GW-15 | 1 | 3 | 0 | 1 | 61.41 | 62.1 |
| HH-07 | 1 | 2 | 0 | 2 | 77.93 | 80.5 |
| HH-08 | 2 | 2 | 0 | 2 | 64.11 | 82.95 |
| HH-09 | 3 | 2 | 0 | 0 | 56.77 | 82.63 |
| HH-10 | 2 | 2 | 0 | 0 | 81.76 | 87.45 |
| HT-12 | 1 | 2 | 0 | 0 | 63.4 | 72.4 |
| JA-11 | 1 | 1 | 0 | 1 | 64.01 | 82.87 |
| JA-12 | 1 | 1 | 0 | 0 | 55.41 | 73.3 |
| JA-13 | 1 | 1 | 0 | 1 | 62.21 | 72.75 |
| JA-14 | 0 | 1 | 0 | 2 | 59.11 | 74.9 |
| JA-15 | 0 | 1 | 0 | 2 | 68.02 | 81.7 |
| JB-10 | 0 | 1 | 0 | 2 | 59.25 | 70.7 |
| JB-11 | 0 | 1 | 0 | 0 | 59.14 | 80.77 |
| JB-12 | 0 | 1 | 0 | 3 | 53.48 | 70.77 |
| JB-13 | 0 | 1 | 0 | 2 | 61.46 | 72.45 |
| JB-14 | 1 | 2 | 0 | 2 | 55.82 | 64.24 |
| JB-15 | 0 | 2 | 0 | 1 | 65.71 | 78.4 |
| JFK-17 | 3 | 2 | 0 | 2 | 57.98 | 81.73 |
| JFK-18 | 3 | 2 | 0 | 3 | 66.81 | 76.47 |
| JG-07* | 3 | 2 | 0 | 1 | 56.6 | 65.95 |
| JG-08* | 0 | 1 | 0 | 2 | 50.37 | 62.04 |
| JG-09* | 3 | 1 | 0 | 2 | 53.51 | 65.82 |
| JG-10 | 2 | 3 | 0 | 2 | 61.38 | 70.93 |
| JM-07* | 0 | 3 | 0 | 0 | 52.79 | 0 |
| JM-08* | 0 | 1 | 0 | 0 | 52.83 | 0 |
| JM-09* | 1 | 2 | 0 | 0 | 53.01 | 69.28 |
| JM-10 | 2 | 4 | 0 | 0 | 63.64 | 0 |
| JP-06 | 0 | 4 | 0 | 0 | 81.47 | 92.07 |
| JP-07 | 2 | 3 | 0 | 0 | 79.99 | 95.35 |
| JP-08 | 4 | 2 | 0 | 0 | 62.12 | 82.25 |
| JP-09 | 2 | 4 | 0 | 0 | 82.73 | 94.27 |
| JP-10 | 0 | 3 | 0 | 2 | 68.49 | 97.23 |
| LBJ-02 | 1 | 1 | 4 | 2 | 57.21 | 68.08 |
| LBJ-04 | 2 | 1 | 4 | 2 | 66.22 | 74.63 |
| LBJ-06 | 0 | 1 | 0 | 0 | 66.88 | 81.87 |
| LBJ-07 | 0 | 1 | 0 | 0 | 65.68 | 89.7 |
| LBJ-08 | 1 | 2 | 0 | 0 | 62.33 | 82.8 |
| LBJ-09 | 0 | 1 | 0 | 0 | 58.11 | 79.7 |
| LBJ-10 | 1 | 1 | 0 | 1 | 68.98 | 85.7 |
| MF-09 | 1 | 1 | 0 | 2 | 53.66 | 68 |
| MF-10 | 0 | 3 | 0 | 2 | 61.97 | 70.1 |
| MF-07 | 4 | 2 | 0 | 1 | 55.24 | 70.4 |
| MF-08 | 2 | 1 | 3 | 2 | 68.03 | 71.54 |

TABLE 9D-continued

Data Collected on Blend Compositions

| ID | CRACKING (1), (6) | COLOR (2) | SURFACE (5) | ADH/SHR (3) | MELT POINT ° C. (4) | AVE WAX POOL TEMP ° C. (7) |
|---|---|---|---|---|---|---|
| MVB-12 | 4 | 2 | 0 | 1 | 51.42 | 78.1 |
| RBH-04 | 1 | 1 | 1 | 2 | 51.9 | 67.16 |
| RBH-07 | 0 | 1 | 0 | 2 | 63.77 | 76.2 |
| RBH-08 | 0 | 1 | 0 | 0 | 70.8 | 70.85 |
| RBH-09 | 0 | 1 | 0 | 0 | 60.86 | 76.25 |
| RBH-10 | 1 | 1 | 0 | 2 | 68.95 | 82.85 |
| RN-08 | 1 | 2 | 0 | 2 | 62.24 | 67.55 |
| RN-12 | 0 | 1 | 0 | 0 | 63.03 | 72.23 |
| RN-13 | 0 | 2 | 0 | 2 | 62.83 | 71.63 |
| RN-14 | 2 | 2 | 0 | 3 | 62.85 | 69.77 |
| RR-06 | 0 | 4 | 0 | 0 | 65.95 | 90.07 |
| RR-07 | 0 | 3 | 0 | 0 | 63.03 | 80.67 |
| RR-08 | 0 | 2 | 0 | 0 | 54.48 | 79.53 |
| RR-09 | 1 | 4 | 0 | 2 | 64.53 | 0 |
| RR-10 | 1 | 3 | 0 | 0 | 67.64 | 76.17 |
| TJ-15 | 3 | 3 | 0 | 2 | 80.75 | 88.65 |
| TJ-16 | 4 | 2 | 0 | 2 | 53.3 | 73.1 |
| TJ-17 | 1 | 1 | 0 | 2 | 54.12 | 77.5 |
| TJ-18 | 4 | 2 | 0 | 2 | 66.18 | 79.75 |
| TJ-19 | 2 | 2 | 0 | 0 | 53.03 | 73.03 |
| TJ-20 | 4 | 2 | 0 | 2 | 63.14 | 79.4 |
| TJ-21 | 3 | 3 | 0 | 0 | 81.27 | 85.1 |
| TR-04 | 4 | 3 | 0 | 2 | 63.53 | 70.68 |
| TR-12 | 4 | 3 | 0 | 0 | 62.16 | 0 |
| TR-15 | 0 | 3 | 0 | 2 | 65.91 | 64.2 |
| TR-16 | 2 | 1 | 0 | 2 | 59.3 | 75.7 |
| TR-17 | 2 | 1 | 0 | 1 | 54.46 | 0 |
| TR-18 | 1 | 2 | 4 | 2 | 66.89 | 70.6 |
| TR-19 | 2 | 1 | 0 | 2 | 53.35 | 71.18 |
| TR-20 | 4 | 2 | 0 | 3 | 64.11 | 74.28 |
| TR-21 | 4 | 3 | 0 | 0 | 64.27 | 0 |
| USG-08 | 0 | 1 | 0 | 1 | 48 | 72.8 |
| WH-01 | 0 | 1 | 3 | 3 | 51.53 | 60.6 |
| WH-02 | 2 | 1 | 4 | 1 | 70.92 | 73.33 |
| WH-03 | 0 | 0 | 0 | 1 | 0 | 62.78 |
| WH-04 | 4 | 4 | 0 | 0 | 85.22 | 87.7 |
| WH-05 | 0 | 1 | 3 | 3 | 51.12 | 60.58 |
| WH-06 | 2 | 2 | 3 | 2 | 50.74 | 59.62 |
| WH-07 | 5 | 3 | 0 | 3 | 81.35 | 79.67 |
| WH-08 | 0 | 1 | 4 | 1 | 60.87 | 67.97 |
| WH-09 | 2 | 3 | 0 | 0 | 81.5 | 87.7 |
| WH-10 | 4 | 4 | 0 | 0 | 78.9 | 88.6 |
| WH-11 | 4 | 3 | 0 | 2 | 49.83 | 82.45 |
| WH-12 | 1 | 2 | 0 | 2 | 53.94 | 78.85 |
| WH-13 | 0 | 2 | 3 | 2 | 47.44 | 77.6 |
| WH-14 | 4 | 3 | 0 | 0 | 54.28 | 82.4 |
| WH-15 | 4 | 4 | 0 | 0 | 81.25 | 78.57 |
| WM-07 | 2 | 2 | 0 | 2 | 60.12 | 0 |
| WM-08 | 4 | 2 | 4 | 0 | 68.16 | 0 |
| WM-09 | 4 | 2 | 0 | 3 | 55.38 | 0 |
| WM-10 | 2 | 3 | 0 | 0 | 64.04 | 0 |
| WT-06 | 1 | 2 | 0 | 2 | 64.7 | 81.97 |
| WT-07 | 0 | 2 | 0 | 0 | 62.74 | 74.9 |
| WT-08 | 0 | 1 | 0 | 1 | 61.95 | 72.8 |
| WT-09 | 0 | 2 | 0 | 1 | 62.68 | 73.8 |
| WT-10 | 1 | 2 | 0 | 1 | 69.08 | 78.25 |
| WW-08 | 0 | 2 | 0 | 4 | 61.79 | 75.23 |
| ZT-11 | 0 | 3 | 0 | 0 | 61.47 | 56.1 |
| ZT-12 | 0 | 2 | 0 | 0 | 56.7 | 52.23 |
| ZT-13 | 0 | 3 | 0 | 0 | 60.95 | 75.7 |
| ZT-14 | 2 | 4 | 0 | 0 | 62.26 | 0 |
| ZT-15 | 1 | 3 | 0 | 0 | 67.75 | 81.97 |

Example 10

Another series of experiments were performed to replace or reduce the use of petroleum products in a candle composition. The compositions tested were comprised of either all or a subset of the ingredients shown in Table 10A. An abbreviation is provided in Table 10A for each ingredient along with the supplier of each ingredient. Additionally, the compositions tested are constrained by the following requirements: the composition includes 50 to 100 percent by weight of plant derived materials, 0 to 12.5 percent by weight of petroleum products, and 0 to 25 percent by weight canola oil.

TABLE 10A

Ingredients

| Abbreviation | Ingredient Name | Supplier |
|---|---|---|
| PHSO125 | Shurset K 125 - Partially Hydrogenated Soybean Oil | A.C. Humko |
| HSO | Dritex S-21V - Hydrogenated Soybean Oil | A.C. Humko |
| SA | Stearic Acid, FA-1655 | PCNA |
| PA | Palmitic Acid, FA-1695 | PCNA |
| BW | Beeswax | Strahl Pitsch |
| CO | Canola Oil | A.C. Humko |
| VS | Dimodan P VK - Vegetable Surfactant | Danisco Culter, USA |
| HMW | R-2542 - High Melt Paraffin Wax | Moore & Munger located at Two Corporate Drive, Suite 434, Shelton, CT 06484 |
| LMW | IGI-1230 - Low Melt Paraffin Wax | International Group Inc. (IGI) located at 85 Old Eagle School Road, Wayne, PA 19087 |
| Micro | Bowax 874 - Microcrystalline Paraffin Wax | IGI |
| Vybar | Vybar 103 - Polymer Paraffin Wax | Baker Hughes located at 3900 Essex Lane, Houston, TX 77027 |

Compositions having the following ranges are tested: 36.5 to 100 percent by weight free fatty acid/triglyceride component, 0 to 12.5 percent by weight of petroleum products, 0 to 12.5 percent by weight of beeswax, and 0 to 51 percent by weight of Dimodan crystal modifier. The free fatty acid/triglyceride component is composed of (all percent by weights indicate the percent of each component in the finished candle not the percentage make-up of the free fatty acid/triglyceride component alone) 0 to 51 percent by weight of partially hydrogenated soybean oil (PHSO125), 0 to 25 percent by weight fully hydrogenated soybean oil (HSO), 0 to 50 percent by weight stearic acid (SA), 0 to 25 percent by weight canola oil (CO), and 0 to 50 percent by weight palmitic acid (PA).

TABLE 10B

Ingredient Combinations

| Run | PHSO125 | HSO | SA | PA | VS | BW | CO | LM | HM | MICRO | VYBAR |
|---|---|---|---|---|---|---|---|---|---|---|---|
| 1 | 0 | 25 | 0 | 17.75 | 51 | 0 | 0 | 0 | 0 | 0 | 6.25 |
| 2 | 50 | 0 | 12.5 | 0 | 0 | 0 | 25 | 6.25 | 6.25 | 0 | 0 |
| 3 | 0 | 0 | 0 | 12.5 | 50 | 0 | 25 | 12.5 | 0 | 0 | 0 |
| 4 | 51 | 0 | 0 | 11.5 | 0 | 0 | 25 | 0 | 12.5 | 0 | 0 |
| 5 | 0 | 0 | 50 | 0 | 50 | 0 | 0 | 0 | 0 | 0 | 0 |
| 6 | 51 | 0 | 18.25 | 0 | 18.25 | 0 | 0 | 12.5 | 0 | 0 | 0 |
| 7 | 0 | 0 | 43.75 | 0 | 50 | 0 | 0 | 6.25 | 0 | 0 | 0 |
| 8 | 24 | 0 | 0 | 0 | 51 | 0 | 25 | 0 | 0 | 0 | 0 |
| 9 | 50 | 0 | 37.5 | 0 | 0 | 0 | 0 | 0 | 12.5 | 0 | 0 |
| 10 | 24.5 | 0 | 0 | 24.5 | 51 | 0 | 0 | 0 | 0 | 0 | 0 |
| 11 | 0 | 0 | 0 | 49 | 51 | 0 | 0 | 0 | 0 | 0 | 0 |
| 12 | 0 | 0 | 0 | 11.5 | 51 | 0 | 25 | 0 | 0 | 0 | 12.5 |
| 13 | 51 | 25 | 0 | 11.5 | 0 | 0 | 0 | 12.5 | 0 | 0 | 0 |
| 14 | 50 | 0 | 0 | 50 | 0 | 0 | 0 | 0 | 0 | 0 | 0 |
| 15 | 11.5 | 25 | 0 | 0 | 51 | 12.5 | 0 | 0 | 0 | 0 | 0 |
| 16 | 50 | 0 | 12.5 | 0 | 0 | 0 | 25 | 0 | 0 | 6.25 | 6.25 |
| 17 | 0 | 25 | 11.5 | 0 | 51 | 0 | 0 | 0 | 12.5 | 0 | 0 |
| 18 | 25 | 0 | 25 | 0 | 25 | 0 | 25 | 0 | 0 | 0 | 0 |
| 19 | 36.5 | 0 | 0 | 0 | 51 | 0 | 0 | 12.5 | 0 | 0 | 0 |
| 20 | 0 | 0 | 25 | 0 | 50 | 0 | 12.5 | 0 | 12.5 | 0 | 0 |
| 21 | 0 | 0 | 17.75 | 0 | 51 | 0 | 25 | 0 | 6.25 | 0 | 0 |
| 22 | 51 | 0 | 0 | 11.5 | 0 | 0 | 25 | 0 | 0 | 12.5 | 0 |
| 23 | 25 | 0 | 0 | 25 | 25 | 0 | 25 | 0 | 0 | 0 | 0 |

TABLE 10B-continued

| | | | | Ingredient Combinations | | | | | | |
|---|---|---|---|---|---|---|---|---|---|---|
| Run | PHSO125 | HSO | SA | PA | VS | BW | CO | LM | HM | MICRO | VYBAR |
| 24 | 51 | 25 | 0 | 0 | 24 | 0 | 0 | 0 | 0 | 0 | 0 |
| 25 | 50 | 0 | 0 | 25 | 0 | 12.5 | 12.5 | 0 | 0 | 0 | 0 |
| 26 | 51 | 0 | 0 | 24.5 | 24.5 | 0 | 0 | 0 | 0 | 0 | 0 |
| 27 | 50 | 0 | 37.5 | 0 | 0 | 6.25 | 0 | 0 | 0 | 0 | 6.25 |
| 28 | 51 | 0 | 0 | 36.5 | 0 | 0 | 0 | 0 | 0 | 0 | 12.5 |
| 29 | 50 | 0 | 0 | 18.75 | 0 | 0 | 25 | 0 | 0 | 0 | 6.25 |
| 30 | 0 | 0 | 36.5 | 0 | 51 | 6.25 | 0 | 0 | 0 | 6.25 | 0 |
| 31 | 51 | 25 | 0 | 11.5 | 0 | 0 | 0 | 0 | 6.25 | 6.25 | 0 |
| 32 | 25 | 0 | 37.5 | 0 | 25 | 0 | 0 | 0 | 0 | 12.5 | 0 |
| 33 | 51 | 0 | 11.5 | 0 | 0 | 0 | 25 | 12.5 | 0 | 0 | 0 |
| 34 | 0 | 0 | 0 | 11.50 | 51 | 6.25 | 25 | 0 | 6.25 | 0 | 0 |
| 35 | 51 | 0 | 0 | 0 | 36.5 | 12.5 | 0 | 0 | 0 | 0 | 0 |
| 36 | 25 | 0 | 37.5 | 0 | 25 | 12.5 | 0 | 0 | 0 | 0 | 0 |
| 37 | 0 | 0 | 0 | 37.50 | 50 | 0 | 0 | 0 | 0 | 12.5 | 0 |
| 38 | 24 | 12.5 | 0 | 0 | 51 | 0 | 0 | 0 | 0 | 12.5 | 0 |
| 39 | 0 | 0 | 0 | 12.5 | 50 | 0 | 25 | 6.25 | 0 | 0 | 6.25 |
| 40 | 0 | 25 | 0 | 12.5 | 50 | 0 | 0 | 0 | 0 | 12.5 | 0 |
| 41 | 0 | 12.5 | 0 | 24 | 51 | 0 | 12.5 | 0 | 0 | 0 | 0 |
| 42 | 0 | 25 | 0 | 17.75 | 51 | 0 | 0 | 0 | 0 | 6.25 | 0 |
| 43 | 25 | 0 | 0 | 50 | 25 | 0 | 0 | 0 | 0 | 0 | 0 |
| 44 | 25 | 25 | 25 | 0 | 25 | 0 | 0 | 0 | 0 | 0 | 0 |
| 45 | 25 | 0 | 37.5 | 0 | 25 | 0 | 0 | 12.5 | 0 | 0 | 0 |
| 46 | 36.5 | 0 | 0 | 0 | 51 | 0 | 0 | 0 | 0 | 0 | 12.5 |
| 47 | 50 | 25 | 0 | 12.5 | 0 | 0 | 0 | 0 | 12.5 | 0 | 0 |
| 48 | 51 | 0 | 0 | 0 | 36.5 | 0 | 0 | 0 | 12.5 | 0 | 0 |
| 49 | 0 | 0 | 11.5 | 0 | 51 | 0 | 25 | 0 | 0 | 12.5 | 0 |
| 50 | 0 | 0 | 0 | 12.5 | 50 | 0 | 25 | 0 | 6.25 | 0 | 6.25 |
| 51 | 51 | 25 | 0 | 11.5 | 0 | 12.5 | 0 | 0 | 0 | 0 | 0 |
| 52 | 0 | 0 | 37.5 | 0 | 50 | 0 | 0 | 0 | 0 | 0 | 12.5 |
| 53 | 26.66 | 12.5 | 5.63 | 5.63 | 26.66 | 2.08 | 12.5 | 2.08 | 2.08 | 2.08 | 2.08 |
| 54 | 0 | 25 | 11.5 | 0 | 51 | 0 | 0 | 6.25 | 0 | 6.25 | 0 |
| 55 | 51 | 0 | 0 | 0 | 36.5 | 0 | 0 | 0 | 12.5 | 0 | 0 |
| 56 | 0 | 0 | 0 | 37.5 | 50 | 12.5 | 0 | 0 | 0 | 0 | 0 |
| 57 | 0 | 12.5 | 24 | 0 | 51 | 0 | 0 | 12.5 | 0 | 0 | 0 |
| 58 | 51 | 0 | 0 | 0 | 11.5 | 0 | 25 | 0 | 0 | 0 | 12.5 |
| 59 | 50 | 0 | 25 | 25 | 0 | 0 | 0 | 0 | 0 | 0 | 0 |
| 60 | 51 | 25 | 11.5 | 0 | 0 | 0 | 0 | 0 | 0 | 0 | 12.5 |
| 61 | 51 | 0 | 0 | 0 | 49 | 0 | 0 | 0 | 0 | 0 | 0 |
| 62 | 0 | 25 | 18.75 | 0 | 50 | 6.25 | 0 | 0 | 0 | 0 | 0 |
| 63 | 27.91 | 12.5 | 10.63 | 10.63 | 27.91 | 2.08 | 0 | 2.08 | 2.08 | 2.08 | 2.08 |
| 64 | 50 | 0 | 0 | 37.5 | 0 | 6.25 | 0 | 0 | 0 | 6.25 | 0 |
| 65 | 51 | 0 | 49 | 0 | 0 | 0 | 0 | 0 | 0 | 0 | 0 |
| 66 | 0 | 0 | 25 | 25 | 50 | 0 | 0 | 0 | 0 | 0 | 0 |
| 67 | 0 | 0 | 36.5 | 0 | 51 | 6.25 | 0 | 6.25 | 0 | 0 | 0 |
| 68 | 51 | 0 | 0 | 0 | 36.5 | 0 | 0 | 0 | 0 | 12.5 | 0 |
| 69 | 0 | 0 | 0 | 37.5 | 50 | 0 | 0 | 0 | 12.5 | 0 | 0 |
| 70 | 24.5 | 0 | 24.5 | 0 | 51 | 0 | 0 | 0 | 0 | 0 | 0 |
| 71 | 11.5 | 0 | 0 | 0 | 51 | 12.5 | 25 | 0 | 0 | 0 | 0 |
| 72 | 50 | 0 | 0 | 37.5 | 0 | 0 | 0 | 12.5 | 0 | 0 | 0 |

The following fourteen characteristics were tracked for each composition tested: (1) cracking in finished candle after a first pour; (2) cracking in finished candle after a second pour; (3) edge cracking; (4) cracking in burn pool; (5) color of wax; (6) surface characteristics of finished candles, i.e. pattern and bubbling of wax; (7) surface characteristics of burn pool; (8) adherence/shrinkage of wax cracking in wax pool; (9) cost ($/lb); (10) burn rate (g/hr); (11) melt point of wax (° C.) wax pool diameters; (12) wax pool temperatures (° C.); (13) flame heights (in); (14) burn pool diameters (in). The grading scale for the subjective characteristics are provided in Table 10C.

TABLE 10C

Characteristic Scales

| Scale | Description |
| --- | --- |
| | Adherence/Shrinkage Characteristic (8) |
| 0 | No visible adherence to container or easy removal of wax from candle mold. |
| 1 | Some adherence to container or added work/force necessary to remove wax from mold |
| 2 | Almost complete adherence to container or excessive work/force necessary to remove wax from mold |
| 3 | Complete adherence to container or destruction of shape necessary to remove wax from mold |
| | Color Characteristic (5) |
| 0 | White |
| 1 | Pale Yellow (color of raw soybean oils) |
| 2 | Slight color change |
| 3 | Moderate color change |
| 4 | Extreme color change |
| | Cracking Intensity Characteristic (1)–(4) |
| 0 | No cracks visible |
| 1 | Surface cracks under 1 inch |
| 2 | Surface cracks over 1 inch |
| 3 | Deep cracks under 1 inch |

TABLE 10C-continued

Characteristic Scales

| Scale | Description |
| --- | --- |
| 4 | Deep cracks over 1 inch, radiating cracks, or cracks that make the surface uneven |
| | Surface Characteristic (6) and (7) |
| 0 | Smooth with no pattern |
| 1 | Smooth with pattern not covering entire surface |
| 2 | Smooth with pattern covering entire surface |
| 3 | Small bumps with or without pattern |
| 4 | Large bumps with or without pattern |

Table 10D contains a listing of the results observed for each blend composition. It was observed that over 12.5 percent by weight hydrogenated soybean oil appears to cause undesired crystal formation, giving the composition a "bubbled" appearance. Further, stearic acid and palmitic acid affect the composition in similar ways. Both stearic and palmitic acids reduce cracking when included up to 25 percent by weight of the composition. At levels of stearic and palmitic acid above 25 percent by weight the candles did not have the desired burn properties, such as the wax pool diameter decreases significantly. Vybar 103 did not aid in the reduction of cracking.

As such, blend compositions having the following ranges are preferred: 36.5 to 100 percent by weight free fatty acid/triglyceride component, 0 to 12.5 percent by weight of petroleum products, 0 to 12.5 percent by weight of beeswax, and 0 to 51 percent by weight of Dimodan crystal modifier. The free fatty acid/triglyceride component is preferably composed of (all percent by weights indicate the percent of each component in the finished candle not the percentage make-up of the free fatty acid/triglyceride component alone) 0 to 51 percent by weight of partially hydrogenated soybean oil (PHSO125), 0 to 12.5 percent by weight fully hydrogenated soybean oil (HSO), 0 to 25 percent by weight stearic acid (SA), 0 to 25 percent by weight canola oil (CO), and 0 to 25 percent by weight palmitic acid (PA).

TABLE 10D

Data Collected

| Run | (1) | (2) | (3) | (4) | (5) | (6) | (7) | (8) | (9) | (10) | (11) | (12) | (13) | (14) |
| --- | --- | --- | --- | --- | --- | --- | --- | --- | --- | --- | --- | --- | --- | --- |
| 1 | 0 | 0 | 0 | 0 | 3 | 0 | 2 | 0 | 1.06 | 3.5 | 64.79 | 67.2 | .44 | 1.44 |
| 2 | 0 | 0 | 4 | .8 | 1 | 0 | 1 | 0 | 0.8 | 3.54 | 51.35 | 57.68 | .53 | 2.23 |
| 3 | 0 | 0 | 0 | 1 | 2 | 0 | 3 | 0 | 1.24 | 4.65 | 64.32 | 86.4 | .63 | 1.5 |
| 4 | 0 | 0 | 2 | 3 | 1 | 0 | 2.6 | 0 | 0.8 | 3.77 | 53.91 | 63.52 | .6 | 1.88 |
| 5 | 0 | 0 | 0 | 0 | 4 | 0 | 1.5 | 4 | 1.1 | 2.99 | 63.47 | 73.35 | .33 | 1.5 |
| 6 | 0 | 0 | 0 | 4 | 1 | 0 | 3.5 | 4 | 0.77 | 3.8 | 58.69 | 75.3 | .58 | 1.63 |
| 7 | 0 | 0 | 0 | 0 | 2 | 0 | 2 | 4 | 1.09 | 3.31 | 62.92 | 69.225 | .31 | 1.69 |
| 8 | 0 | 0 | 4 | 2 | 2 | 0 | 3.5 | 0 | 1.23 | 4.2 | 70.13 | 74.05 | .44 | 1.38 |
| 9 | 4 | 3 | 0 | .2 | 1 | 0 | 0.6 | 4 | 0.64 | 3.58 | 54.14 | 57.62 | .48 | 2.28 |
| 10 | 0 | 0 | 0 | .5 | 1 | 0 | 2 | 4 | 1.22 | 3.26 | 61.11 | 74.9 | .5 | 1.44 |

TABLE 10D-continued

Data Collected

| Run | (1) | (2) | (3) | (4) | (5) | (6) | (7) | (8) | (9) | (10) | (11) | (12) | (13) | (14) |
|---|---|---|---|---|---|---|---|---|---|---|---|---|---|---|
| 11 | 0 | 0 | 0 | 0 | 2 | 0 | 3 | 4 | 1.42 | 3.75 | 62.37 | 78.1 | .54 | 1.46 |
| 12 | 0 | 0 | 4 | 0 | 2 | 0 | 2 | 4 | 1.33 | 2.85 | 69.26 | 81.35 | .31 | 1.25 |
| 13 | 0 | 0 | 0 | .25 | 1 | 0 | 4 | 4 | 0.6 | 3.4 | 61.25 | 72.75 | .5 | 1.75 |
| 14 | 0 | 0 | 0 | 0 | 1 | 0 | 2 | 4 | 0.65 | 3.31 | 61.58 | 66.35 | .47 | 1.66 |
| 15 | 0 | 2 | 0 | 3 | 2 | 0 | 1.5 | 0 | 1.5 | 4.2 | 66.06 | 82.5 | .69 | 1.38 |
| 16 | 0 | 4 | 4 | 0 | 1 | 0 | 1.25 | 4 | 0.8 | 3.2 | 60.34 | 72.25 | .56 | 1.75 |
| 17 | 0 | 0 | 4 | 0 | 2 | 0 | 2.5 | 4 | 1.06 | 4.45 | 66.92 | 75.25 | .5 | 1.5 |
| 18 | 0 | 0 | 4 | 0 | 1 | 0 | 3 | 0 | 1.04 | 3.8 | 61.71 | 75.23 | .5 | 1.38 |
| 19 | 0 | 0 | 0 | 0 | 1 | 0 | 2 | 4 | 1.03 | 4.53 | 70.04 | 77.9 | .63 | 1.56 |
| 20 | 0 | 0 | 0 | 0 | 2 | 0 | 2.7 | 4 | 1.16 | 3.52 | 64.77 | 73.53 | .54 | 1.46 |
| 21 | 0 | 0 | 0 | 0 | 2 | 0 | 3 | 0 | 1.26 | 3.05 | 65.33 | 74.6 | .63 | 1.38 |
| 22 | 4 | 2 | 4 | 1 | 2 | 0 | 1.25 | 0 | 0.8 | 4.45 | 54.64 | 72.63 | .69 | 2.06 |
| 23 | 0 | 0 | 4 | 4 | 2 | 0 | 2 | 0 | 1.04 | 3.75 | 58.39 | 72.47 | .63 | 1.5 |
| 24 | 0 | 0 | 0 | 2 | 1 | 0 | 3 | 0 | 0.49 | 4.37 | 72.43 | 71.55 | .88 | 1.63 |
| 25 | 0 | 4 | 0 | 2.2 | 1 | 0 | 0 | 0 | 0.92 | 3.97 | 55.02 | 65 | .625 | 2.38 |
| 26 | 0 | 0 | 3 | 0 | 1 | 0 | 1.7 | 0 | 0.83 | 3.61 | 55.85 | 77.6 | .5 | 1.58 |
| 27 | 0 | 0 | 0 | 2.5 | 1 | 0 | 1.75 | 4 | 0.74 | 2.69 | 51.32 | 64.275 | .41 | 1.72 |
| 28 | 0 | 2 | 0 | .75 | 2 | 0 | 1.75 | 4 | 0.63 | 2.22 | 59.32 | 69.55 | .38 | 1.53 |
| 29 | 4 | 3 | 1 | 1.4 | 1 | 0 | .8 | 3 | 0.81 | 2.87 | 55.51 | 70.44 | .4 | 1.73 |
| 30 | 0 | 0 | 0 | 0 | 3 | 0 | 2 | 4 | 1.19 | 3.06 | 64.28 | 80.67 | .58 | 1.5 |
| 31 | 3 | 0 | 1 | 0.33 | 1 | 4 | 4 | 3 | 0.6 | 3.84 | 63.5 | 74.63 | 0.71 | 1.83 |
| 32 | 3 | 0 | 2 | 0 | 2 | 0 | 1.7 | 3 | 0.86 | 4.67 | 59.28 | 82.16 | 0.79 | 1.583 |
| 33 | 0 | 0 | 4 | 1 | 0 | 0 | 1.5 | 0 | 0.8 | 3.97 | 52.07 | 67.78 | 0.525 | 2 |
| 34 | 0 | 0 | 0 | 0 | 2 | 0 | 3 | 4 | 1.35 | 3.79 | 65.27 | 81.65 | 0.63 | 1.438 |
| 35 | 0 | 0 | 0 | 0 | 1 | 0 | 0.5 | 1 | 1.1 | 4.37 | 73.04 | 83.1 | 0.75 | 1.625 |
| 36 | 0 | 0 | 2 | 0 | 2 | 0 | 3 | 4 | 1.06 | 3.59 | 58.34 | 66.47 | 0.46 | 1.7083 |
| 37 | 3 | 0 | 4 | 0 | 3 | 0 | 1.5 | 3 | 1.08 | 3.43 | 60.91 | 86.45 | 0.63 | 1.5625 |
| 38 | 0 | 0 | 0 | 4 | 1 | 1 | 2.5 | 4 | 1.03 | 4.21 | 73.92 | 78.65 | 0.63 | 1.375 |
| 39 | 0 | 0 | 1 | 0 | 2 | 0 | 3 | 4 | 1.24 | 3.52 | 65.7 | 93.45 | 0.5 | 1.3125 |
| 40 | 0 | 0 | 4 | 0 | 2 | 0 | 3 | 4 | 1.05 | 4.47 | 65.99 | 86.05 | 0.63 | 1.625 |
| 41 | 0 | 0 | 4 | 0 | 2 | 0 | 2 | 4 | 1.17 | 3.63 | 64.81 | 73.45 | 0.63 | 1.5 |
| 42 | 0 | 0 | 4 | 0 | 2 | 0 | 3 | 0 | 1.06 | 3.83 | 66.24 | 74.75 | 0.69 | 1.5625 |
| 43 | 0 | 0 | 1 | 0 | 3 | 2 | 3 | 4 | 0.88 | 3.36 | 59.09 | 67.3 | 0.42 | 1.54 |
| 44 | 3 | 0 | 4 | 0 | 1 | 0 | 3.5 | 4 | 0.84 | 4.16 | 62.06 | 73.2 | 0.63 | 1.6875 |
| 45 | 0 | 0 | 0 | 0 | 1 | 0 | 2 | 0 | 0.86 | 3.47 | 57.57 | 70.425 | 0.5 | 1.7 |
| 46 | 0 | 0 | 1 | 0.66 | 1 | 0 | 1.33 | 4 | 1.03 | 2.64 | 69.1 | 90.57 | 0.29 | 1.08 |
| 47 | 0 | 0 | 0 | 0 | 1 | 4 | 4 | 4 | 0.6 | 4.04 | 64.22 | 72.17 | 0.63 | 1.96 |
| 48 | 0 | 0 | 4 | 1.5 | 1 | 0 | 2 | 4 | 0.9 | 4.54 | 72.99 | 80.7 | 0.56 | 1.625 |
| 49 | 0 | 0 | 0 | 0 | 1 | 0 | 2 | 4 | 1.25 | 4 | 67.68 | 86 | 0.5 | 1.4375 |
| 50 | 0 | 0 | 4 | 0 | 1 | 0 | 2.5 | 0 | 1.24 | 3.52 | 66.29 | 74.75 | 0.5 | 1.4375 |
| 51 | 4 | 4 | 0 | 0 | 1 | 3 | 4 | 4 | 0.8 | 4.13 | 61.32 | 70.67 | 0.58 | 1.75 |
| 52 | 0 | 0 | 0 | 0 | 2 | 0 | 0.66 | 4 | 1.08 | 2.14 | 66.68 | 72.7 | 0.33 | 1.25 |
| 53 | 0 | 0 | 0 | 0 | 1 | 0 | 1.33 | 4 | 0.97 | 3.91 | 61.53 | 77.4 | 0.5 | 1.54 |
| 54 | 0 | 0 | 3 | 0 | 2 | 0 | 2 | 4 | 1.05 | 3.99 | 65.49 | 87.85 | 0.63 | 1.44 |
| 55 | 0 | 0 | 4 | 0 | 1 | 0 | 0.5 | 4 | 0.9 | 4.57 | 73.02 | 85.65 | 0.81 | 1.75 |
| 56 | 0 | 0 | 0 | 0 | 3 | 0 | 2.5 | 4 | 1.28 | 3.26 | 62.3 | 82.95 | 0.63 | 1.375 |
| 57 | 0 | 0 | 3 | 0 | 2 | 0 | 2.5 | 4 | 1.07 | 3.05 | 64.04 | 76 | 0.67 | 1.375 |
| 58 | 0 | 4 | 4 | 3.33 | 1 | 0 | 3 | 0 | 0.88 | 3.06 | 72.33 | 84.63 | 0.54 | 1.54 |
| 59 | 0 | 0 | 0 | 4 | 1 | 3 | 1 | 0 | 0.65 | 3.13 | 56.13 | 59.15 | 0.46 | 1.875 |
| 60 | 0 | 4 | 4 | 1.5 | 1 | 0 | 1.5 | 4 | 0.6 | 3.38 | 58.68 | 69.25 | 0.47 | 1.8 |
| 61 | 0 | 0 | 0 | 0 | 1 | 0 | 2 | 0 | 1.01 | 4.27 | 73.52 | 79.6 | 0.69 | 1.44 |
| 62 | 0 | 0 | 0 | 0 | 2 | 0 | 1.5 | 4 | 1.16 | 3.81 | 65.39 | 74.65 | 0.5 | 1.69 |
| 63 | 0 | 0 | 0 | 0 | 1 | 0 | 2 | 1 | 0.89 | 3.79 | 61.96 | 81.23 | 0.58 | 1.46 |
| 64 | 0 | 0 | 0 | 0 | 1 | 0 | 1 | 0 | 0.74 | 3.91 | 56.44 | 78.58 | 0.6 | 1.8 |
| 65 | 0 | 0 | 0 | 0 | 1 | 1 | 0.5 | 4 | 0.65 | 3.53 | 54 | 57.08 | 0.45 | 1.975 |
| 66 | 0 | 0 | 0 | 0 | 2 | 0 | 0 | 4 | 1.1 | 3.42 | 61.63 | 70.87 | 0.54 | 1.54 |
| 67 | 0 | 0 | 0 | 0 | 2 | 0 | 1 | 4 | 1.06 | 3.21 | 63.28 | 74 | 0.46 | 1.58 |
| 68 | 0 | 0 | 4 | 0 | 1 | 2 | 1 | 4 | 0.9 | 4.74 | 66.68 | 85.05 | 0.88 | 1.5 |
| 69 | 0 | 0 | 0 | 0 | 2 | 0 | 1.5 | 4 | 1.08 | 3.45 | 60.65 | 69.57 | 0.5 | 1.54 |
| 70 | 0 | 0 | 0 | 0 | 1 | 0 | 1 | 4 | 1.07 | 3.36 | 63.69 | 82.3 | 0.44 | 1.5 |
| 71 | 0 | 0 | 0 | 3.5 | 2 | 0 | 0.5 | 0 | 1.43 | 3.56 | 67.71 | 79.95 | 0.5 | 1.44 |
| 72 | 0 | 0 | 0 | 0 | 1 | 1 | 0.5 | 4 | 0.64 | 3.67 | 59.02 | 61.08 | 0.53 | 2 |

Example 11

Another series of experiments were performed to replace or reduce the use of petroleum products in a candle composition. The compositions tested were comprised of either all or a subset of the ingredients shown in Table 11A. An abbreviation is provided in Table 11A for each ingredient along with the supplier of each ingredient. Additionally, the compositions tested are constrained by the following requirements, the compositions include: 50 to 100 percent by weight of plant derived materials, 0 to 12.5 percent by weight of hydrogenated soybean oil, 50 to 100 percent by weight partially hydrogenated soybean oil, 0 to 12.5 percent by weight of petroleum products, 0 to 25 percent by weight canola oil, 0 to 25 percent by weight of stearic acid and palmitic acid individually or combined, and 0 to 25 percent by weight of a plant derived surfactant.

TABLE 11A

| Abbreviation | Ingredient Name | Supplier |
|---|---|---|
| | Ingredients | |
| PHSO125 | Shurset K 125 - Partially Hydrogenated Soybean Oil | A.C. Humko |
| HSO | Dritex S-21V - Hydrogenated Soybean Oil | A.C. Humko |
| SA | Stearic Acid, FA-1655 | PCNA |
| BW | Beeswax | Strahl Pitsch |
| CO | Dritex R-CE - Canola Oil | A.C. Humko |
| VS or SS | Dimodan P VK - Vegetable Surfactant | Danisco Culter, USA |
| HMW | R-2542 - High Melt Paraffin Wax | Moore & Munger |
| LMW | IGI-1230 - Low Melt Paraffin Wax | IGI |
| Micro | Bowax 874 - Microcrystalline Paraffin Wax | IGI |
| PA | Palmitic Acid, FA-1695 | PCNA |

The compositions tested are listed in Table 1B. The compositions have the following ranges are preferred: 50 to 100 percent by weight free fatty acid/triglyceride component, 0 to 28 percent by weight of petroleum products, 0 to 12.5 percent by weight of beeswax, and 0 to 25 percent by weight of Dimodan crystal modifier. The free fatty acid/triglyceride component is preferrably composed of (all percent by weights indicate the percent of each component in the finished candle not the percentage make-up of the free fatty acid/triglyceride component alone) 50 to 62.5 percent by weight of partially hydrogenated soybean oil (PHSO125), 0 to 12.5 percent by weight fully hydrogenated soybean oil (HSO), 0 to 25 percent by weight stearic acid (SA), 0 to 25 percent by weight canola oil (CO), and 0 to 25 percent by weight palmitic acid (PA).

TABLE 11B

Ingredient Compositions

| Run | PHSO125 | HSO | SA | PA | VS | BW | CO | LM | HM | MICRO |
|---|---|---|---|---|---|---|---|---|---|---|
| 1 | 62.50 | 12.50 | 0.00 | 12.50 | 0.00 | 0.00 | 0.00 | 0.00 | 11.00 | 1.50 |
| 2 | 50.0 | 0.00 | 11.00 | 0.00 | 11.00 | 0.00 | 25.00 | 0.00 | 0.00 | 3.00 |
| 3 | 50.0 | 0.00 | 12.50 | 0.00 | 0.00 | 0.00 | 25.00 | 6.25 | 6.25 | 0.00 |
| 4 | 62.50 | 6.25 | 0.00 | 25.00 | 0.00 | 0.00 | 0.00 | 0.00 | 6.25 | 0.00 |
| 5 | 50.00 | 12.50 | 12.50 | 0.00 | 0.00 | 0.00 | 12.50 | 0.00 | 9.50 | 3.00 |
| 6 | 50.00 | 0.00 | 0.00 | 12.50 | 25.00 | 0.00 | 0.00 | 0.00 | 9.50 | 3.00 |
| 8 | 50.00 | 12.50 | 0.00 | 0.00 | 25.00 | 12.50 | 0.00 | 0.00 | 0.00 | 0.00 |
| 9 | 50.00 | 0.00 | 0.00 | 0.00 | 25.00 | 12.50 | 12.50 | 0.00 | 0.00 | 0.00 |
| 10 | 62.50 | 0.00 | 0.00 | 0.00 | 0.00 | 0.00 | 25.00 | 9.50 | 0.00 | 3.00 |
| 11 | 56.25 | 12.50 | 25.00 | 0.00 | 0.00 | 0.00 | 0.00 | 62.5 | 0.00 | 0.00 |
| 12 | 50.00 | 0.00 | 25.00 | 0.00 | 0.00 | 0.00 | 25.00 | 0.00 | 0.00 | 0.00 |
| 13 | 50.00 | 0.00 | 0.00 | 25.00 | 0.00 | 0.00 | 12.50 | 9.50 | 0.00 | 3.00 |
| 14 | 50.00 | 12.50 | 0.00 | 0.00 | 0.00 | 0.00 | 25.00 | 12.50 | 0.00 | 0.00 |
| 15 | 50.00 | 12.50 | 0.00 | 25.00 | 9.50 | 0.00 | 0.00 | 0.00 | 0.00 | 3.00 |
| 16 | 62.50 | 12.50 | 0.00 | 12.50 | 0.00 | 12.50 | 0.00 | 0.00 | 0.00 | 0.00 |
| 18 | 50.00 | 0.00 | 0.00 | 25.00 | 0.00 | 0.00 | 25.00 | 0.00 | 0.00 | 0.00 |
| 19 | 50.00 | 0.00 | 25.00 | 0.00 | 0.00 | 0.00 | 12.50 | 9.50 | 0.00 | 3.00 |
| 20 | 50.00 | 0.00 | 25.00 | 0.00 | 12.50 | 0.00 | 0.00 | 12.50 | 0.00 | 0.00 |
| 21 | 56.25 | 12.50 | 0.00 | 0.00 | 25.00 | 6.25 | 0.00 | 0.00 | 0.00 | 0.00 |
| 23 | 62.50 | 0.00 | 25.00 | 0.00 | 0.00 | 0.00 | 0.00 | 0.00 | 12.50 | 0.00 |
| 24 | 50.00 | 0.00 | 0.00 | 0.00 | 12.50 | 0.00 | 25.00 | 0.00 | 11.00 | 1.50 |
| 25 | 62.50 | 0.00 | 0.00 | 25.00 | 0.00 | 0.00 | 0.00 | 12.50 | 0.00 | 0.00 |
| 27 | 50.00 | 12.50 | 12.50 | 12.50 | 0.00 | 0.00 | 0.00 | 9.50 | 0.00 | 3.00 |
| 28 | 56.25 | 12.50 | 0.00 | 0.00 | 25.00 | 0.00 | 0.00 | 0.00 | 6.25 | 0.00 |
| 29 | 62.50 | 12.50 | 0.00 | 0.00 | 0.00 | 0.00 | 25.00 | 0.00 | 0.00 | 0.00 |
| 30 | 50.00 | 0.00 | 12.50 | 0.00 | 25.00 | 0.00 | 0.00 | 0.00 | 12.50 | 0.00 |
| 33 | 50.00 | 12.50 | 0.00 | 0.00 | 0.00 | 0.00 | 25.00 | 0.00 | 12.50 | 0.00 |
| 34 | 50.00 | 0.00 | 12.50 | 0.00 | 25.00 | 12.50 | 0.00 | 0.00 | 0.00 | 0.00 |
| 35 | 62.50 | 0.00 | 12.50 | 0.00 | 12.50 | 0.00 | 0.00 | 0.00 | 9.50 | 3.00 |
| 36 | 56.25 | 0.00 | 0.00 | 25.00 | 6.25 | 0.00 | 0.00 | 0.00 | 12.50 | 0.00 |
| 37 | 62.50 | 12.50 | 6.25 | 0.00 | 0.00 | 0.00 | 6.25 | 12.50 | 0.00 | 0.00 |
| 38 | 62.50 | 12.50 | 22.00 | 0.00 | 0.00 | 0.00 | 0.00 | 0.00 | 0.00 | 3.00 |
| 39 | 50.00 | 12.50 | 25.00 | 0.00 | 0.00 | 0.00 | 0.00 | 12.50 | 0.00 | 0.00 |
| 40 | 50.00 | 6.25 | 25.00 | 0.00 | 6.25 | 9.50 | 0.00 | 0.00 | 0.00 | 3.00 |
| 41 | 62.50 | 0.00 | 0.00 | 0.00 | 0.00 | 0.00 | 25.00 | 0.00 | 12.50 | 0.00 |
| 42 | 62.50 | 0.00 | 0.00 | 0.00 | 25.00 | 0.00 | 0.00 | 12.50 | 0.00 | 0.00 |
| 43 | 62.50 | 0.00 | 25.00 | 0.00 | 6.25 | 0.00 | 6.25 | 0.00 | 0.00 | 0.00 |

TABLE 11B-continued

Ingredient Compositions

| Run | PHSO125 | HSO | SA | PA | VS | BW | CO | LM | HM | MICRO |
|---|---|---|---|---|---|---|---|---|---|---|
| 44 | 50.00 | 12.50 | 0.00 | 0.00 | 25.00 | 0.00 | 0.00 | 9.50 | 0.00 | 3.00 |
| 45 | 50.00 | 0.00 | 12.50 | 12.50 | 12.50 | 0.00 | 0.00 | 12.50 | 0.00 | 0.00 |
| 46 | 50.00 | 12.50 | 12.50 | 12.50 | 0.00 | 0.00 | 12.50 | 0.00 | 0.00 | 0.00 |
| 47 | 50.00 | 12.50 | 0.00 | 0.00 | 25.00 | 0.00 | 0.00 | 6.25 | 6.25 | 0.00 |
| 48 | 50.00 | 0.00 | 25.00 | 0.00 | 25.00 | 0.00 | 0.00 | 0.00 | 0.00 | 0.00 |
| 49 | 62.50 | 0.00 | 0.00 | 12.50 | 12.50 | 0.00 | 0.00 | 9.50 | 0.00 | 3.00 |
| 50 | 62.50 | 12.50 | 0.00 | 25.00 | 0.00 | 0.00 | 0.00 | 0.00 | 0.00 | 0.00 |
| 51 | 50.00 | 0.00 | 0.00 | 0.00 | 25.00 | 0.00 | 25.00 | 0.00 | 0.00 | 0.00 |
| 52 | 56.25 | 6.25 | 0.00 | 0.00 | 25.00 | 0.00 | 0.00 | 0.00 | 9.50 | 3.00 |
| 54 | 62.50 | 0.00 | 25.00 | 0.00 | 0.00 | 12.50 | 0.00 | 0.00 | 0.00 | 0.00 |
| 55 | 62.50 | 12.50 | 0.00 | 0.00 | 25.00 | 0.00 | 0.00 | 0.00 | 0.00 | 0.00 |
| 56 | 62.50 | 0.00 | 0.00 | 0.00 | 0.00 | 12.50 | 25.00 | 0.00 | 0.00 | 0.00 |
| 57 | 62.50 | 0.00 | 12.50 | 12.50 | 0.00 | 0.00 | 9.50 | 0.00 | 0.00 | 3.00 |
| 59 | 50.00 | 0.00 | 0.00 | 25.00 | 12.50 | 12.50 | 0.00 | 0.00 | 0.00 | 0.00 |

The following thirteen characteristics were tracked for each composition blend tested: (1) cracking in finished candle after a first pour; (2) cracking in finished candle after a second pour; (3) edge cracking; (4) color of wax; (5) surface characteristics of finished candles, i.e. pattern and bubbling of wax; (6) adherence/shrinkage of wax cracking in wax pool; (7) cracking in burn pool; (8) surface characteristics of burn pool; (9) wax pool temperatures (° C.); (10) flame heights (in); (11) wax pool diameters (in); (12) burn rate (g/hr); and (13) cost ($/lb). The grading scales for the subjective characteristics are provided in Table 11C.

TABLE 11C

Characteristic Scales

| Scale | Description |
|---|---|
| | Adherence/Shrinkage Characteristic (6) |
| 0 | No visible adherence to container or easy removal of wax from candle mold. |
| 1 | Some adherence to container or added work/force necessary to remove wax from mold |
| 2 | Almost complete adherence to container or excessive work/force necessary to remove wax from mold |
| 3 | Complete adherence to container or destruction of shape necessary to remove wax from mold |
| | Color Characteristic (4) |
| 0 | White |
| 1 | Pale Yellow (color of raw soybean oils) |
| 2 | Slight color change |
| 3 | Moderate color change |
| 4 | Extreme color change |
| | Cracking Intensity Characteristic (1)–(3), (7) |
| 0 | No cracks visible |
| 1 | Surface cracks under 1 inch |
| 2 | Surface cracks over 1 inch |
| 3 | Deep cracks under 1 inch |
| 4 | Deep cracks over 1 inch, radiating cracks, or cracks that make the surface uneven |
| | Surface Characteristic (5) and (8) |
| 0 | Smooth with no pattern |
| 1 | Smooth with pattern not covering entire surface |
| 2 | Smooth with pattern covering entire surface |

TABLE 11C-continued

Characteristic Scales

| Scale | Description |
|---|---|
| 3 | Small bumps with or without pattern |
| 4 | Large bumps with or without pattern |

Table 11D contains a listing of the results observed for each composition. It was observed that the best performing and looking candles did not contain any hydrogenated soybean (HSO) or beeswax (BW) and a maximum of 12.5 percent by weight of canola oil (CO). Additionally, the best performing and looking candles contained the crystal modifier Dimodan P VK. It was further found that a high quality candle can be manufactured without the addition of any petroleum products.

As such, in one variation of this example, compositions having the following ranges are preferred: 50 to 100 percent by weight free fatty acid/triglyceride component, 0 to 28 percent by weight of petroleum products, and 0 to 25 percent by weight of Dimodan crystal modifier. The free fatty acid/triglyceride component is preferably composed of (all percent by weights indicate the percent of each component in the finished candle not the percentage make-up of the free fatty acid/triglyceride component alone) 50 to 62.5 percent by weight of partially hydrogenated soybean oil (PHSO125), 0 to 25 percent by weight stearic acid (SA), 0 to 12.5 percent by weight canola oil (CO), and 0 to 25 percent by weight palmitic acid (PA).

In another variation of this example, compositions having the following ranges are preferred: 50 to 100 percent by weight free fatty acid/triglyceride component and 0 to 25 percent by weight of Dimodan crystal modifier. Further preferred are compositions containing 50 to 99 percent by weight of free fatty acid/triglyceride mixture and 1 to 25 percent by weight Dimodan crystal modifier. The free fatty acid/triglyceride component is preferably composed of (all percent by weights indicate the percent of each component in the finished candle not the percentage make-up of the free fatty acid/triglyceride component alone) 50 to 62.5 percent by weight of partially hydrogenated soybean oil (PHSO125), 0 to 25 percent by weight stearic acid (SA), 0 to 12.5 percent by weight canola oil (CO), and 0 to 25 percent by weight palmitic acid (PA).

TABLE 11D

| | | | | | | Data Collected | | | | | | | |
|---|---|---|---|---|---|---|---|---|---|---|---|---|---|
| Run | (1) | (2) | (3) | (4) | (5) | (6) | (7) | (8) | (9) | (10) | (11) | (12) | (13) |
| 1 | 0 | 0 | 0 | 1 | 0 | 4 | 0 | 1 | 73.9 | 0.75 | 1.625 | — | $0.81 |
| 2 | 4 | 4 | 4 | 1 | 0 | 0 | — | — | — | — | — | — | $0.79 |
| 3 | 4 | 4 | 0 | 1 | 0 | 0 | — | — | — | — | — | — | $0.79 |
| 4 | 0 | 0 | 0 | 1 | 0 | 0 | 0 | 0 | 0 | 0 | 0 | — | $0.97 |
| 5 | 0 | 4 | 0 | 1 | 3 | 4 | — | — | — | — | — | — | $0.59 |
| 6 | 2 | 4 | 4 | 1 | 0 | 4 | — | — | — | — | — | — | $0.86 |
| 7 | 2 | 4 | 1 | 0 | 4 | 0 | — | — | — | — | — | — | $0.76 |
| 8 | 0 | 0 | 0 | 1 | 0 | 0 | — | — | — | — | — | — | $0.77 |
| 9 | 0 | 0 | 0 | 1 | 2 | 4 | 0 | 0 | 66.0 | 0.58 | 2.5 | 3.89 | $0.59 |
| 10 | 0 | 0 | 0 | 1 | 0 | 4 | — | — | — | — | — | — | $0.94 |
| 11 | 0 | 0 | 4 | 1 | 3 | 0 | — | — | — | — | — | — | $0.59 |
| 12 | 0 | 4 | 0 | 1 | 4 | 4 | — | — | — | — | — | — | $0.60 |
| 13 | 3 | 4 | 4 | 1 | 0 | 4 | — | — | — | — | — | — | $0.76 |
| 14 | 0 | 0 | 4 | 1 | 0 | 0 | — | — | — | — | — | — | $1.02 |
| 15 | 0 | 0 | 0 | 1 | 0 | 0 | — | — | — | — | — | — | $0.58 |
| 16 | 4 | 4 | 0 | 1 | 1 | 0 | — | — | — | — | — | — | $0.83 |
| 18 | 4 | 4 | 4 | 1 | 0 | 0 | — | — | — | — | — | — | $0.75 |
| 19 | 0 | 1 | 4 | 2 | 0 | 0 | — | — | — | — | — | — | $0.82 |
| 20 | 3 | 1 | 0 | 0 | 0 | 4 | 0 | 0.66 | 65.4 | 0.708 | 2.04 | 3.81 | $0.69 |
| 22 | 0 | 0 | 0 | 0 | 0 | 4 | 0 | 1.6 | 68.0 | 0.625 | 1.625 | 3.68 | $0.70 |
| 23 | 0 | 2 | 4 | 1 | 0 | 4 | — | — | — | — | — | — | $0.66 |
| 24 | 1 | 1 | 4 | 1 | 0 | 1 | — | — | — | — | — | — | $0.62 |
| 25 | 0 | 0 | 4 | 1 | 0 | 4 | 0 | 0 | 64.3 | 0.75 | 2.375 | — | $0.76 |
| 26 | 4 | 4 | 0 | 2 | 0 | 0 | — | — | — | — | — | — | $0.85 |
| 27 | 0 | 0 | 0 | 1 | 0 | 4 | 0 | 1.25 | 73.2 | 0.667 | 1.625 | — | $0.67 |
| 28 | 0 | 0 | 4 | 1 | 0 | 4 | 0 | 0.25 | 73.8 | 0.75 | 1.56 | 3.77 | $0.80 |
| 29 | 0 | 0 | 4 | 1 | 0 | 0 | 0 | 1.25 | 54.6 | 0.375 | 2.375 | 4.4 | $0.56 |
| 30 | 0 | 3 | 0 | 1 | 0 | 4 | — | — | — | — | — | — | $0.86 |
| 31 | 4 | 0 | 4 | 1 | 0 | 0 | — | — | — | — | — | — | $0.60 |
| 32 | 4 | 0 | 4 | 1 | 0 | 0 | 0 | 0.8 | 71.9 | 0.667 | 1.5 | 3.53 | $0.69 |
| 34 | 0 | 0 | 0 | 1 | 0 | 4 | — | — | — | — | — | — | $0.78 |
| 36 | 0 | 4 | 0 | 1 | 4 | 4 | — | — | — | — | — | — | $0.59 |
| 37 | 0 | 0 | 2 | 1 | 0 | 1 | 0 | 1.5 | 75.7 | 0.875 | 0 | — | $0.77 |
| 38 | 0 | 0 | 4 | 1 | 0 | 0 | — | — | — | — | — | — | $0.89 |
| 39 | 0 | 0 | 4 | 1 | 0 | 0 | 0 | 1.0 | 75.8 | 0.625 | 2.0 | 4.5 | $0.77 |
| 40 | 0 | 0 | 4 | 1 | 0 | 0 | 0 | 2 | 68.8 | 0.667 | 1.54 | — | $0.80 |
| 43 | 0 | 2 | 4 | 1 | 0 | 0 | — | — | — | — | — | — | $0.87 |
| 44 | 0 | 0 | 0 | 1 | 0 | 0 | 1 | 0.5 | 71.6 | 0.563 | 1.56 | — | $0.80 |
| 45 | 2 | 4 | 4 | 1 | 0 | 0 | — | — | — | — | — | — | $0.76 |
| 46 | 0 | 0 | 4 | 1 | 0 | 0 | — | — | — | — | — | — | $0.78 |
| 47 | 0 | 4 | 4 | 1 | 0 | 0 | — | — | — | — | — | — | $0.68 |
| 48 | 0 | 0 | 0 | 1 | 0 | 4 | — | — | — | — | — | — | $0.79 |
| 49 | 0 | 0 | 0 | 1 | 4 | 4 | — | — | — | — | — | — | $0.59 |
| 50 | 0 | 0 | 4 | 1 | 0 | 4 | 0 | 1.5 | 62.0 | 0.75 | 2.125 | 4.03 | $0.65 |
| 51 | 0 | 4 | 0 | 1 | 0 | 0 | — | — | — | — | — | — | $0.76 |
| 52 | 3 | 1 | 0 | 1 | 0 | 4 | 0 | 0.66 | 66.6 | 0.667 | 2.17 | 3.71 | $0.69 |
| 54 | 0 | 2 | 4 | 1 | 0 | 0 | — | — | — | — | — | — | $0.58 |
| 55 | 0 | 1 | 4 | 1 | 0 | 0 | — | — | — | — | — | — | $0.83 |
| 57 | 0 | 0 | 4 | 1 | 0 | 4 | — | — | — | — | — | — | $0.68 |
| 58 | 0 | 0 | 4 | 1 | 0 | 4 | 0 | 1.5 | 69.6 | 0.625 | 1.56 | — | $1.03 |
| 59 | 0 | 0 | 4 | 1 | 0 | 0 | — | — | — | — | — | — | $1.12 |
| 60 | 0 | 0 | 0 | 0 | 0 | 4 | — | — | — | — | — | — | $0.70 |

Example 12

Another series of experiments were performed to replace or reduce the use of petroleum products in a candle composition. The compositions tested were comprised of either all or a subset of the ingredients shown in Table 12A. An abbreviation is provided in Table 12A for each ingredient along with the supplier of each ingredient.

component in the finished candle not the percentage make-up of the free fatty acid/triglyceride component alone) 50 to 62.5 percent by weight of partially hydrogenated soybean oil (PHSO125), 0 to 26 percent by weight stearic acid (SA), 0 to 13 percent by weight canola oil (CO), 0 to 26 percent by weight palmitic acid (PA), and 0 to 12.5 percent by weight Alene chubbie. The compositions listed in Table 12B were tested.

TABLE 12A

Ingredients

| Abbreviation | Ingredient Name | Supplier |
| --- | --- | --- |
| PHSO125 | Shurset K 125 - Partially Hydrogenated Soybean Oil | A.C. Humko |
| SA | Stearic Acid, FA-1655 | PCNA |
| CO | Dritex R-CE - Canola Oil | A.C. Humko |
| VS | Dimodan P VK - Vegetable Surfactant | Danisco Culter, USA |
| HM | R-2542 - High Melt Paraffin Wax | Moore & Munger |
| LM | IGI-1230 - Low Melt Paraffin Wax | IGI |
| Micro | Bowax 874 - Microcrystalline Paraffin Wax | IGI |
| PA | Palmitic Acid, FA-1695 | PCNA |
| CH | Alene chubbie (blend of paraffin wax) | Alene Candles located at 51 Scarborough Lane, Milford, NH 03055 |

Compositions having the following ranges were tested: 50 to 100 percent by weight free fatty acid/triglyceride component, 0 to 28 percent by weight of petroleum products, and 0 to 12.5 percent by weight of Dimodan crystal modifier. The free fatty acid/triglyceride component is preferably composed of (all percent by weights indicate the percent of each

TABLE 12B

Ingredient Compositions

| ID | PHSO125 | SA | PA | VS | CO | HM | LM | MICRO | CH |
| --- | --- | --- | --- | --- | --- | --- | --- | --- | --- |
| Buchanan 04 | 56.25 | 0 | 25 | 6.25 | 0 | 0 | 9.5 | 3 | 0 |
| Buchanan 06 | 56.25 | 0 | 25 | 6.25 | 0 | 6.25 | 6.25 | 0 | 0 |
| Buchanan 08 | 56.25 | 0 | 25 | 6.25 | 0 | 9.5 | 0 | 3 | 0 |
| Buchanan 09 | 56.25 | 0 | 25 | 6.25 | 0 | 0 | 0 | 0 | 12.5 |
| Buchanan 10 | 56.25 | 0 | 25 | 6.25 | 0 | 0 | 12.5 | 0 | 0 |
| Buchanan 15 | 56.25 | 0 | 25 | 6.25 | 0 | 12.5 | 0 | 0 | 0 |
| Buchanan 32 | 56.25 | 0 | 25 | 6.25 | 0 | 4.13 | 4.13 | 3 | 0 |
| FDR 01 | 55.75 | 25 | 0 | 6.25 | 12.5 | 0 | 0 | 0 | 0 |
| FDR 04 | 62.5 | 25 | 0 | 6.25 | 6.25 | 0 | 0 | 0 | 0 |
| FDR 05 | 55.25 | 26 | 0 | 12.5 | 6.25 | 0 | 0 | 0 | 0 |
| FDR 07 | 50 | 25 | 0 | 12.5 | 12.5 | 0 | 0 | 0 | 0 |
| FDR 10 | 56.25 | 25 | 0 | 9.38 | 9.38 | 0 | 0 | 0 | 0 |
| FDR 15 | 58.36 | 25.78 | 0 | 7.93 | 7.93 | 0 | 0 | 0 | 0 |
| Pierce 01 | 50 | 25 | 0 | 0 | 12.5 | 12.5 | 0 | 0 | 0 |
| Pierce 04 | 50 | 25 | 0 | 0 | 12.5 | 6.25 | 6.25 | 0 | 0 |
| Pierce 10 | 51 | 25 | 0 | 0 | 12.5 | 0 | 11.5 | 0 | 0 |
| Pierce 18 | 50 | 26 | 0 | 0 | 12.5 | 8.5 | 0 | 3 | 0 |
| Pierce 23 | 50 | 25.5 | 0 | 0 | 13 | 0 | 8.5 | 3 | 0 |
| Pierce 25 | 50 | 25 | 0 | 0 | 12.75 | 0 | 0 | 0 | 12.25 |
| Pierce 31 | 50 | 26 | 0 | 0 | 12.5 | 4.25 | 4.25 | 3 | 0 |
| Tyler 01 | 50 | 0 | 25 | 0 | 12.5 | 12.5 | 0 | 0 | 0 |
| Tyler 04 | 50 | 0 | 25 | 0 | 12.5 | 6.25 | 6.25 | 0 | 0 |
| Tyler 06 | 50 | 0 | 25 | 0 | 13 | 9 | 0 | 3 | 0 |
| Tyler 13 | 51 | 0 | 25 | 0 | 12.5 | 0 | 0 | 0 | 11.5 |
| Tyler 16 | 51 | 0 | 26 | 0 | 13 | 8.5 | 0 | 1.5 | 0 |
| Tyler 17 | 50 | 0 | 25 | 0 | 13 | 0 | 10.5 | 1.5 | 0 |
| Tyler 21 | 50.5 | 0 | 26 | 0 | 13 | 0 | 7.5 | 3 | 0 |
| Tyler 24 | 50 | 0 | 25 | 0 | 12.75 | 12.25 | 0 | 0 | 0 |
| Tyler 25 | 51 | 0 | 26 | 0 | 13 | 0 | 10 | 0 | 0 |
| Tyler 30 | 51 | 0 | 26 | 0 | 13 | 3.5 | 6.5 | 3 | 0 |

The following nine characteristics were tracked for each composition blend: (1) cracking in finished candle after a first pour; (2) cracking in finished candle after a second pour; (3) edge cracking; (4) adherence/shrinkage of wax; (5) burn rate (g/hr); (6) wax consumption; (7) cracking in wax pool; (8) surface characteristics of burn pool; and (9) wax pool diameters (in). The grading scale for the subjective characteristics is provided in Table 12C.

TABLE 12C

Characteristic Scales

| Scale | Description |
|---|---|
| | Adherence/Shrinkage Characteristic (4) |
| 0 | No visible adherence to container or easy removal of wax from candle mold. |
| 1 | Some adherence to container or added work/force necessary to remove wax from mold |
| 2 | Almost complete adherence to container or excessive work/force necessary to remove wax from mold |
| 3 | Complete adherence to container or destruction of shape necessary to remove wax from mold |
| | Cracking Intensity Characteristic (1)–(3), (7) |
| 0 | No cracks visible |
| 1 | Surface cracks under 1 inch |
| 2 | Surface cracks over 1 inch |
| 3 | Deep cracks under 1 inch |
| 4 | Deep cracks over 1 inch, radiating cracks, or cracks that make the surface uneven |
| | Surface Characteristic (4) and (8) |
| 0 | Smooth with no pattern |
| 1 | Smooth with pattern not covering entire surface |
| 2 | Smooth with pattern covering entire surface |
| 3 | Small bumps with or without pattern |
| 4 | Large bumps with or without pattern |

Results are presented in Table 12D. Based upon the test results in Table 12D, the blend compositions of Examples 13-26 are preferred.

TABLE 12D

Data Collected

| ID | CD | (2) | (3) | (4) | (5) | (6) | (7) | (8) | (9) |
|---|---|---|---|---|---|---|---|---|---|
| Tyler 30 | 0 | 3 | 4 | 0 | 4.68 | 86% | 0.2 | 0.2 | 2.20 |
| Tyler 04 | 0 | 2 | 4 | 4 | 4.33 | 79% | 1.4 | 0.4 | 2.23 |
| Tyler 16 | 1 | 0 | 3 | 4 | 4.66 | 83% | 0.6 | 0.2 | 2.27 |
| Tyler 25 | 0 | 1 | 0 | 4 | — | — | — | — | — |
| Tyler 21 | NR | 1 | 4 | 0 | 3.72 | 77% | 0.5 | 0.67 | 2.17 |
| Tyler 13 | NR | 1 | 4 | 0 | 4.38 | 75% | 0.6 | 0.8 | 2.23 |
| Tyler 01 | NR | 1 | 4 | 0 | 4.13 | 80% | 0 | 1 | 2.23 |
| Tyler 17 | NR | 1 | 4 | 0 | 3.83 | 82% | 0.33 | 0.67 | 2.10 |
| Pierce 18 | 0 | 0 | 4 | 0 | — | — | — | — | — |
| Pierce 01 | 0 | 0 | 4 | 0 | 4.02 | 81% | 1.6 | 0.4 | 2.27 |
| Pierce 31 | 4 | 0 | 4 | 0 | 3.91 | 80% | 0.6 | 0.6 | 2.10 |
| Pierce 23 | 0 | 3 | 4 | 0 | 3.78 | 79% | 0.6 | 0.8 | 2.17 |
| Pierce 10 | 3 | 0 | 4 | 0 | 4.09 | 80% | 0.6 | 1.2 | 2.35 |
| Pierce 04 | 4 | 0 | 0 | 0 | 4.29 | 80% | 2 | 0.6 | 2.27 |
| Buchanan 04 | 4 | 4 | 0 | 4 | 3.64 | 71% | 0.75 | 1 | 2.19 |
| Buchanan 08 | 4 | 0 | 0 | 4 | 4.36 | 80% | 0.25 | 0.5 | 2.06 |
| Buchanan 15 | 4 | 3 | 4 | 4 | 3.94 | 67% | 0.75 | 1.25 | 2.06 |
| Buchanan 09 | 4 | 2 | 4 | 4 | 3.91 | 76% | 0.75 | 1.5 | 2.22 |
| Buchanan 06 | 4 | 3 | 4 | 0 | 4.08 | 76% | 2 | 1.25 | 2.22 |
| Buchanan 32 | 4 | 1 | 4 | 4 | 4.18 | 81% | 0.75 | 0.5 | 2.03 |
| FDR 04 | 4 | 3 | 4 | 4 | 3.79 | 67% | 1.75 | 2.5 | 2.06 |
| FDR 01 | NR | 2 | 4 | 0 | — | — | — | — | — |
| FDR 05 | NR | 3 | 4 | 4 | — | — | — | — | — |
| FDR 10 | 4 | 2 | 4 | 0 | 3.57 | 46% | 0 | 3.33 | 1.75 |
| FDR 15 | 4 | 2 | 4 | 3 | 3.58 | 56% | 1.33 | 2.67 | 1.75 |
| FDR 07 | 4 | 3 | 4 | 0 | 3.32 | 43% | 0 | 3.33 | 1.75 |

PROTOCOL FOR EXAMPLES 13-26

The candles prepared in examples 13-26 were prepared using the following protocol, unless otherwise noted. The ingredients in each blend composition are added to a vessel in no particular order. The ingredients are heated on a hot plate, while being stirred by a magnetic stir bar, to 70° Celsius. A container for receiving the blend composition is heated to 60° C. A wick and tab are inserted into the container before heating. The blend composition is poured to the desired height within the container. The container and composition are cooled until solid. If necessary, the composition is reheated and a second layer is poured. The candle, blend composition, is allowed to cool completely.

Example 13

A candle was prepared in accordance with the above specified protocol. The candle composition includes 56.25% partially hydrogenated plant oil, such as Shurset K 125 soybean oil available from AC Humko; 25.00% of a free fatty acid, such as FA-1695 palmitic acid available from PCNA; 6.25% crystal modifier, such as Dimodan P VK surfactant available from Danisco Cultor; and 12.50% wax, such as R-2542 high melt paraffin wax available from Moore & Munger. Alternatively, other waxes may be used, such as other petroleum based waxes or natural waxes, such as beeswax.

Candles having the above described composition were tested against a reference candle, a Pace hybrid candle available from Pace Manufacturing located in Gwinnett County, Georgia. The tested candles were determined to be at parity with the Pace candle regarding fragrance intensity and to burn approximately 22% longer than the Pace hybrid candle. The tested candles had a burn rate of 4.03 g/hr for candles having a 44-32-18c size wick. The tested candles consumed approximately 65% of the candle composition during their lifetime.

Free standing pillar candles of the above composition required only a single pour during manufacture. The filled candles did not rattle inside their containers after cooling. However, filled and votive candles required a second pour to fill in cracks. The second pour of the filled candles did not run down the sides of the first pour in the container.

Example 14

A 100% plant derived candle was prepared in accordance with the above specified protocol. The candle composition includes 62.50% partially hydrogenated plant oil, such as Shurset K 125 soybean oil available from AC Humko; 25.00% of a free fatty acid, such as FA-1655 triple-pressed stearic acid available from PCNA; 6.25% crystal modifier, such as Dimodan P VK surfactant available from Danisco; and 6.25% canola oil, such as Dritex R CE available from AC Humko.

Candles having the above described composition were tested against a reference candle, a Pace hybrid. The tested candles were determined to be at parity with the Pace candle regarding fragrance intensity and to burn approximately 15% longer than the Pace hybrid candle. The tested candles had a burn rate of 4.4 g/hr for candles having a 44-32-18c size wick. The tested candles consumed approximately 68% of the candle composition during their lifetime.

Free standing pillar candles of the above composition required only a single pour during manufacture. The filled candles did not rattle inside their containers after cooling. However, filled and votive candles required a second pour to fill in cracks. Additionally, the filled and votive candles had some raised "veins" on the top surface of the candle and had some cracking visible around the filled candle edge. Further, for the filled candles the second pour ran down the sides of the first pour in the container.

Example 15

A candle was prepared in accordance with the above specified protocol. The candle composition includes 50.00% partially hydrogenated plant oil, such as Shurset K 125 soybean oil available from AC Humko; 25.00% of a free fatty acid, such as FA-1655 triple-pressed stearic acid available from PCNA; 12.50% canola oil, such as Dritex R CE available from AC Humko; 9.50% low melt paraffin wax, such as IGI-1230 available from IGI; and 3.00% microcrystalline paraffin wax, such as Bowax available from IGI. Alternatively, other waxes such as natural waxes may be used, such as beeswax.

Candles having the above described composition were tested against a reference candle, Pace hybrid. The tested candles were determined to be at parity with the Pace candle regarding fragrance intensity and to burn approximately 26% longer than the Pace hybrid candle. The tested candles had a burn rate of 3.81 g/hr for candles having a 44-32-18c size wick. The tested candles consumed approximately 74% of the candle composition during their lifetime.

A second pour was required to fill in cracks on free standing pillar, votive and filled candles. The filled candles did not rattle inside their containers after cooling. However, the second pour of the filled candles did slightly run down the sides of the first pour. Cracking was visible around the edge of the filled candles. The votive candles cracked slightly when the wick and wick clip were inserted in the candle.

Example 16

A candle was prepared in accordance with the above specified protocol. The candle composition includes 51.00% partially hydrogenated plant oil, such as Shurset K 125 soybean oil available from AC Humko; 36.50% crystal modifier, such as Dimodan P VK surfactant available from Danisco; and 12.50% wax, such as R-2542 high melt paraffin wax available from Moore & Munger. Alternatively, other waxes may be used, such as other petroleum based waxes or natural waxes, such as beeswax.

Candles having the above described composition were tested against a reference candle, Pace hybrid. The tested candles were determined to be at parity with the Pace candle regarding fragrance intensity and to burn approximately 11% longer than the Pace hybrid candle. The tested candles had a burn rate of 4.57 g/hr for candles having a 44-32-18c size wick. The tested candles consumed approximately 38% of the candle composition during their lifetime.

Free standing pillar and votive candles required only a single pour during manufacture. The filled candles did not rattle inside their containers after cooling. A second pour was required to fill in cracks on filled candles to level of the first pour. The second pour of the filled candles did run down the sides of the first pour. Hairline cracks were visible in the bottom of the burn pool of the tested candles.

Example 17

A candle was prepared in accordance with the above specified protocol. The candle composition includes 50.00% partially hydrogenated plant oil, such as Shurset K 125 soybean oil available from AC Humko; 25.00% of a free fatty acid component, such as FA-1695 palmitic acid available from PCNA; 12.50% canola oil, such as Dritex R CE available from AC Humko; 9.50% low melt paraffin wax, such as IGI-1230 available from IGI; and 3.00% microcrystalline paraffin wax, such as Bowax 874 available from IGI. Alternatively, other waxes such as natural waxes may be used.

Candles having the above described composition were tested against a reference candle, Pace hybrid. The tested candles were determined to be at parity with the Pace candle regarding fragrance intensity and to burn approximately 28% longer than the Pace hybrid candle. The tested candles had a burn rate of 3.71 g/hr for candles having a 44-32-18c size wick. The tested candles consumed approximately 71% of the candle composition during their lifetime.

The filled candles did not rattle inside their containers after cooling. A second pour was required to fill in cracks on pillar, votive, and filled candles. The second pour of the filled candles did slightly run down the sides of the first pour. The pillar candles cracked in half while drilling a hole for the wick. Votive cracked at bottom when wick and wick clip were inserted.

Example 18

A candle was prepared in accordance with the above specified protocol. The candle composition includes 51.00% partially hydrogenated plant oil, such as Shurset K 125 soybean oil available from AC Humko; 36.50% crystal modifier, such as Dimodan P VK surfactant available from Danisco; and 12.50% wax, such as Bowax 874 microcrystalline paraffin wax available from IGI. Alternatively, other waxes may be used, such as other petroleum based waxes or natural waxes, such as beeswax.

Candles having the above described composition were tested against a reference candle, Pace hybrid. The tested candles were determined to have a lower fragrance intensity with respect to the Pace candle and to burn approximately 8% longer than the Pace hybrid candle. The tested candles had a burn rate of 4.74 g/hr for candles having a 44-32-18c size wick. The tested candles consumed approximately 36% of the candle composition during their lifetime. Filled candles do not rattle inside their containers.

A second pour was required to fill in cracks on pillar, votive, and filled candles. The second pour of the filled candles did run down the sides of the first pour. Cracking was visible around the edge of some filled candles.

Example 19

A 100% plant derived candle was prepared in accordance with the above specified protocol. The candle composition includes 62.50% partially hydrogenated plant oil, such as Shurset K 125 soybean oil available from AC Humko; 25.00% crystal modifier, such as Dimodan P VK surfactant available from Danisco; and 12.50% hydrogenated plant oil, such as Dritex S soybean oil available from AC Humko.

Candles having the above described composition were tested against a reference candle, Pace hybrid. The tested candles were determined to have a lower fragrance intensity with respect to the Pace candle and to burn approximately 13% longer than the Pace hybrid candle. The tested candles had a burn rate of 4.5 g/hr for candles having a 44-32-18c size wick. The tested candles consumed approximately 54% of the candle composition during their lifetime. Pillar candles required only a single pour.

A second pour was required to fill in cracks on votive, and filled candles to level off first pour. The second pour of the filled candles did slightly run down the sides of the first pour. Cracking was visible around the edge of some filled candles. Filled candles rattled inside their containers.

Example 20

A candle was prepared in accordance with the above specified protocol. The candle composition includes 25.00% partially hydrogenated plant oil, such as Shurset K 125 soybean oil available from AC Humko; 37.50% of a free fatty acid component, such as FA-1655 triple-pressed stearic acid available from PCNA; 25.00% crystal modifier, such as Dimodan P VK surfactant available from Danisco; and 12.50% wax, such as Bowax 874 microcrystalline paraffin wax available from IGI.

Example 21

A candle was prepared in accordance with the above specified protocol. The candle composition includes 28.74% partially hydrogenated plant oil, such as Shurset K 125 soybean oil available from AC Humko; 12.50% of hydrogenated plant oil, such as Dritex S soybean oil available from AC Humko; 5.63% of a free fatty acid component, such as FA-1655 triple-pressed stearic acid available from PCNA; 5.63% of a free fatty acid component, such as FA-1695 palmitic acid available from PCNA; 12.50% canola oil, such as Dritex R CE available from AC Humko; 26.66% crystal modifier, such as Dimodan P VK surfactant available from Danisco; 2.08% beeswax available from Strahl Pitsch; 2.08% microcrystalline paraffin wax, such as Bowax 874 available from IGI; 2.08% low melt paraffin wax, such as IGI-1230 available from IGI; and 2.08% high melt paraffin wax such as such as R-2542 available from Moore & Munger. Alternative waxes may be used.

Example 22

A candle was prepared in accordance with the above specified protocol. The candle composition includes 50.00% partially hydrogenated plant oil, such as Shurset K 125 soybean oil available from AC Humko; 12.50% of a free fatty acid component, such as FA-1655 triple-pressed stearic acid available from PCNA; 25% canola oil, such as Dritex R CE available from AC Humko; 6.25% low melt paraffin wax, such as IGI-1230 available from IGI; and 6.25% high melt paraffin wax such as such as R-2542 available from Moore & Munger. Alternatively, other waxes such as natural waxes may be used.

Example 23

A candle was prepared in accordance with the above specified protocol. The candle composition includes 62.50% partially hydrogenated plant oil, such as Shurset K 125 soybean oil available from AC Humko; 25.00% of a free fatty acid component, such as FA-1655 triple-pressed stearic acid available from PCNA; and 12.50% high melt paraffin wax such as such as R-2542 available from Moore & Munger. Alternatively, other waxes such as natural waxes may be used.

Example 24

A candle was prepared in accordance with the above specified protocol. The candle composition includes 50.00% partially hydrogenated plant oil, such as Shurset K 125 soybean oil available from AC Humko; 12.50% of a free fatty acid component, such as FA-1655 triple-pressed stearic acid available from PCNA; 12.50% of a free fatty acid component, such as FA-1695 palmitic acid available from PCNA; 12.50% crystal modifier, such as Dimodan P VK surfactant available from Danisco; and 12.50% low melt paraffin wax, such as IGI-1230 available from IGI. Alternative waxes may be used.

Example 25

A candle was prepared in accordance with the above specified protocol. The candle composition includes 50.00% partially hydrogenated plant oil, such as Shurset K 125 soybean oil available from AC Humko; 12.50% of a free fatty acid component, such as FA-1695 palmitic acid available from PCNA; 25.00% crystal modifier, such as Dimodan P VK surfactant available from Danisco; 3.00% microcrystalline paraffin wax, such as Bowax 874 available from IGI; and 9.50% high melt paraffin wax such as such as R-2542 available from Moore & Munger. Alternative waxes may be used.

Example 26

A candle was prepared in accordance with the above specified protocol. The candle composition includes 62.50% partially hydrogenated plant oil, such as Shurset K 125 soybean oil available from AC Humko; 12.5% of a free fatty acid component, such as FA-1655 triple-pressed stearic acid available from PCNA; 12.50% crystal modifier, such as Dimodan P VK surfactant available from Danisco; 3.00% microcrystalline paraffin wax, such as Bowax 874 available from IGI; and 9.50% high melt paraffin wax such as such as R-2542 available from Moore & Munger. Alternative waxes may be used.

PROTOCOL FOR EXAMPLES 27-28

Unless otherwise stated, the components of the candle were weighed and combined in a clean glass container or mold. The composite material was obtained by heating to melt all solid components to a liquid state with sufficient stirring to uniformly mix all components. The temperature range for melting was normally between approximately 75° C. to about 110° C. Although they are not necessary for the mixing process, higher temperatures may be used. Temperatures in excess of 130° C. are to be avoided to minimize degradation of the materials.

After the components were mixed, the composite material was either directly poured into product containers or was allowed to cool at room temperature to approximately 85° C. before being poured into product containers. A wick was normally added at this point, while the material is still in the liquid state. The product was then cooled by standing at ambient temperature (room temperature), by the use of air convection (fan) or by the use of a temperature controlled water bath in a temperature range of about 5° C. to about 50° C. Colder temperatures may also be used if faster cooling is desired. Although several different cooling processes may be used, superior candles were made by minimizing the pouring temperature and cooling rapidly using air convection or a water bath.

Example 27

A 100% plant derived lipid candle was prepared in accordance with the above described protocol. The lipid composition of the candle includes 30% to 100% fully hydrogenated plant oils, such as Dritex/RCE 7:3 available from A. C. Humko; 0% to 25% of partially hydrogenated plant oils, such as Crisco® shortening available from Procter and Gamble at One Proctor & Gamble Plaza, Cincinnati, Ohio 45202; 0% to 40% crystal modifier, such as Dimodan P VK available from Danisco Cultor, USA; and 0% to 5% of free fatty acid such as, stearic acid available from Acme-Hardesty or alternatively Witco.

The performance of the candle was subjectively quantified using the following three categories: (1) Appearance/cracking—shininess, cracking, ease of release from mold; (2) Burning—consistent flame of acceptable size, flaring of the sides of the candle, and liquid spillover from side of candle; and (3) Cracking—appearance of cracks near the wick of the candle during repeated use. Based upon the results of the subjective testing, it was determined that the inclusion of stearic acid caused the candle to have a poor appearance characteristic.

As such, candle compositions including 60% to 96% of fully hydrogenated plant oils, 0% to 25% of partially hydrogenated plant oils and 5% to 40% of crystal modifier are preferred. Upon testing compositions within the ranges specified, it was determined that the crystal modifier Dimodan improved the appearance and cracking characteristics when the candle composition contained above 5% by weight. Additionally, the inclusion of 15%-25% by weight of Crisco® significantly reduced the flaring of the candle. For all compositions tested, cracking around the wick of the candle was not a serious problem in either the appearance or function of the candles.

Based upon the testing listed above, candle compositions consisting of 35% to 77.5% of fully hydrogenated plant oils, 15% to 25% of partially hydrogenated plant oils, and 7.5% to 40% crystal modifier are further preferred. Still further preferred is the candle composition of 65% fully hydrogenated plant oils, 25% partially hydrogenated plant oils, and 10% crystal modifier.

Example 28

A 100% plant derived lipid candle was prepared in accordance with the above described protocol. The lipid composition of the candle includes 61.5% hydrogenated plant oil, such as soybean oil available from A. C. Humko, Cargill or ADM; 28.5% canola oil available from A. C. Humko; and 10.0% plant derived crystal modifier, such as Dimodan P VK surfactant available from Danisco Cultor.

While the invention has been illustrated and described in detail in the foregoing description, the same is to be construed as illustrative and not restrictive in character, it being understood that only exemplary embodiments have been described and that all changes and modifications that come within the spirit of the invention are desired to be protected.

We claim:

1. A candle composition, comprising:
60 to 99 percent by weight of plant derived triglycerides, the plant derived triglycerides including fatty acid components having up to 2 double bonds; and
1 to 40 percent by weight of a plant derived crystal modifier.

2. The candle composition of claim 1, wherein the composition comprises 75 to 99 percent by weight of the plant derived triglycerides and 1 to 25 percent by weight of the plant derived crystal modifier.

3. The candle composition of claim 2, wherein the plant derived crystal modifier is a plant derived surfactant.

4. The candle composition of claim 1, wherein the candle composition comprises 5 to 40 percent by weight of the plant derived crystal modifier.

5. The candle composition of claim 4, wherein the candle composition comprises 5 to 20 percent by weight of the plant derived crystal modifier.

6. The candle composition of claim 5, wherein the candle composition comprises 5 to 10 percent by weight of the plant derived crystal modifier.

7. The candle composition of claim 1, wherein the plant derived crystal modifier is a surfactant.

8. The candle composition of claim 1, wherein the composition further includes a colorant.

9. The candle composition of claim 1, wherein the composition further includes an odorant.

10. The candle composition of claim 1, wherein the plant derived triglycerides are comprised of a majority of soybean derived products.

11. The candle composition of claim 10, wherein the fatty acid components are selected from the group consisting of lauric, myristic, palmitic, stearic, arachidic, behenic, palmitoleic, oleic, linoleic, linolenic and arachidonic acid.

12. A combustible candle, comprising:
triglycerides obtained from vegetable oils, the triglycerides consisting essentially of fatty acid components having up to 2 double bonds and including a first fatty acid component having one double bond; and
a crystal modifier present in the amount of 1 to 40% by weight of the candle.

13. The candle of claim 12, wherein the fatty acid components comprise stearic, palmitic and oleic acids.

14. The candle of claim 13, wherein the stearic acid comprises up to about 74% by weight of the triglycerides.

15. The candle of claim 13, wherein the palmitic acid comprises up to about 39% by weight of the triglycerides.

16. The candle of claim 13, wherein the oleic acid comprises up to about 73% of the triglycerides.

17. The candle of claim 13, wherein the stearic acid comprises up to about 74% by weight of the triglycerides, the palmitic acid comprises up to about 39% by weight of the triglycerides, and the oleic acid comprises up to about 73% of the triglycerides.

18. The candle of claim 12, wherein the fatty acid components of the triglycerides comprise up to 3.9% by weight of fatty acid components having 2 double bonds.

19. The candle of claim 12, wherein the triglycerides further comprise a second fatty acid component having no double bonds.

20. The candle of claim 19, wherein the triglycerides further comprise a third fatty acid component having two double bonds.

21. The candle of claim 20, wherein the third fatty acid component is present in an amount up to 3.9% by weight of all fatty acids components in the candle.

22. The candle of claim 12, further comprising at least about 3% by weight of petroleum wax.

23. The candle of claim 12, wherein the combustible candle is solid at a temperature up to 55° C.

24. The candle of claim 12, wherein the crystal modifier is present in an amount up to 12.5%.

25. The candle of claim 24, wherein the crystal modifier comprises a surfactant.

26. The candle of claim 25, further comprising a petroleum wax.

27. The candle of claim 12, wherein the triglycerides are obtained from one or more of palm, corn and soy oils.

28. A combustible candle comprising:
triglycerides obtained from plant derived oils and consisting essentially of fatty acid components having up to 2 double bonds, the triglycerides including a first fatty acid component having one double bond; and at least one petroleum wax;

the candle including a greater amount of plant derived composition than the at least one petroleum wax.

29. The candle of claim 28, wherein the plant derived oils are selected from the group consisting of soybean, corn, and palm oils.

30. The candle of claim 28, wherein the fatty acid components comprise stearic, palmitic and oleic acids.

31. The candle of claim 30, wherein the stearic acid comprises up to about 74% by weight of the triglycerides.

32. The candle of claim 30, wherein the palmitic acid comprises up to about 39% by weight of the triglycerides.

33. The candle of claim 30, wherein the oleic acid comprises up to about 73% of the triglycerides.

34. The candle of claim 30, wherein the stearic acid comprises up to about 74% by weight of the triglycerides, the palmitic acid comprises up to about 39% by weight of the triglycerides, and the oleic acid comprises up to about 73% of the triglycerides.

35. The candle of claim 28, wherein the fatty acid components of the triglycerides comprise up to 3.9% by weight of fatty acids having 2 double bonds.

36. The candle of claim 28, wherein the triglycerides further comprise a second fatty acid component having no double bonds.

37. The candle of claim 36, wherein the triglycerides further comprise a third fatty acid component having two double bonds.

38. The candle of claim 37, wherein the third fatty acid component is present in an amount up to 3.9% by weight of all fatty acids components in the candle.

39. The candle of claim 28, wherein the combustible candle is solid at a temperature up to 55° C.

40. The candle of claim 28, further comprising a crystal modifier in an amount of 1 to 40% by weight of the candle.

41. The candle of claim 40, wherein the crystal modifier is present in an amount up to 12.5%.

42. The candle composition of claim 1, wherein the plant derived triglycerides comprise stearic, palmitic and oleic fatty acid components.

43. The candle composition of claim 42, wherein the stearic acid comprises up to about 74% by weight of the triglycerides.

44. The candle composition of claim 42, wherein the palmitic acid comprises up to about 39% by weight of the triglycerides.

45. The candle composition of claim 42, wherein the oleic acid comprises up to about 73% of the triglycerides.

46. The candle composition of claim 42, wherein the stearic acid comprises up to about 74% by weight of the triglycerides, the palmitic acid comprises up to about 39% by weight of the triglycerides, and the oleic acid comprises up to about 73% of the triglycerides.

47. The candle composition of claim 42, wherein the fatty acid components of the triglycerides comprise up to 3.9% by weight of fatty acids having 2 double bonds.

48. The candle composition of claim 42, wherein the triglycerides further comprise a second fatty acid component having no double bonds.

49. The candle composition of claim 48, wherein the triglycerides further comprise a third fatty acid component having two double bonds.

50. The candle composition of claim 49, wherein the third fatty acid component is present in an amount up to 3.9% by weight of all fatty acids components in the candle composition.

51. The candle of claim 42, wherein the triglycerides are obtained from one or more of palm, corn and soy oils.

52. The candle composition of claim 1, further comprising at least about 3% by weight of petroleum wax.

\* \* \* \* \*